(12) United States Patent
Kawabata et al.

(10) Patent No.: US 11,009,986 B2
(45) Date of Patent: May 18, 2021

(54) SENSOR AND ELECTRONIC DEVICE

(71) Applicant: Sony Corporation, Tokyo (JP)

(72) Inventors: Tomoki Kawabata, Kanagawa (JP); Yasushi Itoshiro, Saitama (JP); Toshiaki Nishikawa, Kanagawa (JP); Munetake Ebihara, Tokyo (JP); Akira Fujisawa, Tokyo (JP); Kei Tsukamoto, Kanagawa (JP); Hiroaki Yamana, Tokyo (JP); Makoto Yamaguchi, Tokyo (JP); Keisuke Kinokuni, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/632,751

(22) PCT Filed: Jul. 20, 2018

(86) PCT No.: PCT/JP2018/027396
§ 371 (c)(1),
(2) Date: Jan. 21, 2020

(87) PCT Pub. No.: WO2019/017493
PCT Pub. Date: Jan. 24, 2019

(65) Prior Publication Data
US 2020/0159359 A1    May 21, 2020

(30) Foreign Application Priority Data

Jul. 21, 2017  (JP) .............................. JP2017-142312

(51) Int. Cl.
*G09G 5/00*  (2006.01)
*G06F 3/041*  (2006.01)
(Continued)

(52) U.S. Cl.
CPC .......... *G06F 3/0414* (2013.01); *G01L 5/0014* (2013.01); *G01L 5/0038* (2013.01);
(Continued)

(58) Field of Classification Search
CPC ........ G06F 3/041; G06F 3/0414; G06F 3/033; G06F 3/044; G06F 2203/04106;
(Continued)

(56) References Cited

U.S. PATENT DOCUMENTS

2009/0207147 A1*  8/2009  Perrot .................... G06F 1/3215
345/173
2011/0273389 A1   11/2011  Hibara et al.
(Continued)

FOREIGN PATENT DOCUMENTS

JP    2010-225031       10/2010
JP    2010-225031 A     10/2010
(Continued)

OTHER PUBLICATIONS

International Search Report and Written Opinion issued in connection with PCT/JP2018/027396, dated Aug. 28, 2018.(6 pages).

*Primary Examiner* — Jennifer T Nguyen
(74) *Attorney, Agent, or Firm* — K&L Gates

(57) ABSTRACT

An electronic device includes: a housing; a sensor provided on an inner surface of the housing and configured to detect deformation of the housing; and a control unit configured to control an operation of the electronic device on the basis of a detection result of the sensor. The sensor has a first sensing unit configured to detect a prescribed user operation and a second sensing unit configured to compensate for a malfunction.

18 Claims, 45 Drawing Sheets

(51) Int. Cl.
*G01L 5/00* (2006.01)
*G06F 1/16* (2006.01)
*G06F 11/30* (2006.01)
*H01H 13/02* (2006.01)
*H04M 1/02* (2006.01)

(52) U.S. Cl.
CPC ........ *G06F 1/1656* (2013.01); *G06F 11/3044* (2013.01); *H01H 13/02* (2013.01); *H04M 1/02* (2013.01)

(58) Field of Classification Search
CPC ....... G06F 11/0416; G06F 2203/04104; G06F 2203/04105; G06F 2203/04102; G06F 2203/04112; G06F 1/1656; G06F 1/1652; G01L 5/0014; H04M 1/02
USPC .................................................. 345/173, 156
See application file for complete search history.

(56) References Cited

U.S. PATENT DOCUMENTS

| | | | |
|---|---|---|---|
| 2013/0176257 A1* | 7/2013 | Park | G06F 3/0219 345/173 |
| 2015/0168237 A1* | 6/2015 | Tajitsu | H01L 41/1132 73/862.621 |
| 2015/0169091 A1* | 6/2015 | Ho | G06F 3/044 345/173 |
| 2015/0363023 A1* | 12/2015 | Kawaguchi | G06F 3/0443 345/174 |

FOREIGN PATENT DOCUMENTS

| | | |
|---|---|---|
| WO | 2014/033872 A1 | 3/2014 |
| WO | 2016/104674 A1 | 6/2016 |
| WO | 2014/033872 | 8/2016 |
| WO | 2016/104674 | 8/2017 |
| WO | 2016/143241 | 12/2017 |

* cited by examiner

FIG. 3
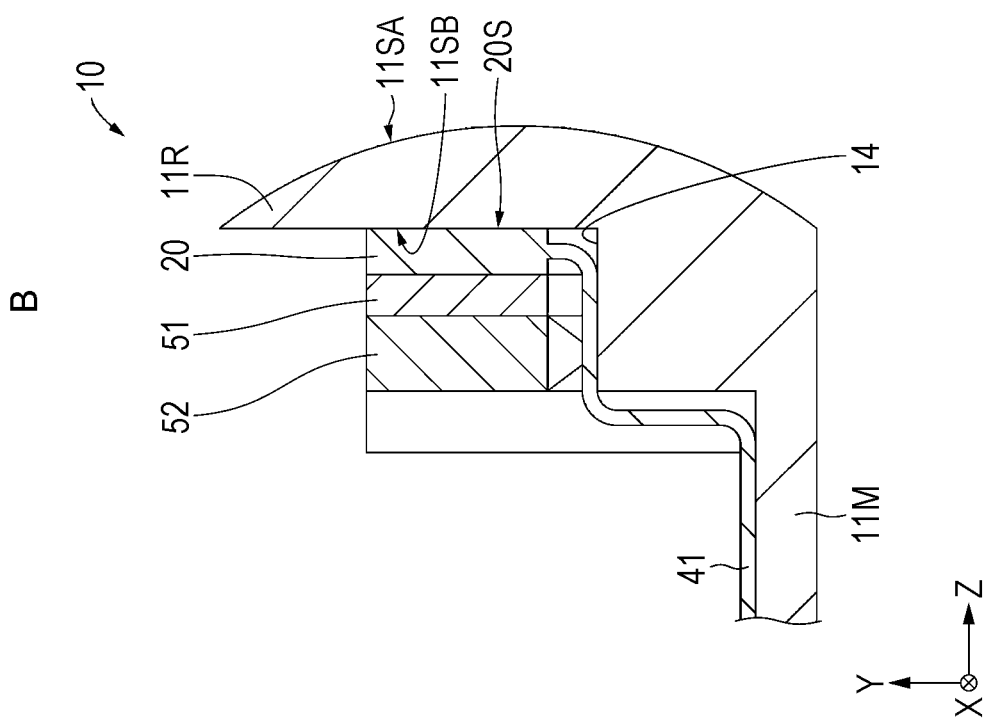
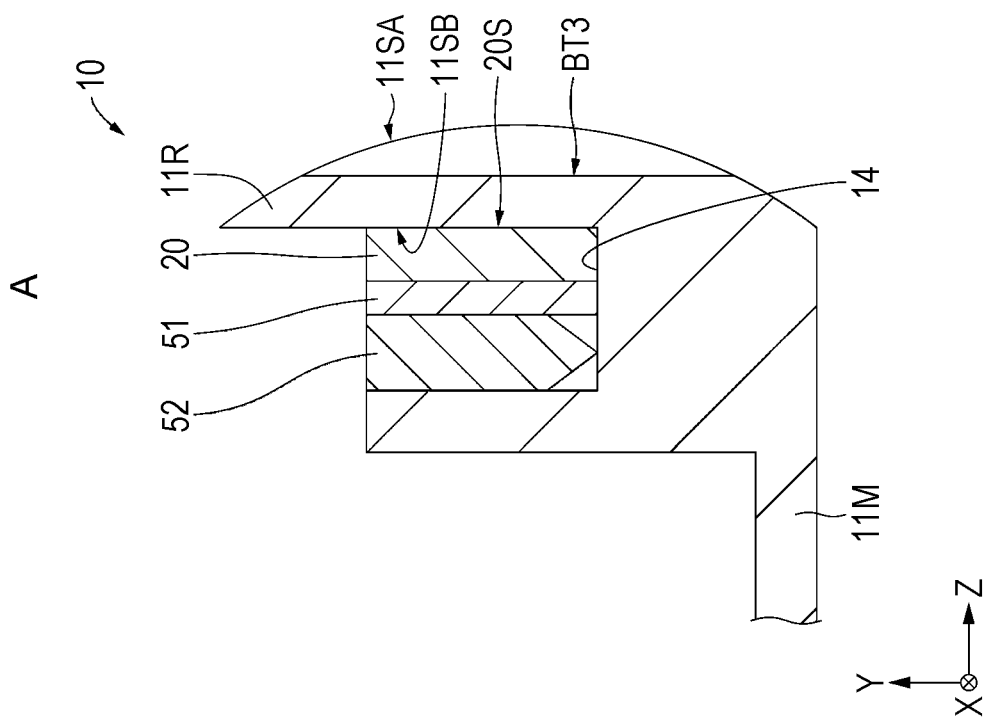

FIG. 8
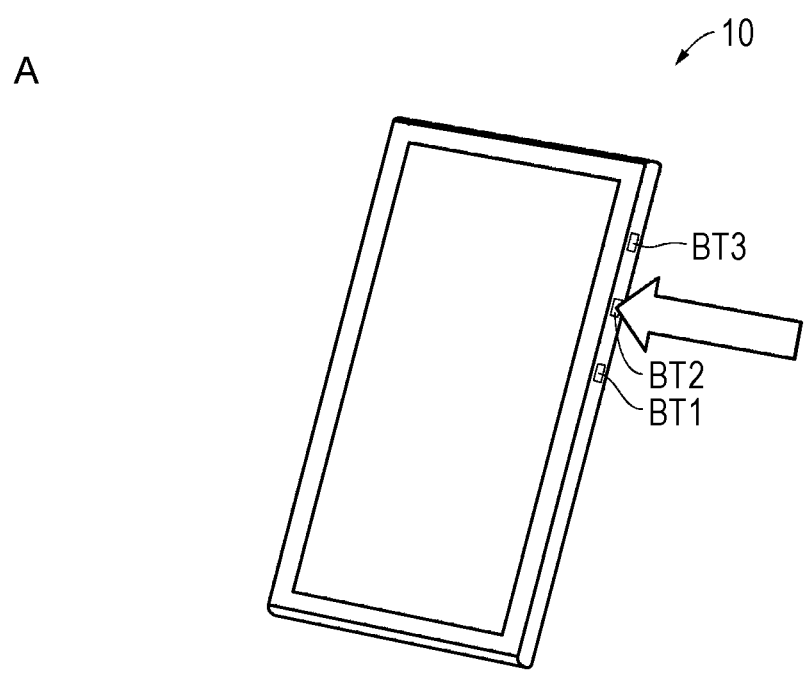
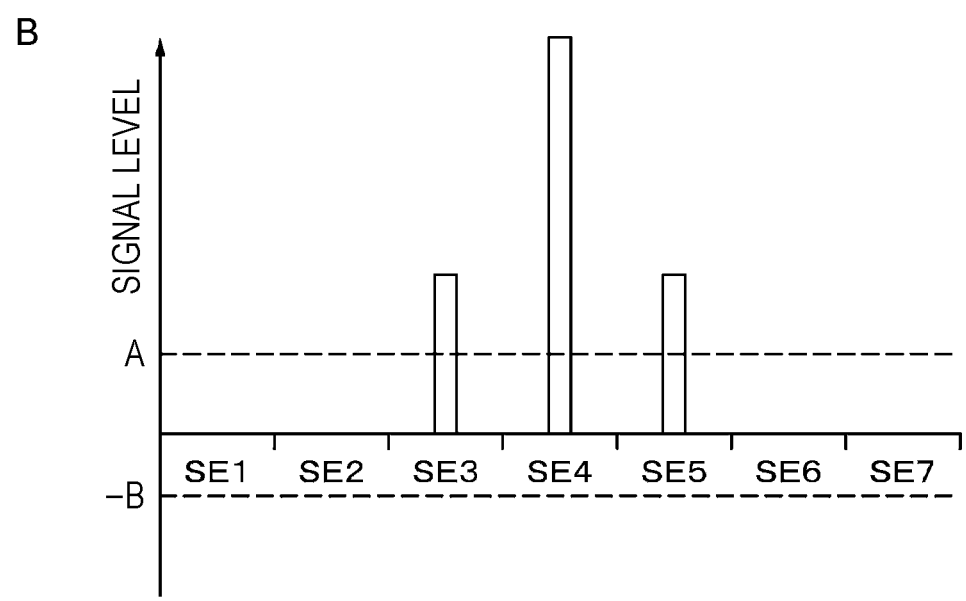

FIG. 9
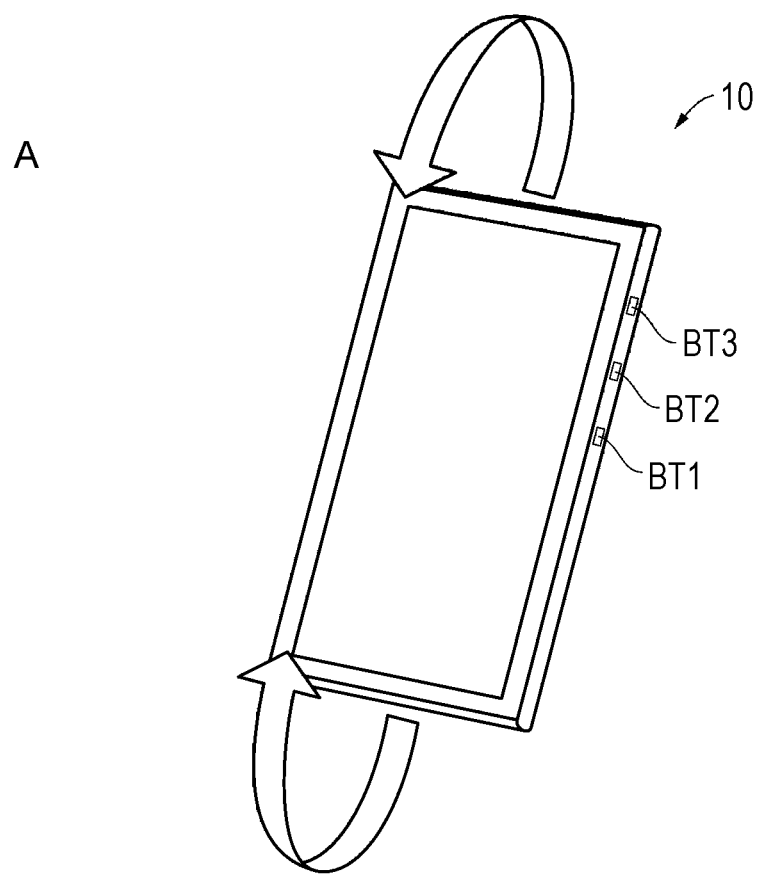
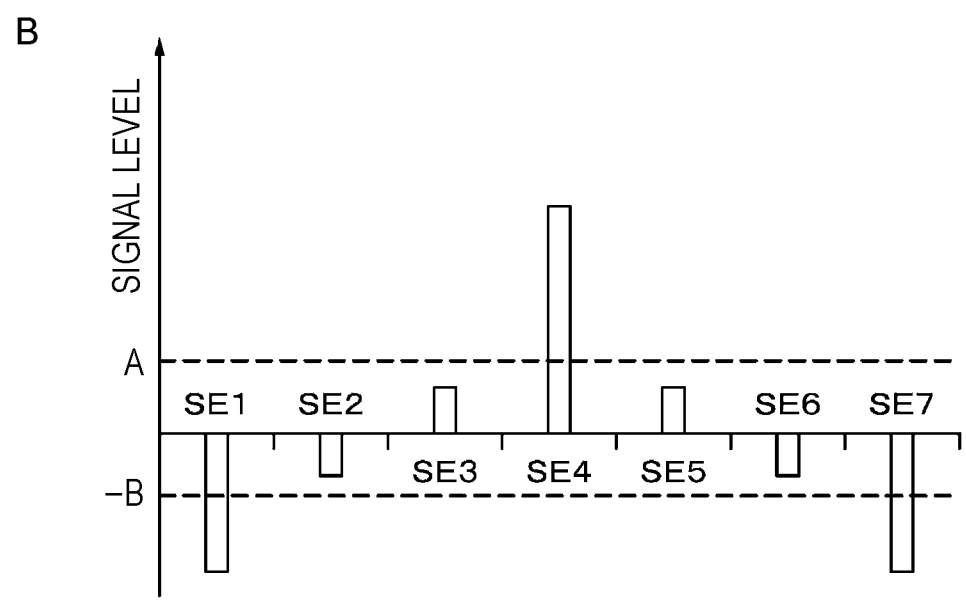

FIG. 10
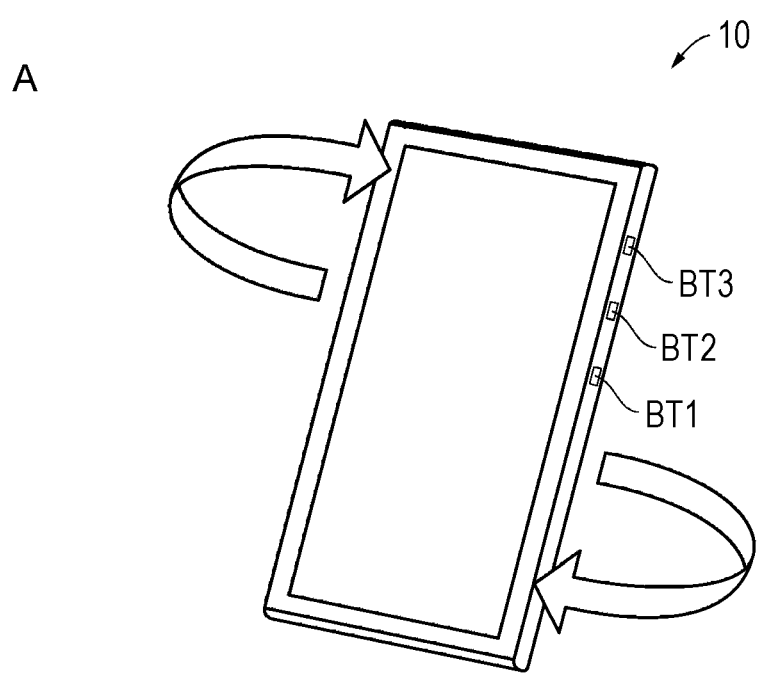
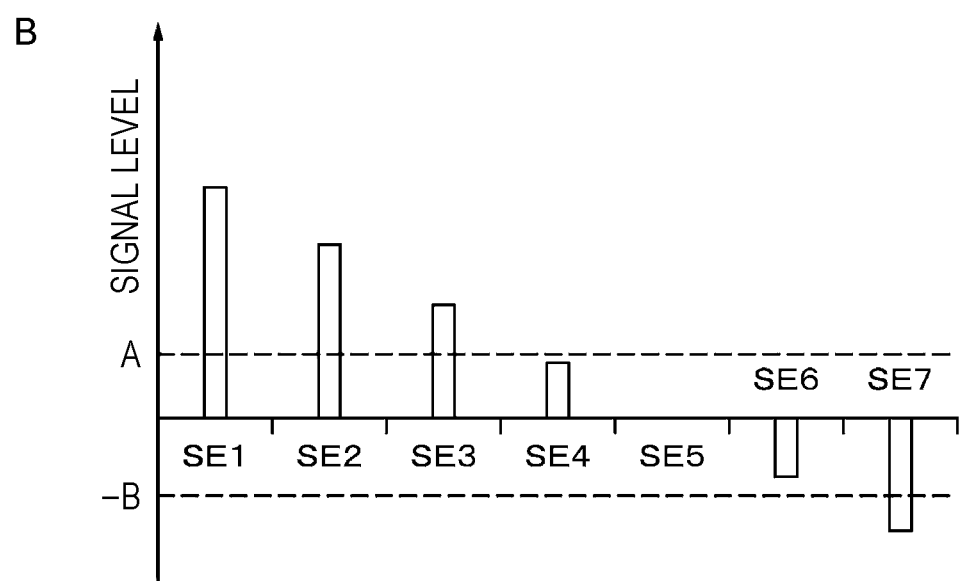

FIG. 11
A
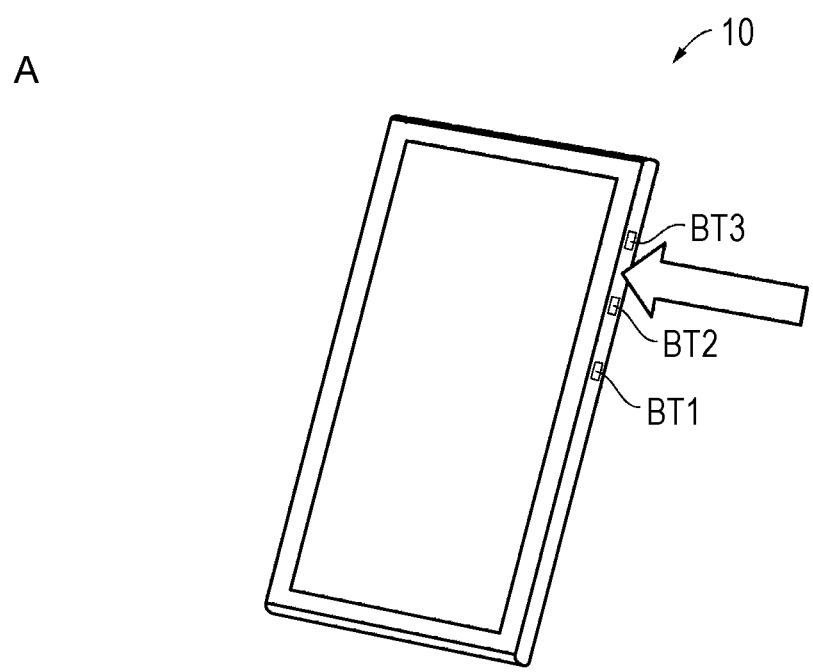
B
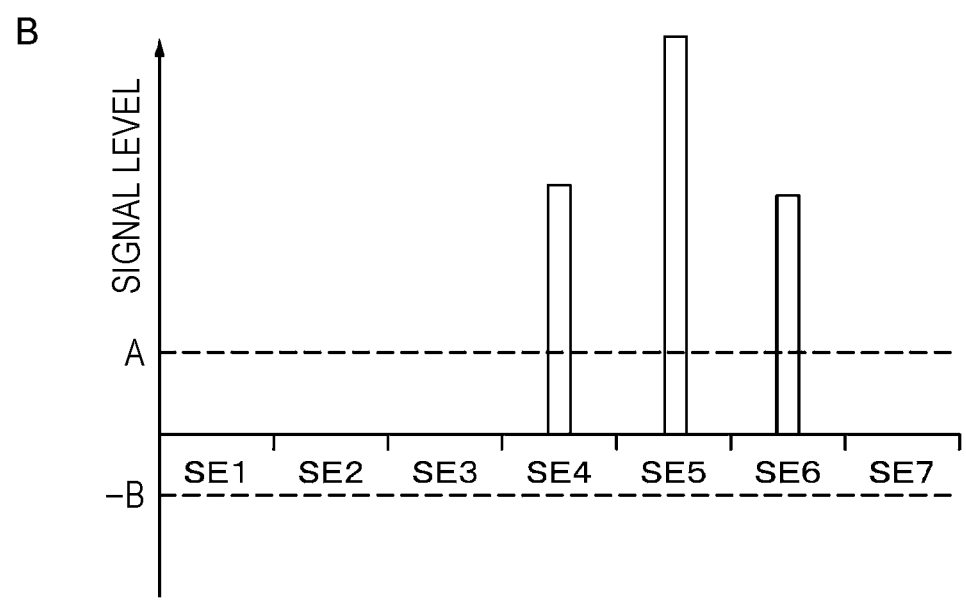

FIG. 13
A
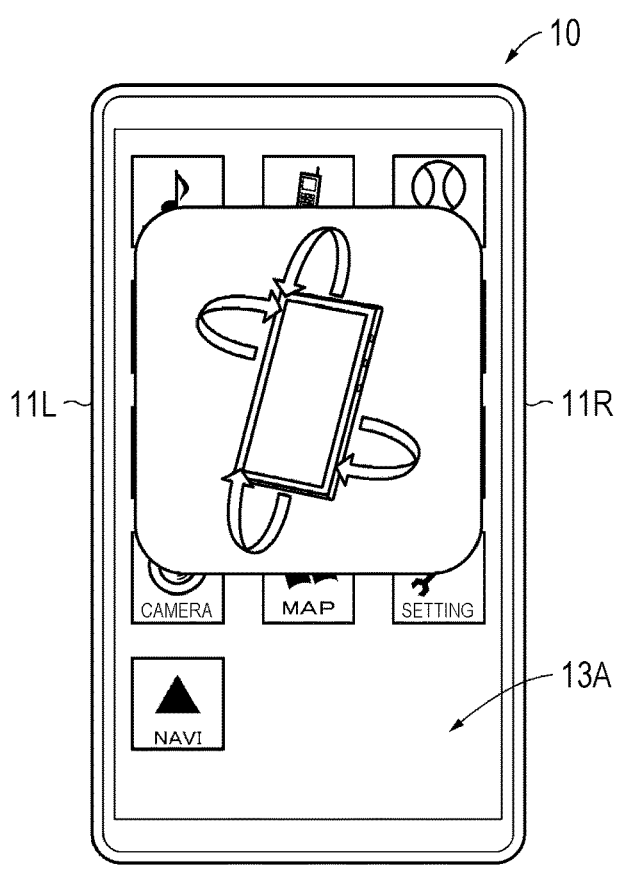
B
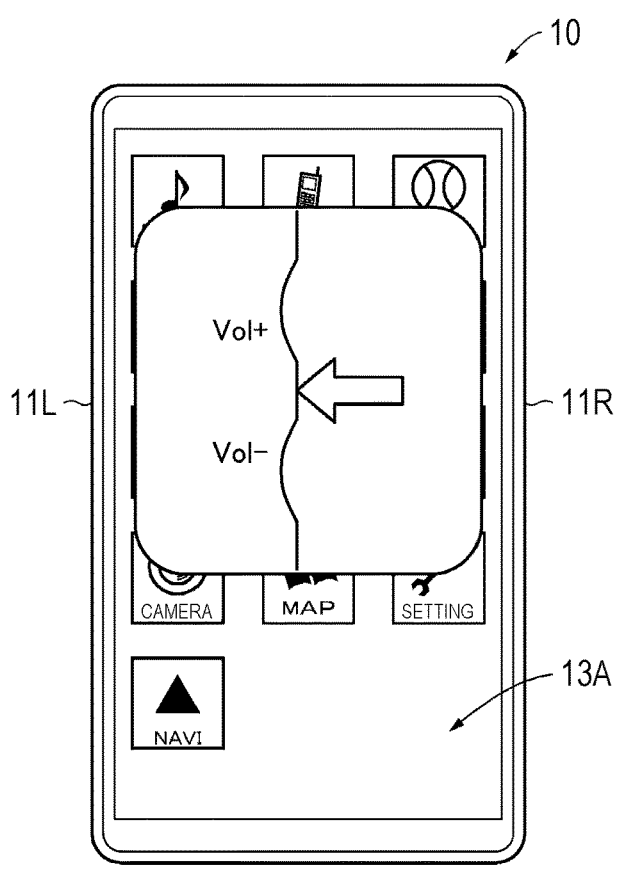

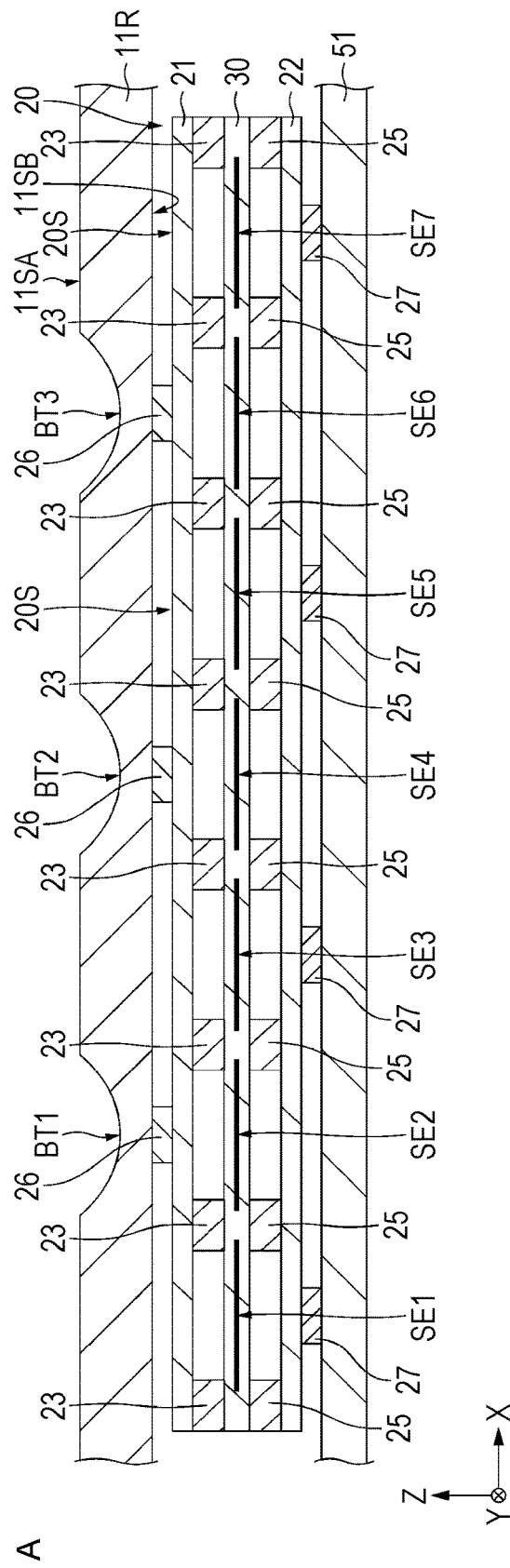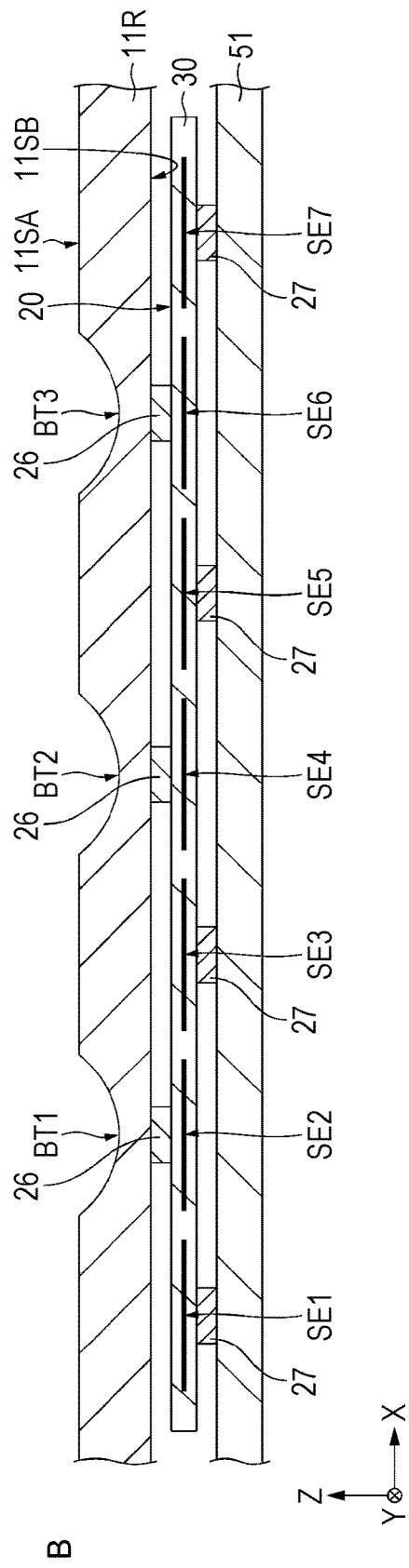
FIG. 15

FIG. 16
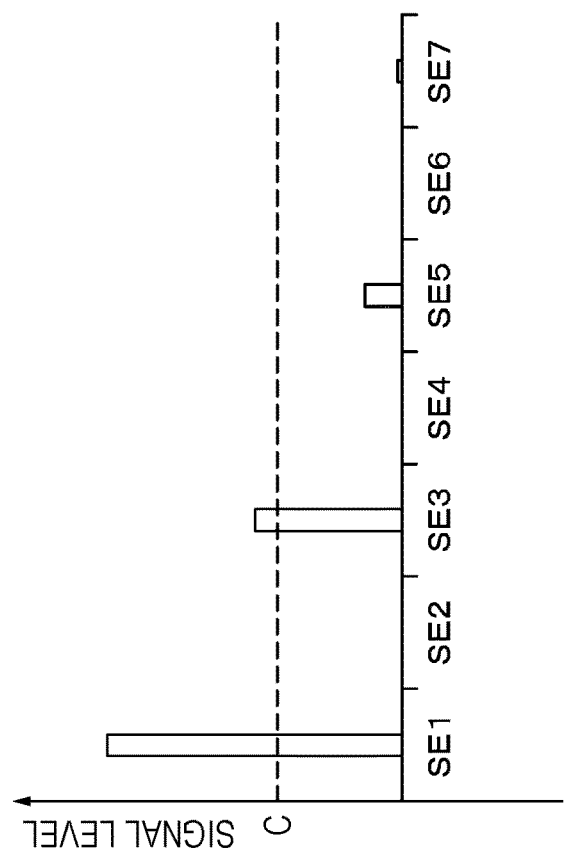
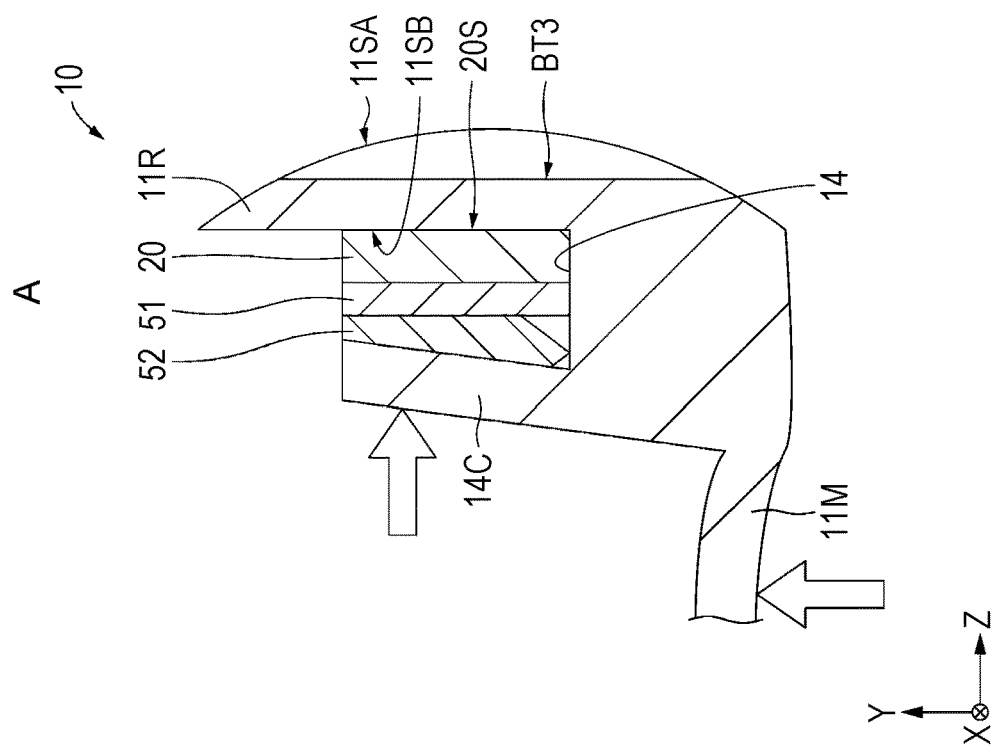

FIG. 18
A
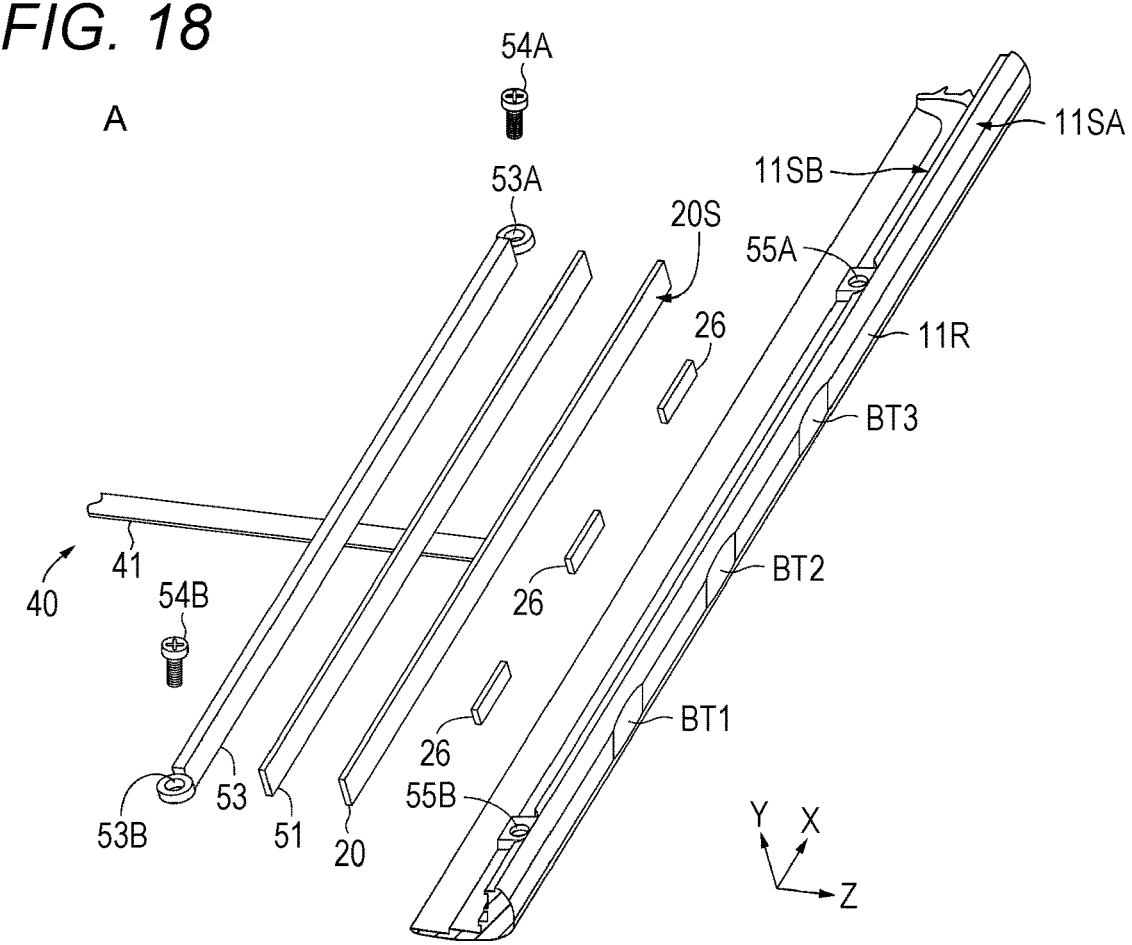
B
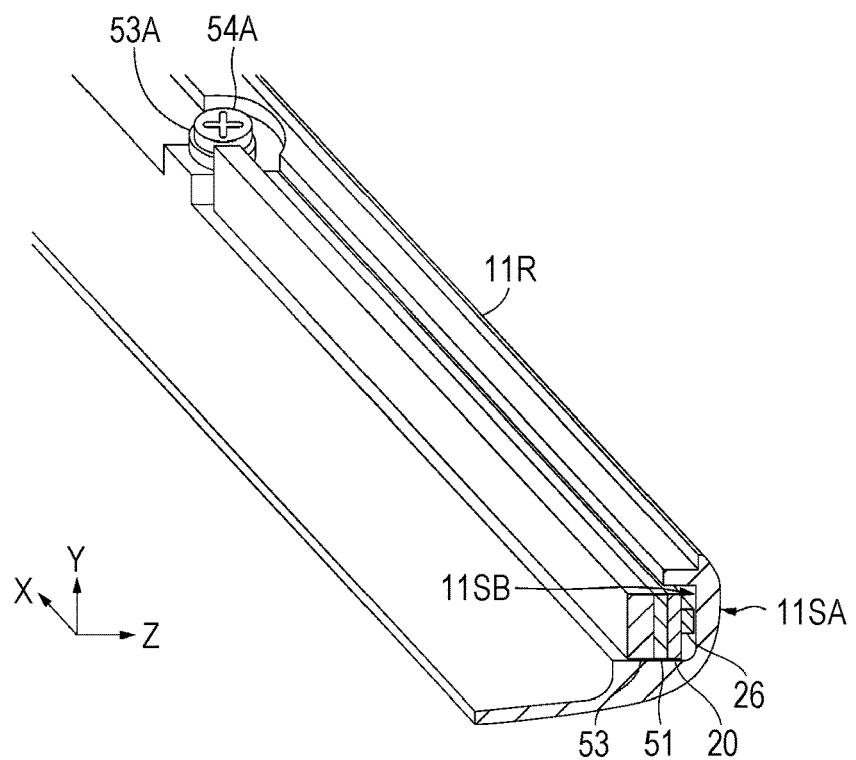

FIG. 19
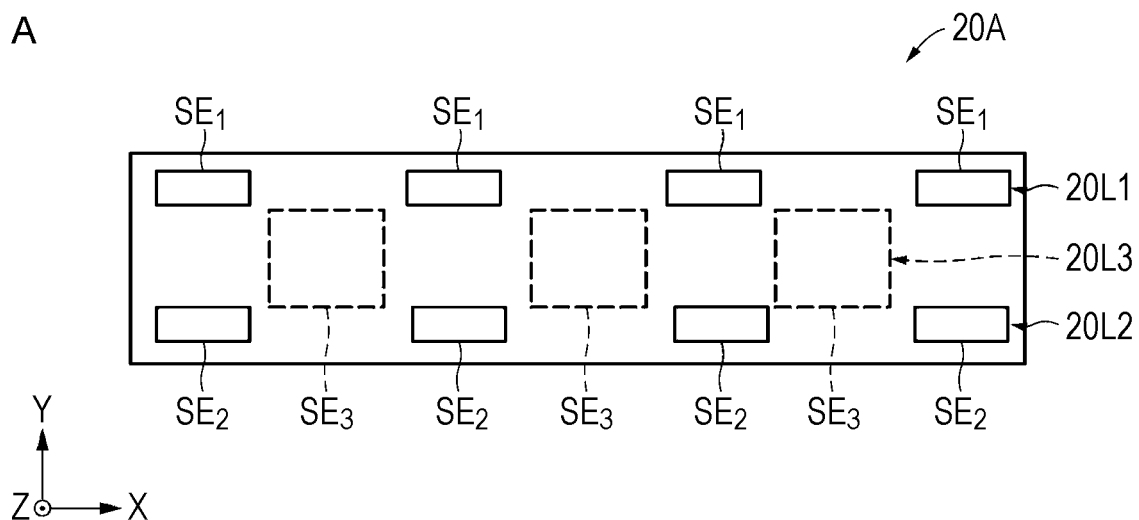
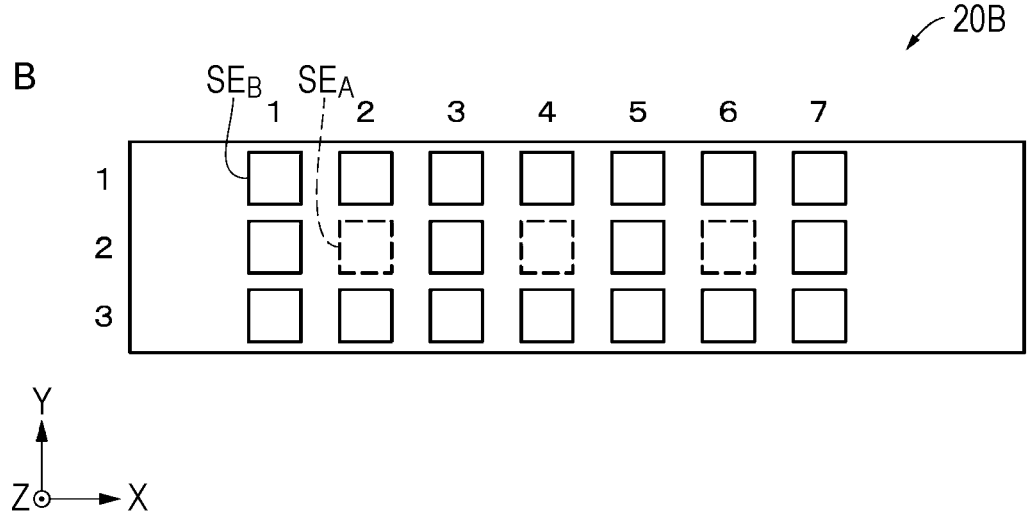

FIG. 20
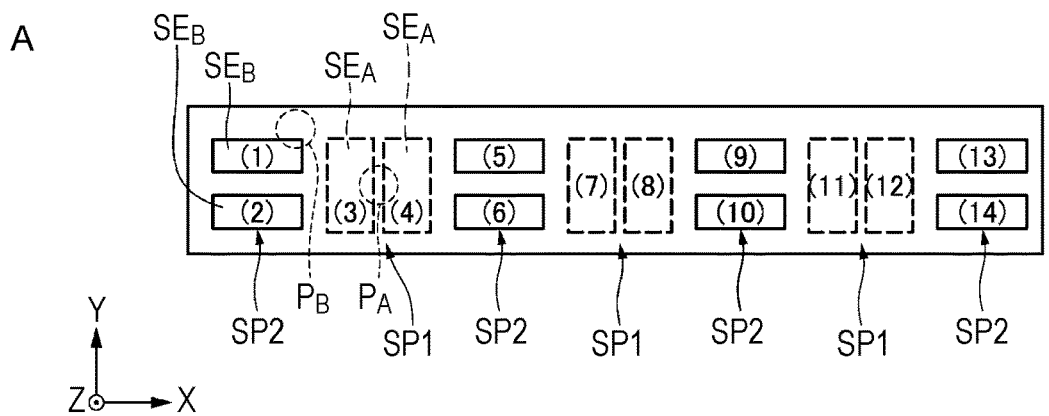
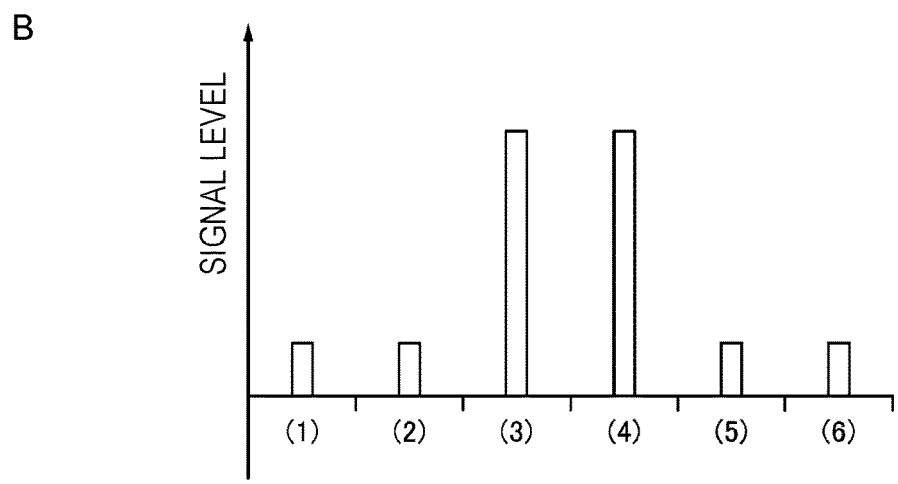
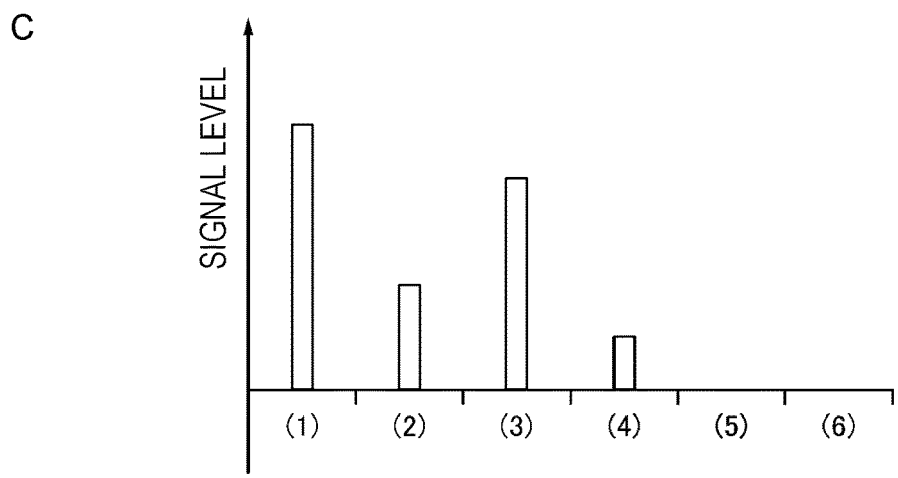

FIG. 24
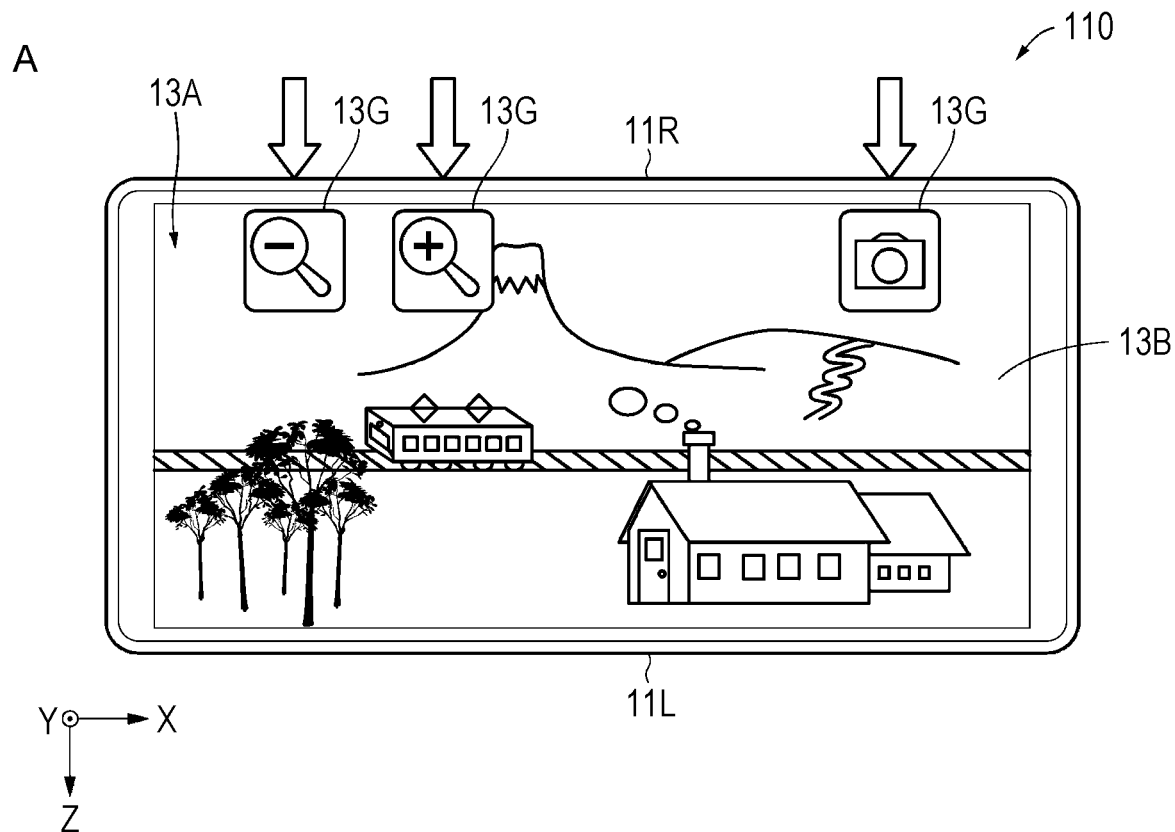
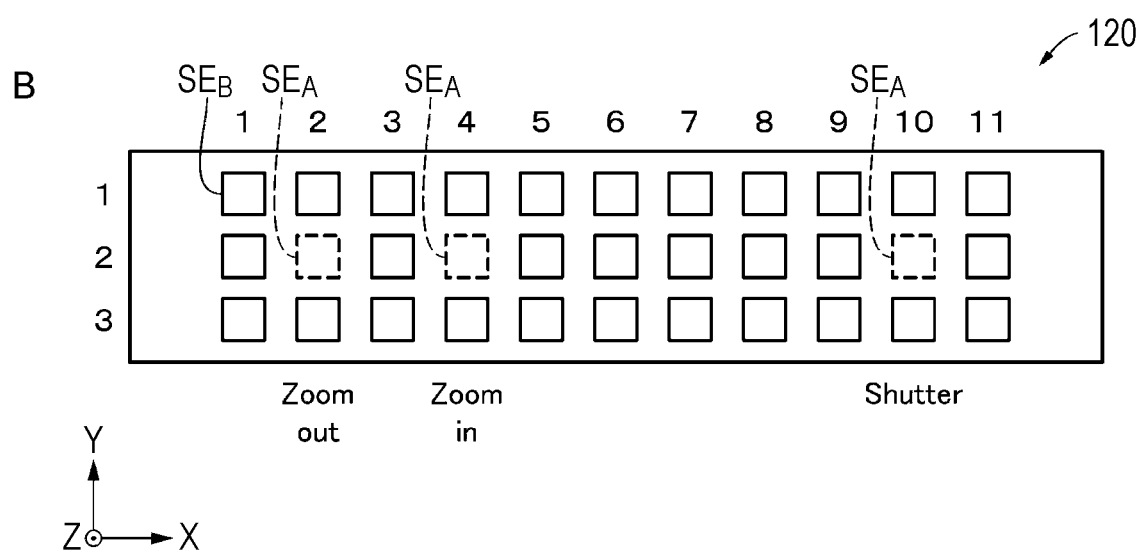

FIG. 25
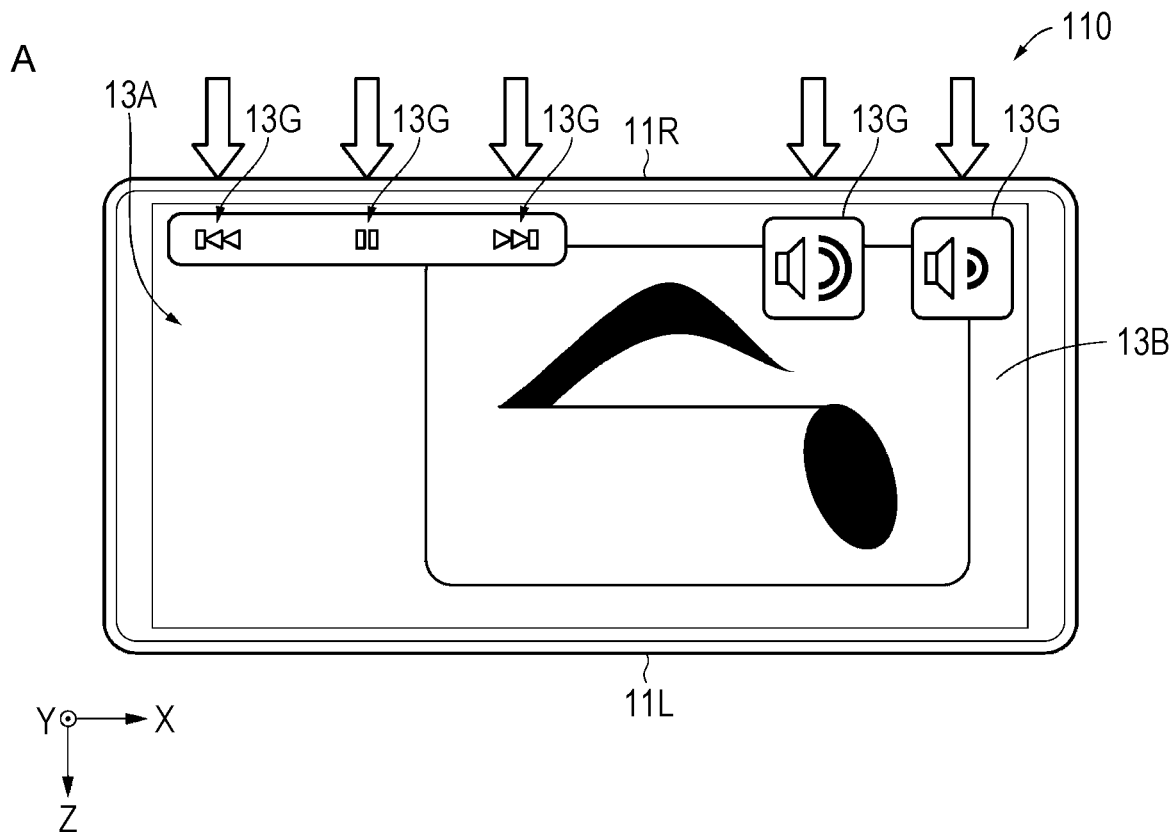
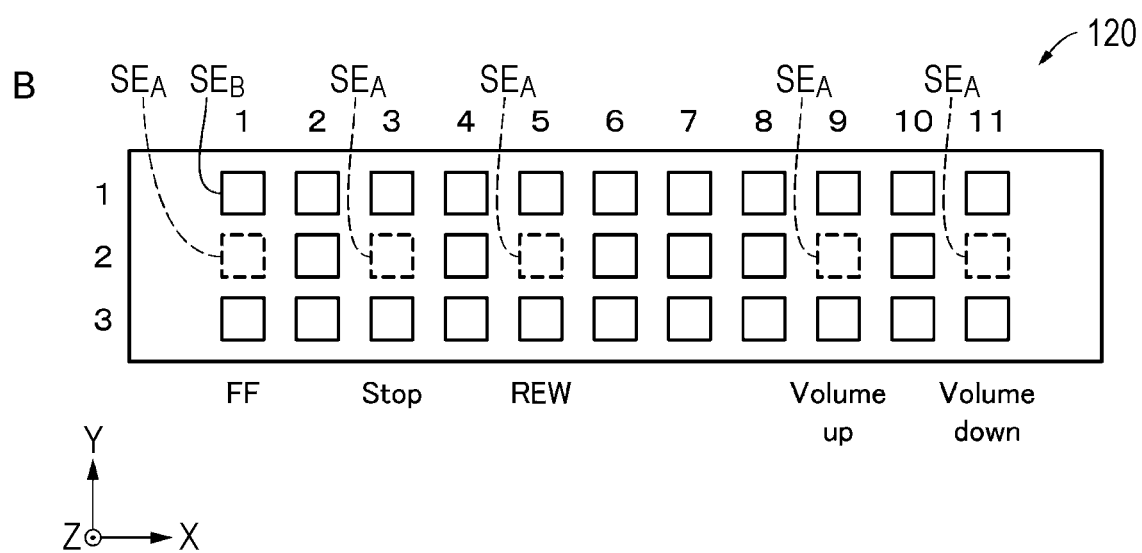

FIG. 26
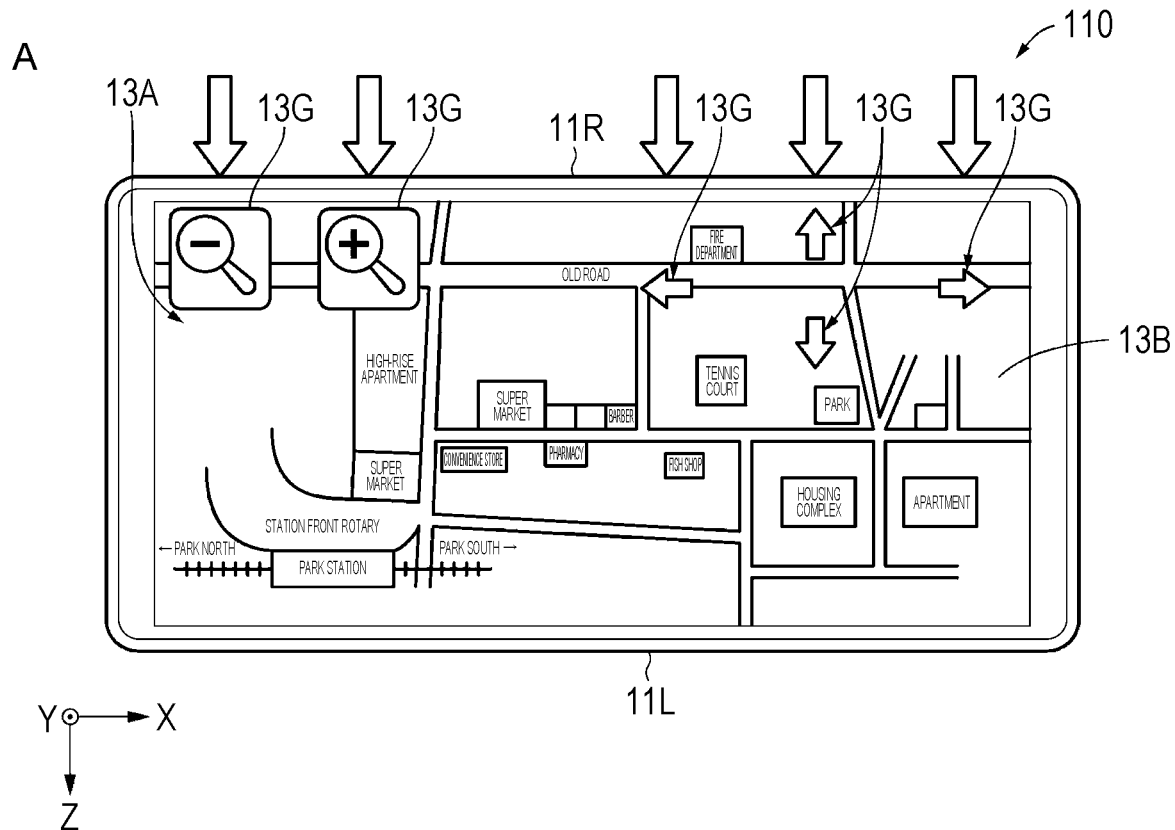
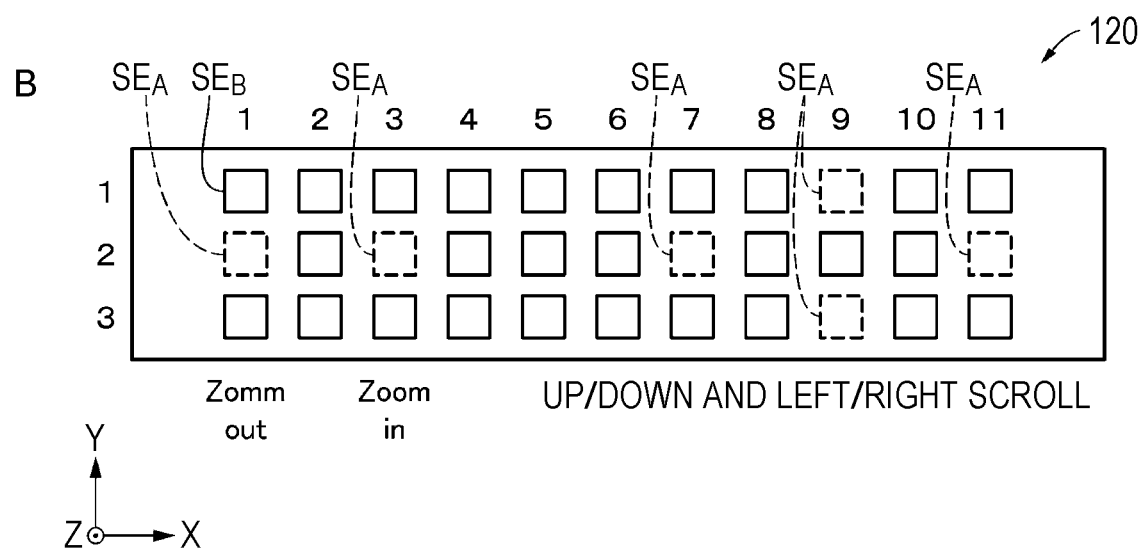

FIG. 29
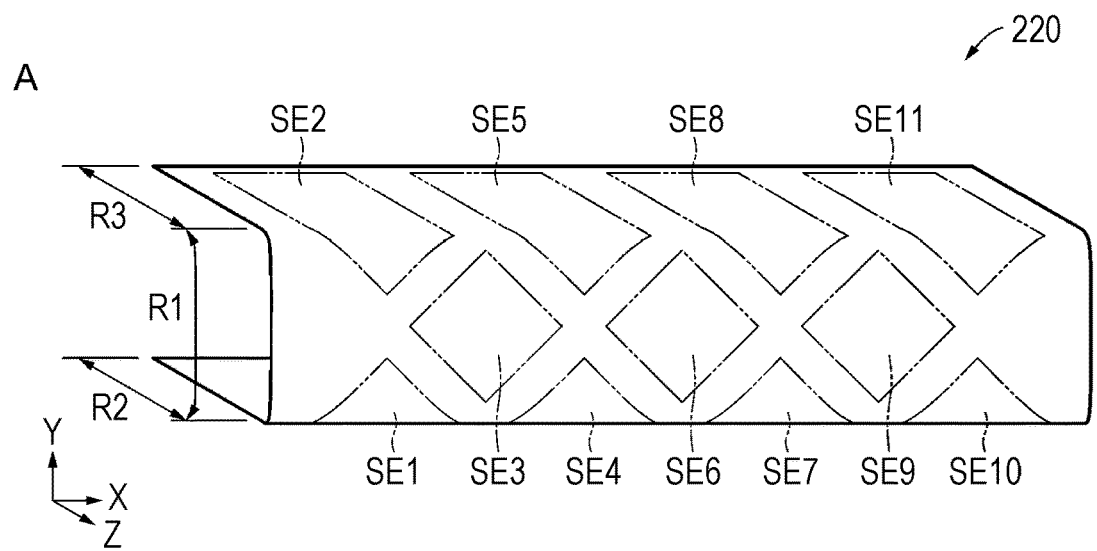
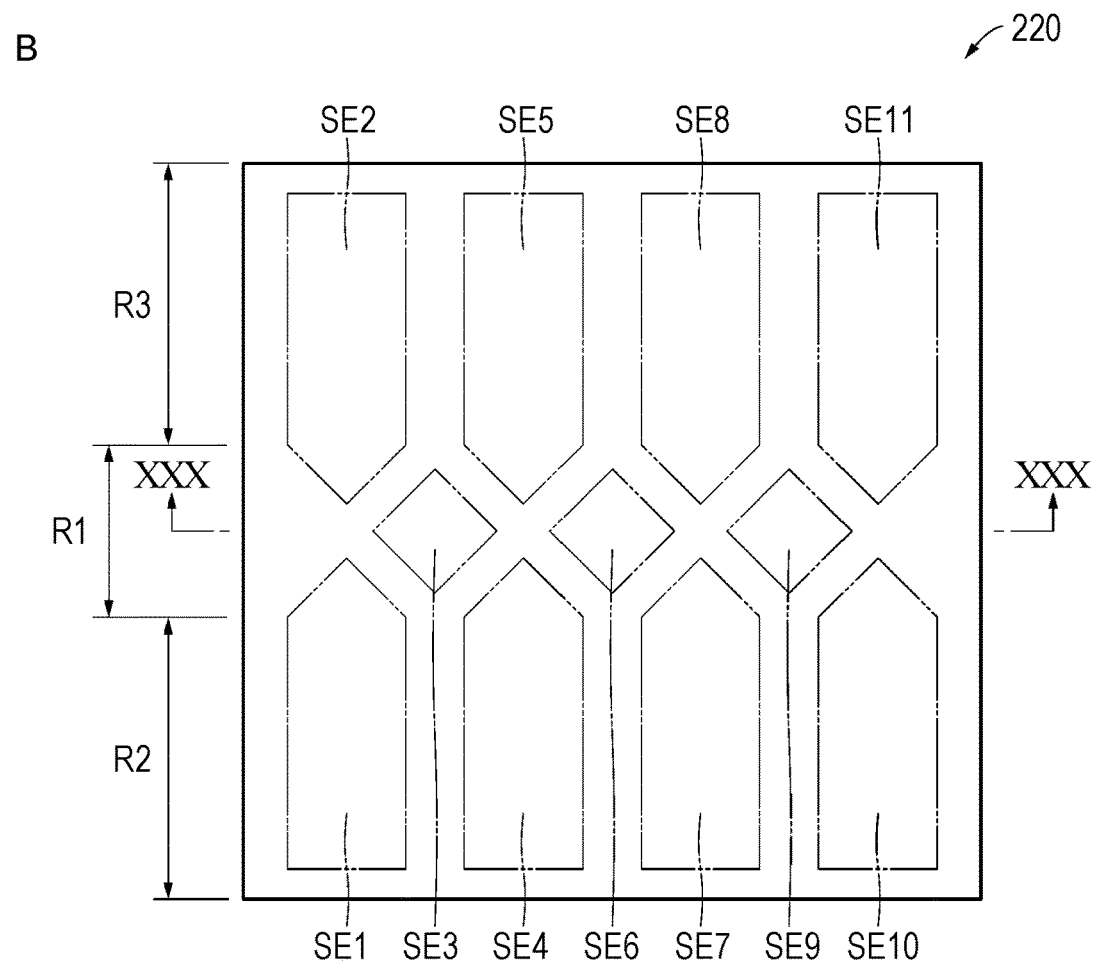

FIG. 32
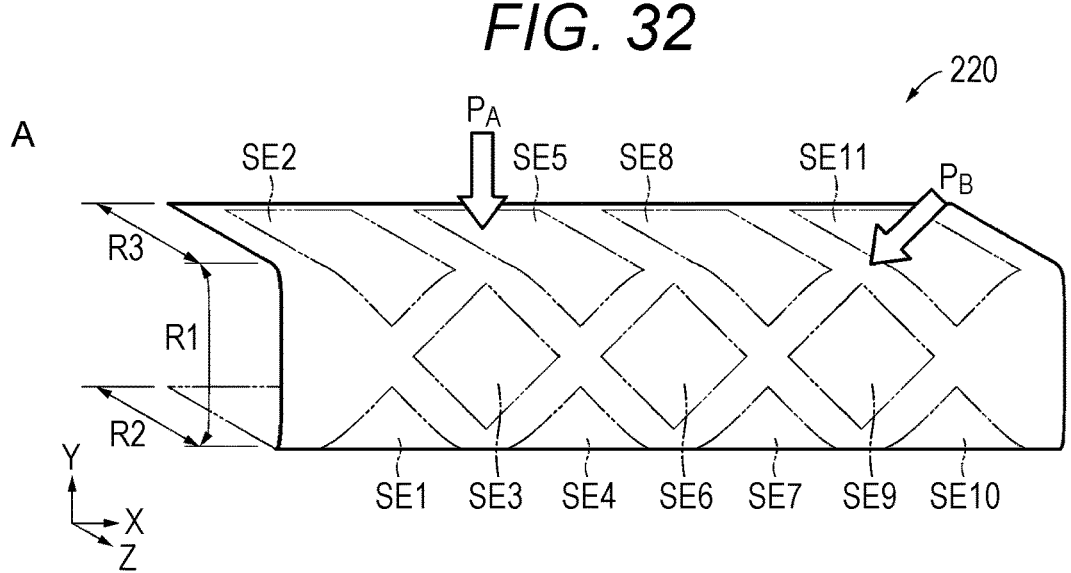
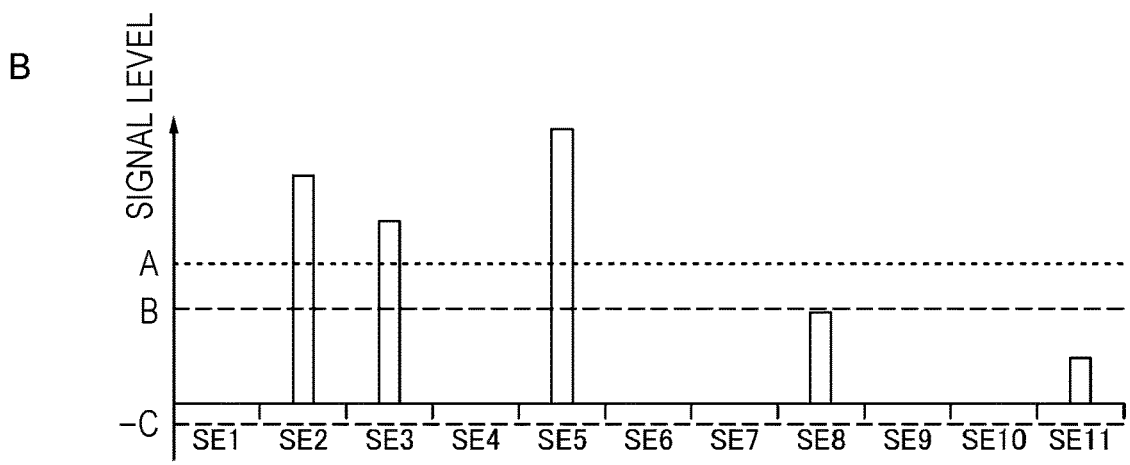
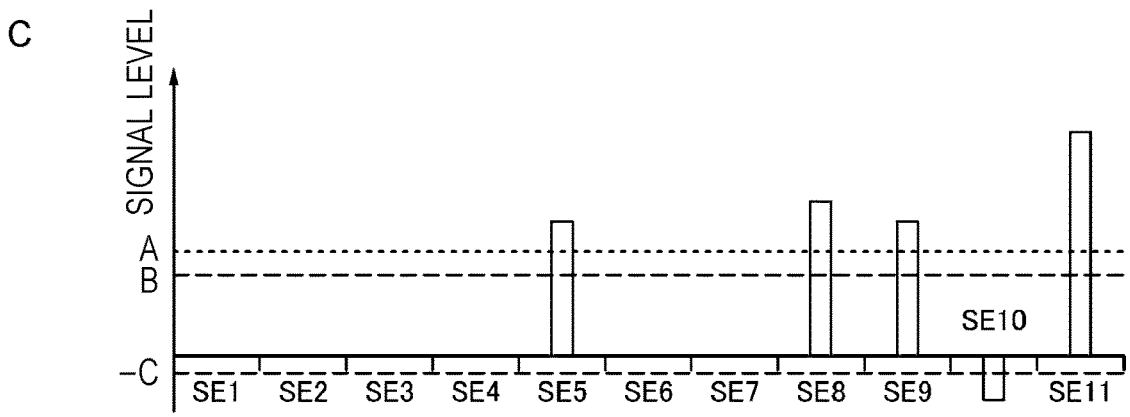

FIG. 35
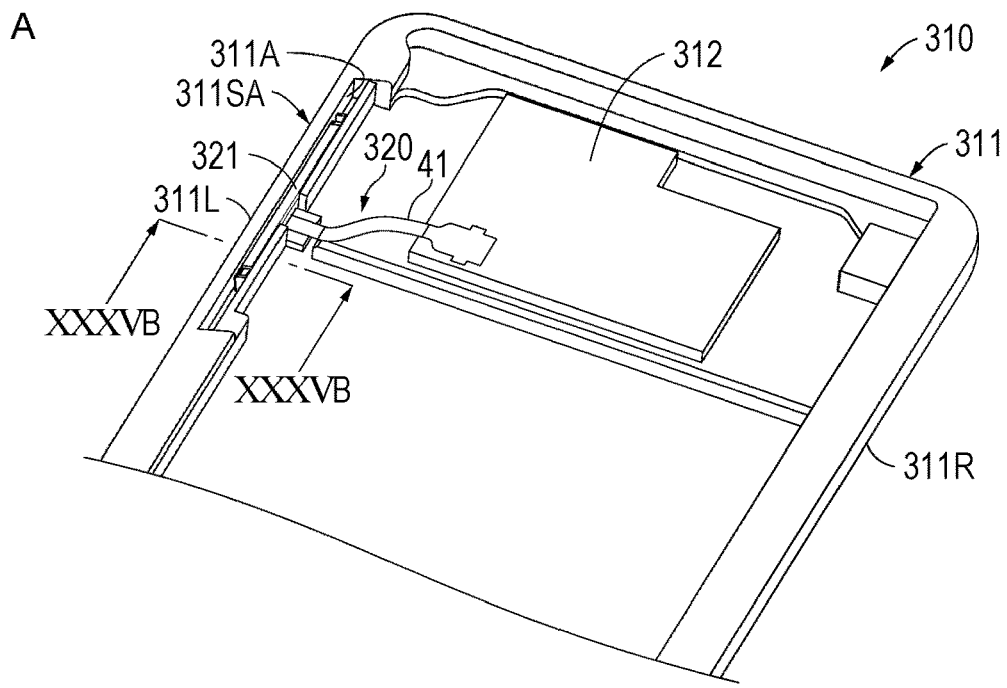
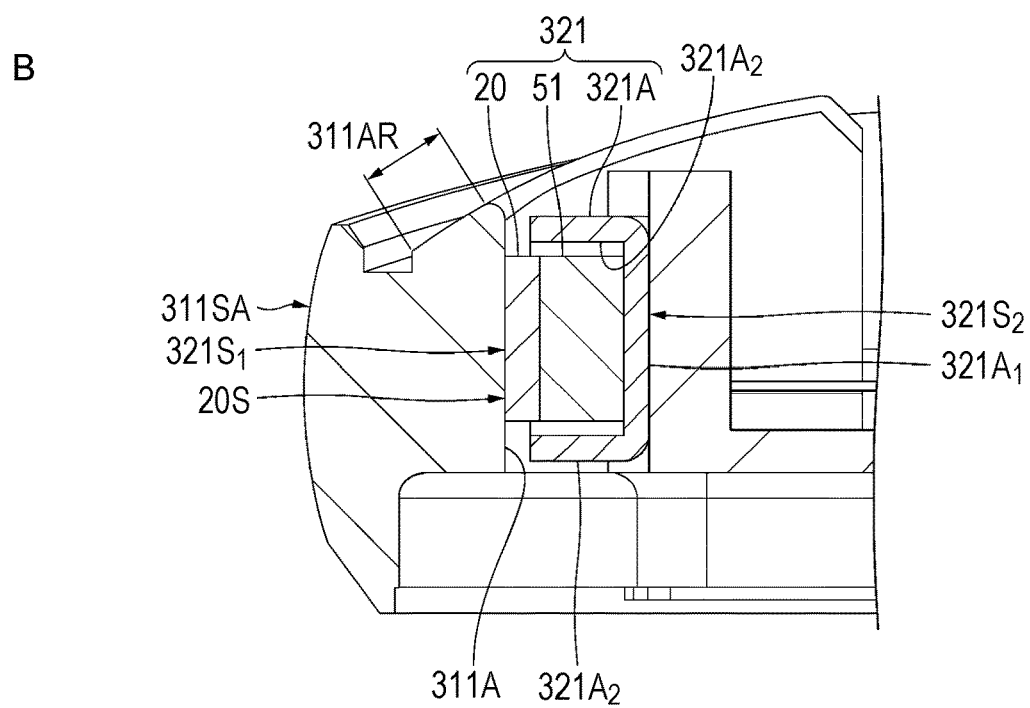

FIG. 39
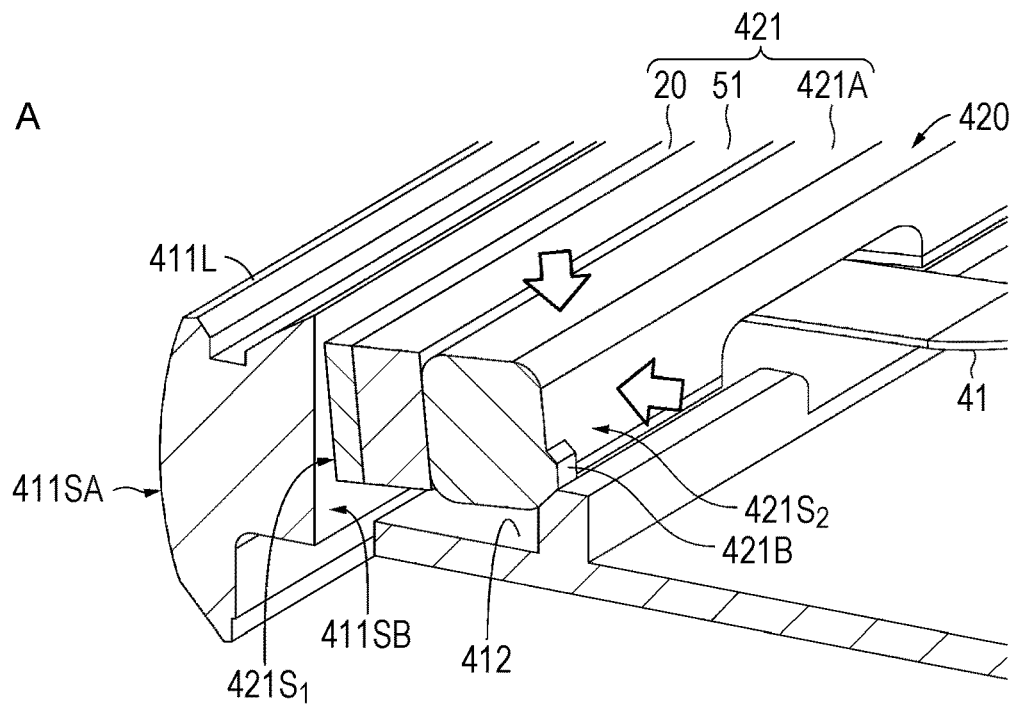
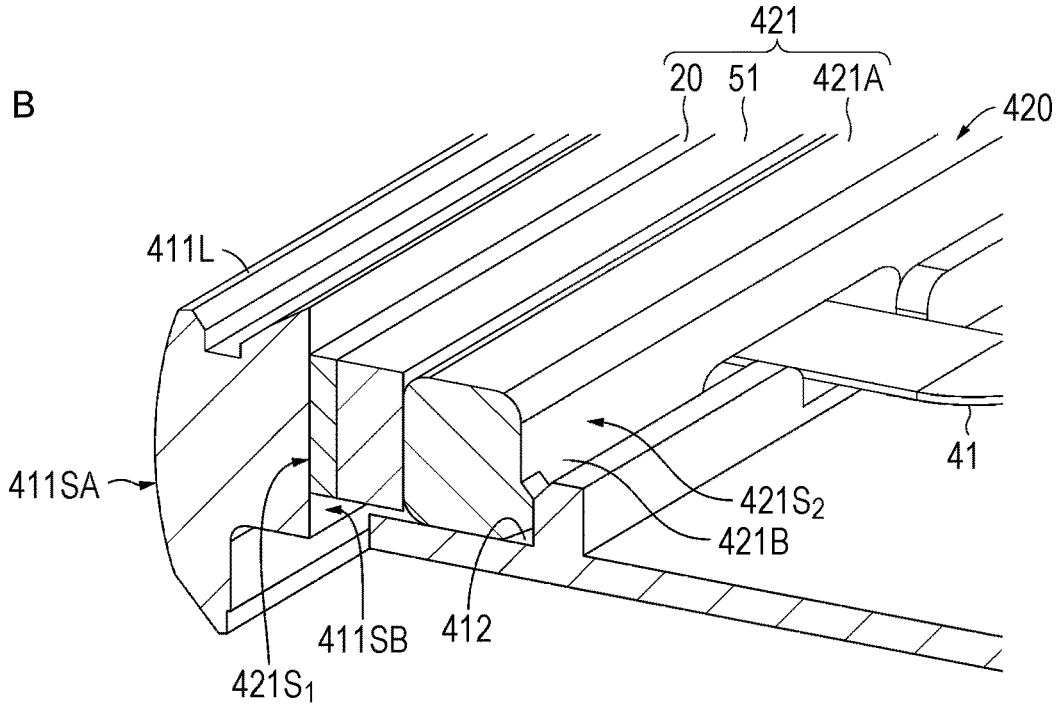

SENSOR AND ELECTRONIC DEVICE

TECHNICAL FIELD

The present disclosure relates to a sensor and an electronic device.

BACKGROUND ART

In recent years, electronic devices that can detect pressing on a surface of a housing have been proposed. For example, as one of such electronic devices, Patent Document 1 proposes one including a sheet-shaped pressure-sensitive sensor on an inner surface of a housing. As the pressure-sensitive sensor, there is used one provided with a conductive layer, a sensor layer including a plurality of sensor units, and a space layer provided between the conductive layer and the sensor layer.

CITATION LIST

Patent Document

Patent Document 1: International Publication No. 2016/143241

SUMMARY OF THE INVENTION

Problems to be Solved by the Invention

However, in the electronic device described in Patent Document 1, there is a possibility that the electronic device malfunctions in a case where an unintended deformation (for example, twisting or bending) is applied to the housing or in a case where an unintended position of the housing is pressed.

An object of the present disclosure is to provide a sensor and an electronic device that can suppress a malfunction.

Solutions to Problems

In order to solve the above-described problem, a first disclosure is an electronic device including: a housing; a sensor provided on an inner surface of the housing and configured to detect deformation of the housing; and a control unit configured to control an operation of the electronic device on the basis of a detection result of the sensor. The sensor has a first sensing unit configured to detect a prescribed user operation and a second sensing unit configured to compensate for a malfunction.

A second disclosure is an electronic device including: a housing; a sensor provided in the housing and configured to detect deformation of the housing; and a control unit configured to control an operation of the electronic device on the basis of a detection result of the sensor. The sensor has a first sensing unit configured to detect a prescribed user operation and a second sensing unit configured to compensate for a malfunction.

A third disclosure is a sensor provided on an inner surface of a housing and configured to detect deformation of the housing. The sensor has a first sensing unit configured to detect a prescribed user operation and a second sensing unit configured to compensate for a malfunction.

A fourth disclosure is a sensor provided in a housing and configured to detect deformation of the housing. The sensor has a first sensing unit configured to detect a prescribed user operation and a second sensing unit configured to compensate for a malfunction.

Effects of the Invention

According to the present disclosure, a malfunction of the electronic device can be suppressed. Note that the effects described herein are not necessarily limited, and any of the effects described in the present disclosure or an effect different from those is possible.

BRIEF DESCRIPTION OF DRAWINGS

FIG. 3A is a cross-sectional view taken along line IIIA-IIIA in FIG. 2. FIG. 3B is a cross-sectional view taken along line IIIB-IIIB in FIG. 2.

FIG. 8A is a schematic view showing an example in which a prescribed position is pressed. FIG. 8B is a graph showing an example of an output value of the sensing unit when a position shown in FIG. 8A is pressed.

FIG. 9A is a schematic view showing a direction of bending to be applied to the electronic device. FIG. 9B is a graph showing an example of an output value of the sensing unit when bending is applied in a direction shown in FIG. 9A.

FIG. 10A is a schematic view showing a direction of twisting applied to the electronic device. FIG. 10B is a graph showing an example of an output value of the sensing unit when twisting is applied in a direction shown in FIG. 10A.

FIG. 11A is a schematic view showing an example in which a portion other than a prescribed position is pressed. FIG. 11B is a graph showing an example of an output value of the sensing unit when a position shown in FIG. 11A is pressed.

FIG. 13A is a schematic view showing an example of a warning screen that informs a user that bending or twisting has been applied to the electronic device. FIG. 13B is a schematic view showing an example of a warning screen that informs the user that a correct position is not pressed.

FIGS. 15A and 15B are cross-sectional views showing a configuration of an electronic device according to a modified example of the first embodiment of the present disclosure.

FIG. 16A is a cross-sectional view showing a state when a bottom part of the electronic device is pressed. FIG. 16B is a graph showing an example of a detection signal of each sensing unit in a state shown in FIG. 16A.

FIG. 18A is an exploded perspective view showing a configuration of a sensor support unit. FIG. 18B is a perspective view showing a configuration of the sensor support unit.

FIGS. 19A and 19B are plan views showing a modified example of the sensor.

FIG. 20A is a plan view showing a modified example of the sensor. FIG. 20B is a graph showing a detection signal when a position PA shown in FIG. 20A is pressed. FIG. 20C is a graph showing a detection signal when a position PB shown in FIG. 20A is pressed.

FIG. 24A is a schematic view showing an example of a screen in using a camera application. FIG. 24B is a schematic view showing an example of mapping setting of the sensing unit in using the camera application.

FIG. 25A is a schematic view showing an example of a screen in using a music application. FIG. 25B is a schematic view showing an example of mapping setting of the sensing unit in using the music application.

FIG. 26A is a schematic view showing an example of a screen in using a map application. FIG. 26B is a schematic view showing an example of mapping setting of the sensing unit in using the map application.

FIG. 29A is a perspective view showing a configuration of the sensor. FIG. 29B is a plan view showing the sensor in a state of being developed in a flat shape.

FIG. 32A is a perspective view showing an example of a pressing position for a sensor. FIG. 32B is a graph showing a detection signal when a position PA shown in FIG. 32A is pressed. FIG. 32C is a graph showing a detection signal when a position PB shown in FIG. 32A is pressed.

FIG. 35A is a perspective view showing an internal configuration of an electronic device according to a fourth embodiment of the present disclosure. FIG. 35B is a cross-sectional view taken along line XXXVB-XXXVB in FIG. 35A.

FIG. 39A and FIG. 39B are perspective views for explaining a method for attaching the sensor module.

MODE FOR CARRYING OUT THE INVENTION

Figure 1:
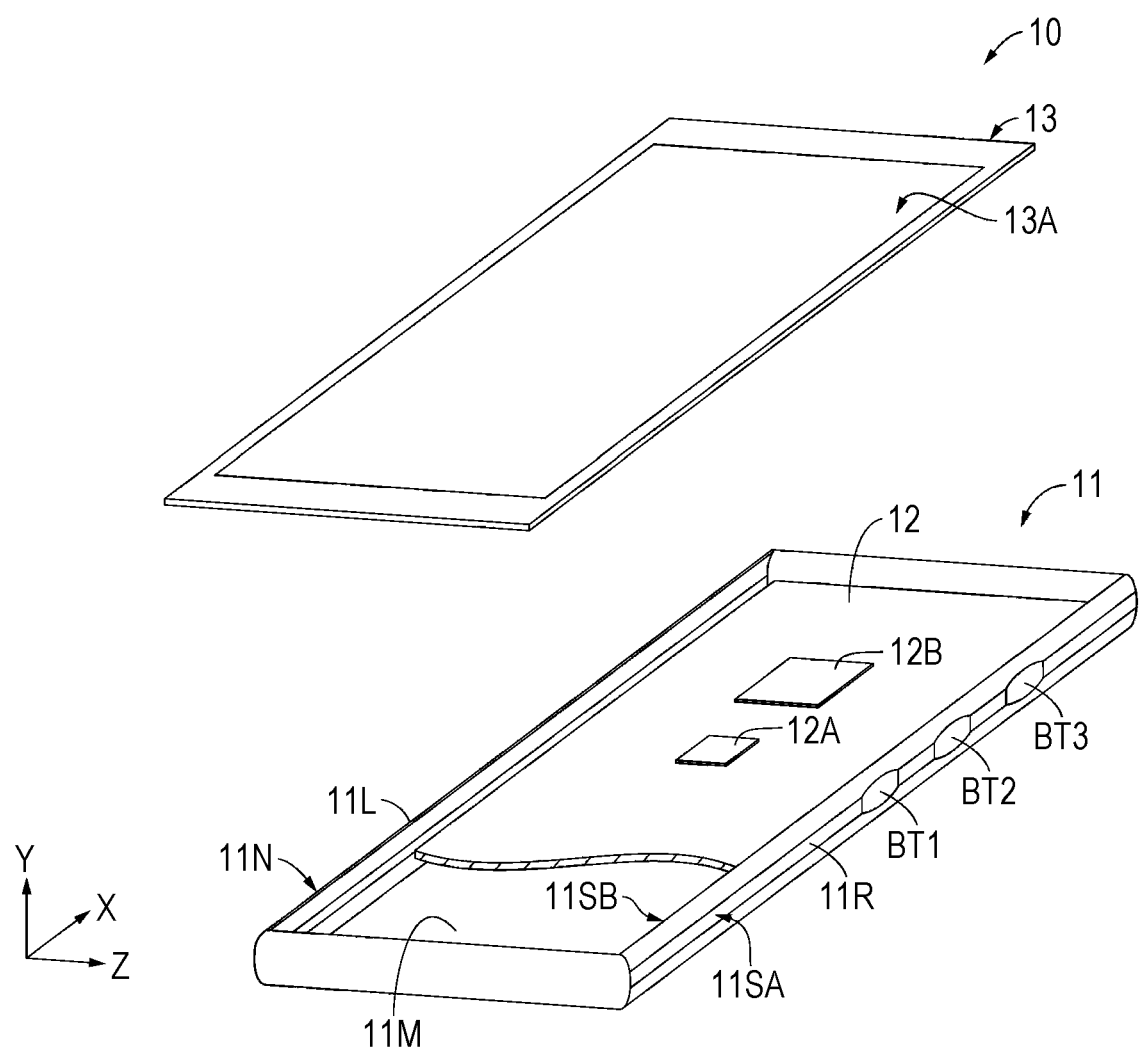
FIG. 1 is an exploded perspective view showing a configuration of an electronic device according to a first embodiment of the present disclosure.

Embodiments of the present disclosure will be described in the following order. Note that, in all the drawings of the following embodiments, the same or corresponding parts are denoted by the same reference numerals.

1 First embodiment (example of electronic device)
2 Second embodiment (example of electronic device)
3 Third embodiment (example of electronic device)
4 Fourth embodiment (example of electronic device)
5 Fifth embodiment (example of electronic device)
6 Sixth embodiment (example of electronic device)
7 Seventh embodiment (example of electronic device)

1 First Embodiment

[Configuration of Electronic Device]

FIG. 1 shows a configuration of an electronic device 10 according to a first embodiment. The electronic device 10 according to the first embodiment is a so-called smartphone, and includes: a housing 11 as an exterior body having a thin box shape with one main surface opened; a board 12 accommodated in the housing 11; and a front panel 13 provided so as to close the one opened main surface.

(Housing)

The housing 11 includes a rectangular plate-shaped bottom part 11M forming a back surface of the electronic device 10, and a wall part 11N provided on a periphery of the bottom part 11M. The wall part 11N stands upright with respect to the bottom part 11M, and has side wall parts 11R and 11L provided on both long edge sides of the bottom part 11M. A thickness of the housing 11 is preferably 1 mm or more, for example, 1.08 mm or 1.4 mm.

An outer surface 11SA of the side wall part 11R has buttons BT1, BT2, and BT3 provided to be aligned in one line in a length direction of the side wall part 11R (that is, a circumferential direction of the wall part 11N). Each position of the buttons BT1, BT2, and BT3 is provided with a depression. The buttons BT1, BT2, and BT3 are, for example, a volume down button, a volume up button, and a power button, respectively.

Figure 2:
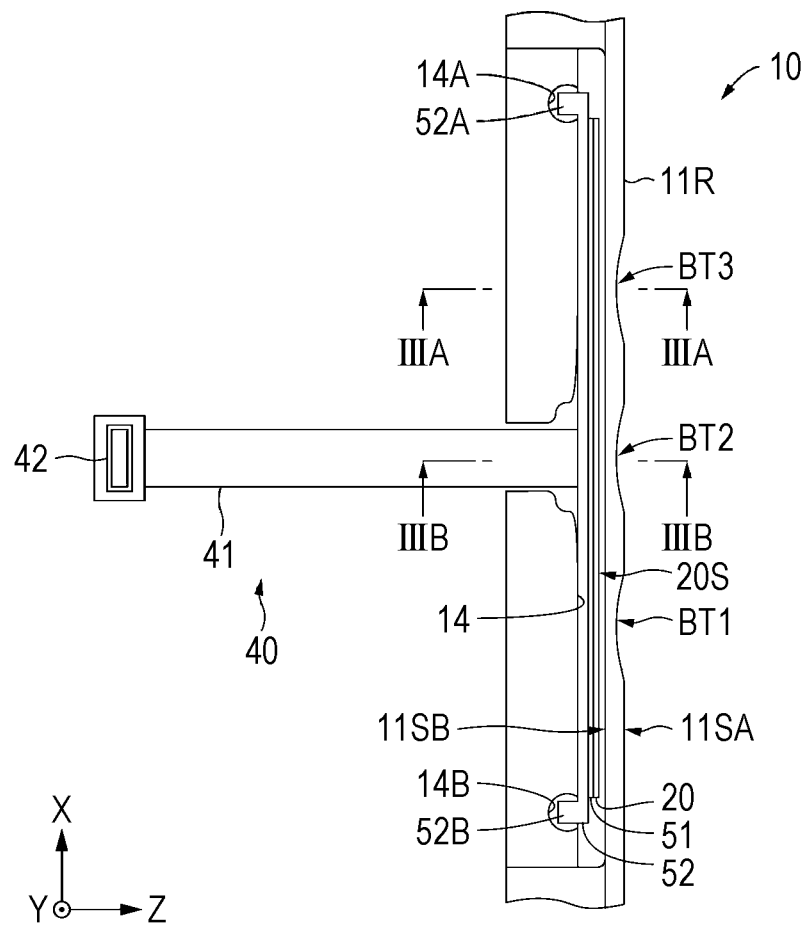
FIG. 2 is an enlarged plan view showing a part of a side wall part.

As shown in FIGS. 2, 3A, and 3B, the housing 11 includes a groove part 14 provided along an inner surface 11SB of the side wall part 11R. This groove part 14 accommodates an elongated sensor 20 having a film shape, a long elastic body 51 having a film shape, and a long spacer 52 having a film shape such that individual main surfaces thereof are parallel to the inner surface 11SB. Note that, in the present disclosure, the film also includes a sheet. Furthermore, at least one of the sensor 20, the elastic body 51, or the spacer 52 may have a plate shape.

In the groove part 14, the sensor 20, the elastic body 51, and the spacer 52 are layered in the order of the sensor 20, the elastic body 51, and the spacer 52 in a direction away from the inner surface 11SB side. The elastic body 51 may be bonded to the sensor 20 with an adhesive layer such as a double-sided adhesive tape and the like. Note that, in the present specification, a longitudinal direction of the sensor 20 is referred to as a ±X-axis direction, a width direction (short direction) is referred to as a ±Y-axis direction, and a direction perpendicular to the longitudinal direction and the width direction (that is, a direction perpendicular to a sensing surface 20S) is referred to as a ±Z-axis direction.

(Sensor)

Figure 4:
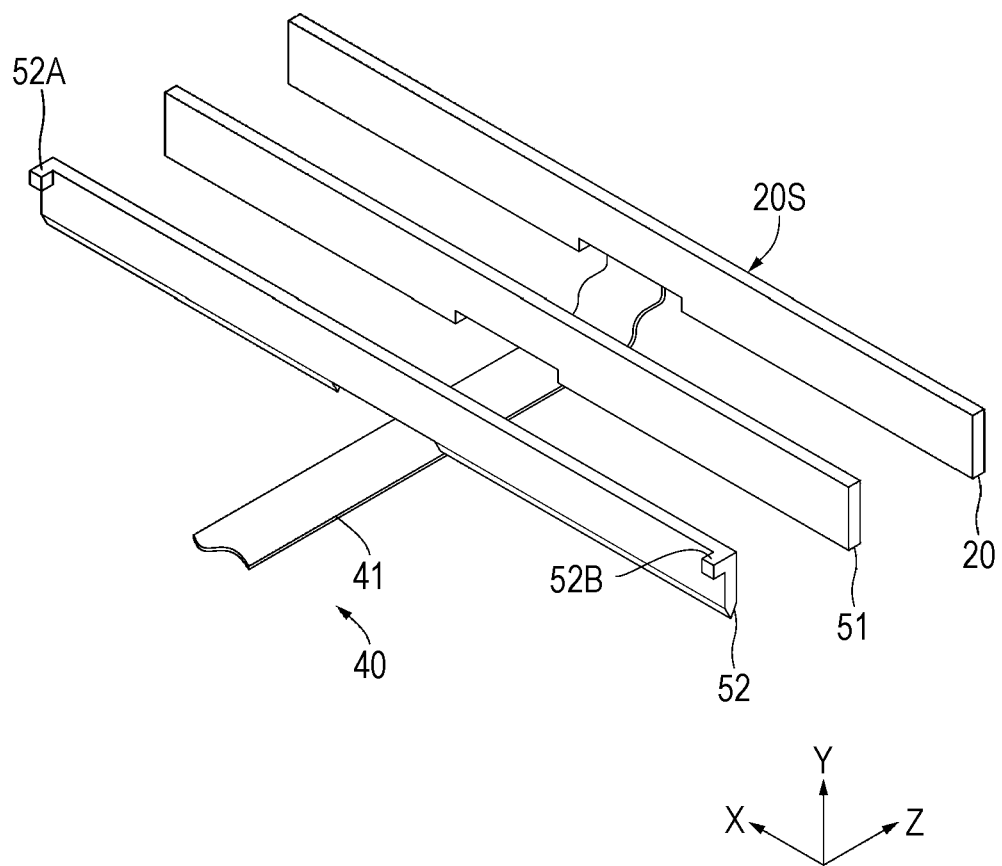
FIG. 4 is an exploded perspective view showing a configuration of a sensor support unit.

The sensor 20 is an electrostatic capacity type pressure-sensitive sensor. In the first embodiment, a pressure-sensitive sensor of a mutual-capacitance type is used as the an electrostatic capacity type pressure-sensitive sensor. As shown in FIG. 4, the sensor 20 has an elongated rectangular shape, and a connecting part 41 is extended from a center of one long edge of the sensor 20. As shown in FIG. 2, a connector 42 is provided at a tip end of the extended connecting part 41, and this connector 42 is connected to a connector (not shown) provided on the board 12. One main surface of the sensor 20 is the sensing surface 20S configured to detect pressing, and the sensor 20 is accommodated in the groove part 14 such that the sensing surface 20S is pressed against the inner surface 11SB. Note that, in the present specification, among the two main surfaces of the sensor 20, a main surface on a side opposite to the sensing surface 20S is referred to as a back surface.

The sensor 20 and the connecting part 41 are integrally configured by one FPC 40 having a T shape. By adopting such a configuration, the number of parts can be reduced. Furthermore, impact durability of the connection between the sensor 20 and the board 12 can be improved. However, the sensor 20 and the connecting part 41 may be configured separately. In a case of this configuration, the sensor 20 may be configured by, for example, a rigid board or a rigid flexible board.

Figure 5:
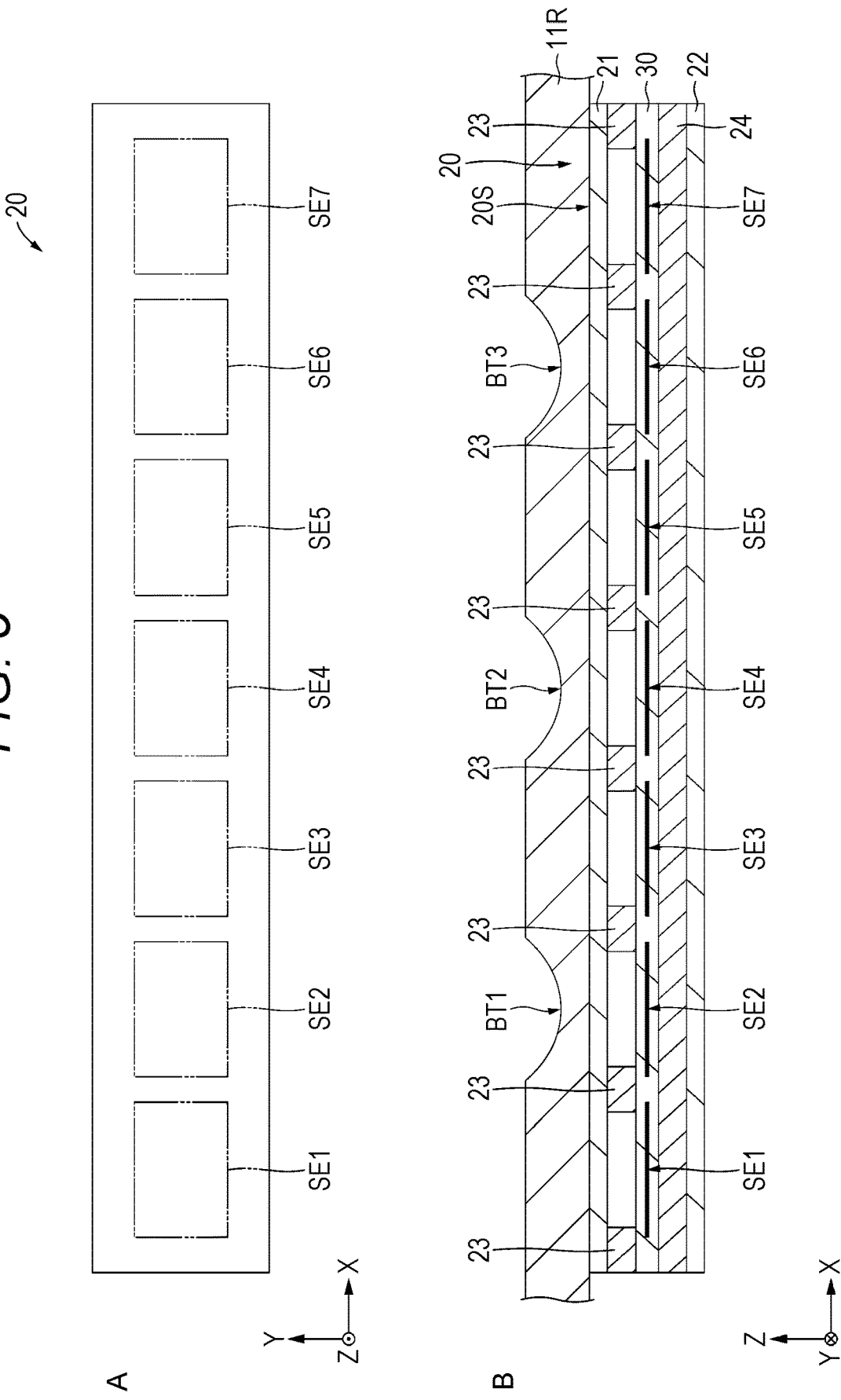
FIG. 5A is a schematic view showing an arrangement of a sensing unit included in a sensor.
FIG. 5B is a cross-sectional view showing a configuration of the sensor.

FIG. 5A is a plan view showing a configuration of the sensor 20. As shown in FIG. 5A, the sensor 20 includes sensing units SE1 to SE7 arranged in one line with equal intervals in the longitudinal direction of the sensor 20. However, the intervals between the sensing units SE1 to SE7 are not limited to equal intervals, and the arrangement may be with unequal intervals in accordance with desired characteristics. Note that, in the following description, the sensing units SE1 to SE7 may be referred to as a sensing unit SE in a case of not being particularly distinguished. Furthermore, there may be a case where detection signals detected respectively by the sensing units SE1 to SE7 are referred to as detection signals S1 to S7.

The sensing units SE2, SE4, and SE6 each are first sensing units (hereinafter may also be referred to as "sensing units for user operation detection") for detection of a user operation (prescribed user operation) by pressing of the buttons BT1, BT2, and BT3. The sensing units SE1, SE3, SE5, and SE7 each are second sensing units (hereinafter, may also be referred to as "sensing units for malfunction compensation") for compensation for a malfunction of the electronic device 10. The sensing unit SE3 for malfunction compensation is provided between the adjacent sensing units SE2 and SE4 for user operation detection. Furthermore, the sensing unit SE5 for malfunction compensation is provided between the adjacent sensing units SE4 and SE6 for user operation detection.

The sensing units SE2, SE4, and SE6 are provided at positions corresponding to the buttons BT1, BT2, and BT3, respectively, and detect pressing of the buttons BT1, BT2, and BT3. The sensing units SE3 and SE5 are provided at positions corresponding to between the buttons BT1 and BT2 and between the buttons BT2 and BT3, respectively, and detect pressing between the buttons BT1 and BT2 and pressing between the buttons BT2 and BT3. The sensing unit SE1 is provided at a position opposite to the button BT2 among positions on both sides of the button BT1, and the sensing unit SE7 is provided at a position on a side opposite to the button BT2 among positions on both sides of the button BT3. Therefore, pressing is detected at positions outside the both ends of the buttons BT1, BT2, and BT3 arranged in one line.

FIG. 5B is a cross-sectional view showing a configuration of the sensor. The sensor 20 includes a sensor electrode layer 30 having sensing units SE1 to SE7, metal layers 21 and 22, a plurality of supports 23 having a columnar shape, and an adhesive layer 24. A width of the sensor 20 is preferably about 2 mm or more and about 4 mm or less, for example, about 2.5 mm. A thickness of the sensor 20 including a mounting structure is preferably 2 mm or less, for example 1.53 mm.

The metal layer 21 and the sensor electrode layer 30 are arranged such that main surfaces of the metal layer 21 and the sensor electrode layer 30 face each other. The plurality of supports 23 is provided between the main surfaces of the metal layer 21 and the sensor electrode layer 30, and support the metal layer 21 on one main surface of the sensor electrode layer 30 such that the metal layer 21 and the sensor electrode layer 30 are separated from each other. The plurality of supports 23 forms a support layer between the main surfaces of the metal layer 21 and the sensor electrode layer 30.

The metal layer 22 and the sensor electrode layer 30 are arranged such that main surfaces of the metal layer 22 and the sensor electrode layer 30 face each other. The adhesive layer 24 is provided between the metal layer 22 and the sensor electrode layer 30, and bonds the metal layer 22 and the sensor electrode layer 30 together.

The sensor 20 further includes: a first conductive member such as an anisotropic conductive film (ACF) that connects a first ground pad of the sensor electrode layer 30 and the metal layer 21; and a second conductive member such as an ACF that connects a second ground pad of the sensor electrode layer 30 and the metal layer 22. The metal layer 21 is grounded via the first conductive member and the first ground pad, and is set to a ground potential. Furthermore, the metal layer 22 is grounded via the second conductive member and the second ground pad, and is set to a ground potential.

(Metal Layer)

The metal layers 21 and 22 are so-called reference electrodes, and are grounded and set to a ground potential. The metal layers 21 and 22 are, for example, metal plates having a flexibility. The metal layers 21 and 22 include, for example, a single component such as aluminum, titanium, zinc, nickel, magnesium, copper, and iron, or an alloy containing two or more of these. Specific examples of the alloy include stainless steel (SUS), aluminum alloy, magnesium alloy, titanium alloy, and the like.

(Support)

The plurality of supports 23 is arranged in one line with predetermined intervals in the longitudinal direction of the sensor 20 such that the metal layer 21 can be supported at positions corresponding to both ends of the sensing unit SE. Specifically, the support 23 is provided so as to be placed on a position between adjacent sensing units SE in a thickness direction (Z-axis direction) of the sensor 20. The support 23 is made by, for example, an adhesive or a double-sided adhesive tape having insulating properties. As the adhesive, for example, an ultraviolet curable resin, a thermosetting resin, and the like can be used. The support 23 may be elastically deformed by pressure applied to the sensing surface 20S.

(Adhesive Layer)

The adhesive layer 24 is an example of a support layer. The adhesive layer 24 bonds the metal layer 22 and the sensor electrode layer 30 together, and supports the sensor electrode layer 30 on one main surface of the metal layer 22 such that the metal layer 22 and the sensor electrode layer 30 are separated from each other. The adhesive layer 24 is made by, for example, an adhesive or a double-sided adhesive tape having insulating properties. The adhesive layer 24 may be elastically deformed by pressure applied to the sensing surface 20S. Specific examples of the double-sided adhesive tape include a double-sided tape under the trade name Neo Fix manufactured by Nichiei Kakoh Co., Ltd. Note that, in the present specification, a pressure sensitive adhesion is defined as a kind of adhesion. According to this definition, a pressure sensitive layer is regarded as a kind of adhesive layer.

(Sensor Electrode Layer)

Figure 6:
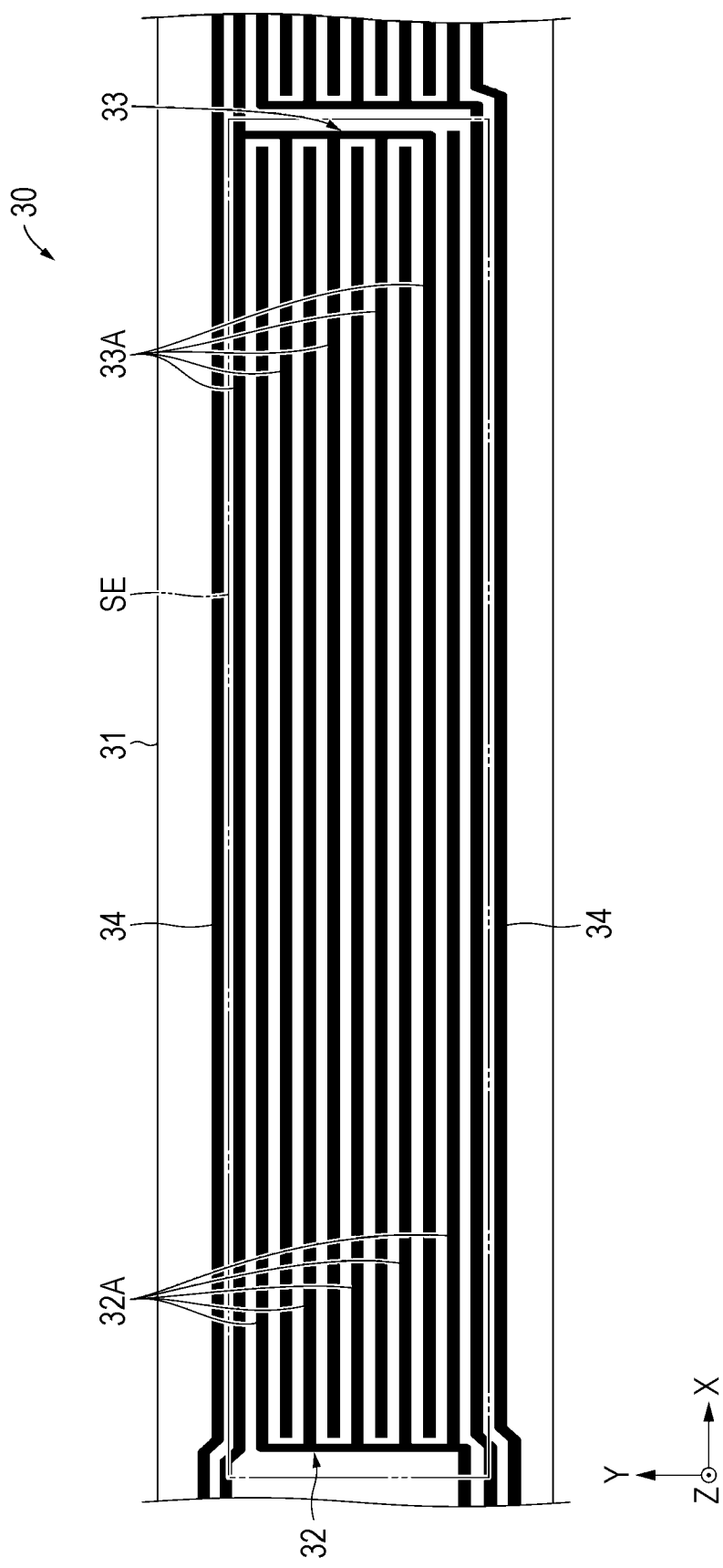
FIG. 6 is a plan view showing a configuration of the sensing unit.

As shown in FIG. 6, the sensor electrode layer 30 includes a base material 31, and first and second electrodes 32 and 33 provided on one main surface of the base material 31. These first and second electrodes 32 and 33 form a sensing unit SE. Furthermore, the sensor electrode layer 30 includes a linear ground electrode 34 provided on one main surface of the base material 31 so as to surround a periphery of the sensing units SE1 to SE7. Moreover, the sensor electrode layer 30 may include an insulating layer (not shown) such as a coverlay film covering the first and second electrodes 32 and 33 and the ground electrode 34 on one main surface of the sensor electrode layer 30.

The base material 31 is a board or film having a flexibility and containing a polymer resin. The polymer resin contains at least one of, for example, polyethylene terephthalate (PET), polyethylene naphthalate (PEN), polycarbonate (PC), acrylic resin (PMMA), polyimide (PI), triacetyl cellulose (TAC), polyester, polyamide (PA), aramid, polyethylene (PE), polyacrylate, polyethersulfone, polysulfone, polypropylene (PP), diacetyl cellulose, polyvinyl chloride, epoxy resin, urea resin, urethane resin, melamine resin, cyclic olefin polymer (COP), or norbornene-based thermoplastic resin.

The first and second electrodes 32 and 33 have a comb-teeth shape, and are arranged so as to mesh the comb-teeth portions. Specifically, the first electrode 32 includes a plurality of sub-electrodes 32A having a linear shape. The second electrode 33 includes a plurality of sub-electrodes 33A having a linear shape. The plurality of sub-electrodes 32A and 33A is extended in the X-axis direction and are alternately spaced apart with a predetermined interval in the Y-axis direction. Adjacent sub-electrodes 32A and 33A are configured to be capable of forming capacitive coupling.

The adjacent sub-electrodes 32A and 33A can operate as two electrodes of a mutual-capacitance type, or can also operate as one electrode of a self-capacitance type. Furthermore, it is possible to use as a resonance capacitor of a sensing and LC resonance circuit by utilizing electrostatic capacity caused by the coupling between the adjacent sub-electrodes 32A and 33A.

In the mutual-capacitance type, an IC 12A detects proximity of the metal layer 21 to the sensing unit SE, through an electrostatic capacity change of the sensing unit SE, specifically, an electrostatic capacity change between the first and second electrodes 32 and 33. Note that, the IC 12A detects the proximity of the metal layer 21 to the sensing unit SE as a decrease in electrostatic capacity between the first and second electrodes 32 and 33.

(Elastic Body)

The elastic body 51 is configured to be elastically deformable by pressure applied to the side wall part 11R. Since the elastic body 51 is sandwiched between the back surface of the sensor 20 and the spacer 52, a dynamic range in the load sensitivity of the sensor 20 can be improved.

The elastic body 51 includes, for example, a dielectric such as foamed resin or insulating elastomer. The foamed resin is a so-called sponge, and is at least one of, for example, foamed polyurethane, foamed polyethylene, foamed polyolefin, or sponge rubber, and the like. The insulating elastomer is, for example, at least one of silicone-based elastomer, acrylic-based elastomer, urethane-based elastomer, or styrene-based elastomer, and the like. Note that the elastic body 51 may be provided on a base material (not shown).

A thickness of the elastic body 51 is preferably 10 μm or more and 1000 μm or less. If the thickness of the elastic body 51 is less than 10 μm, a function of the elastic body 51 may be deteriorated. Whereas, if the thickness of the elastic body 51 exceeds 1000 μm, the micro-deformation sensitivity may decrease.

Note that, FIG. 4 shows an example in which the elastic body 51 has a film shape, and the elastic body 51 is provided on the entire back surface of the sensor 20, but the shape of the elastic body 51 is not limited to this. The elastic body 51 may have a predetermined shape pattern and may be partially provided on the back surface of the sensor 20. The shape pattern may be regular or irregular. Examples of the shape pattern include, for example, a stripe shape, a mesh shape, a radial shape, a geometric pattern shape, a meander shape, a concentric shape, a spiral shape, a spider web shape, a tree shape, a fish bone shape, a ring shape, a lattice shape, an irregular shape, and the like, but is not limited to these.

(Spacer)

The spacer 52 is press-fitted between the elastic body 51 and an inner surface of the groove part 14. Since the spacer 52 is press-fitted in this manner, a gap caused by dimensional variations (tolerances) of the groove part 14, the sensor 20, and the like can be suppressed. One end of the spacer 52 in the width direction (one end facing a bottom part of the groove part 14) has a wedge shape in order to facilitate press-fitting. The spacer 52 has a higher elastic modulus than that of the elastic body 51. The spacer 52 is, for example, a metal plate, a resin plate, laminated plate obtained by laminating them, and the like.

Among both main surfaces of the spacer 52, on both ends of a main surface on a side facing an inner surface of the groove part 14, protruding parts 52A and 52B are provided. These protruding parts 52A and 52B are fitted into recesses 14A and 14B provided at both ends of the groove part 14, respectively.

(Board)

The board 12 is a main board of the electronic device 10, and includes a controller integrated circuit (IC) (hereinafter simply referred to as "IC") 12A and a main central processing unit (CPU) (hereinafter simply referred to as "CPU") 12B. The IC 12A is a control unit configured to control the sensor 20 and detect pressure applied to the sensing surface 20S. The CPU 12B is a control unit configured to control the entire electronic device 10. For example, the CPU 12B executes various processes on the basis of a detection signal supplied from the IC 12A.

(Front Panel)

The front panel 13 includes a display device 13A, and an electrostatic capacity type touch panel is provided on a surface of the display device 13A. The display device 13A displays a video (screen) on the basis of a video signal and the like supplied from the CPU 12B. Examples of the display device 13A include, for example, a liquid crystal display, an electroluminescence (EL) display, and the like, but are not limited to these.

[Circuit Configuration of Electronic Device]

Figure 7:
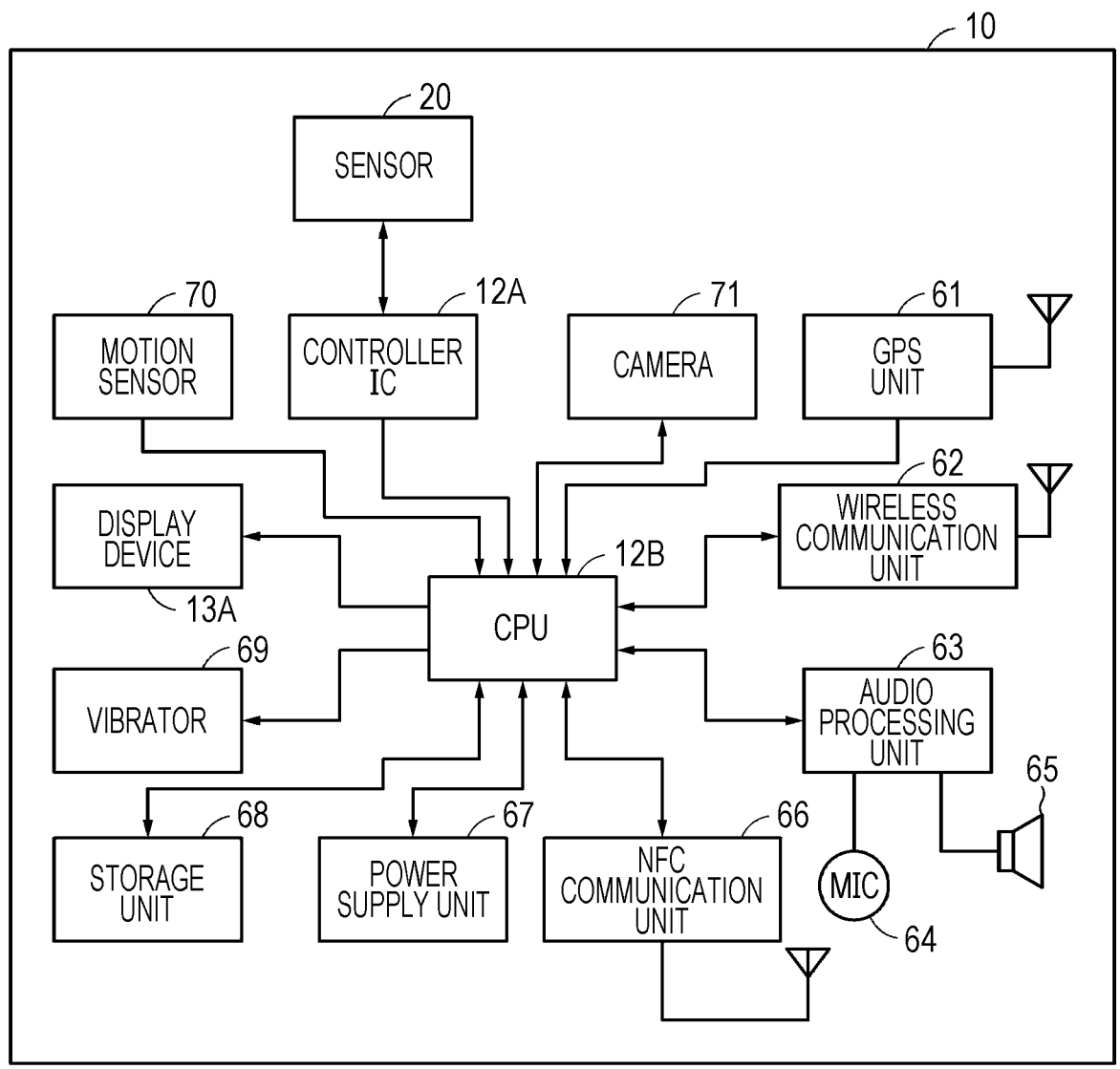
FIG. 7 is a block diagram showing a circuit configuration of the electronic device according to the first embodiment of the present disclosure.

FIG. 7 is a block diagram showing a circuit configuration of the electronic device according to the first embodiment. As shown in FIG. 7, the electronic device 10 includes a sensor 20, a CPU 12B, an IC 12A, a GPS unit 61, a wireless communication unit 62, an audio processing unit 63, a microphone 64, a speaker 65, and an NFC communication unit 66, a power supply unit 67, a storage unit 68, a vibrator 69, a display device 13A, a motion sensor 70, and a camera 71.

The GPS unit 61 is a positioning unit that receives radio waves from a satellite of a system called global positioning system (GPS), and measures a current position. The wireless communication unit 62 performs short-range wireless communication with other terminals on the basis of, for example, a Bluetooth (registered trademark) standard. The NFC communication unit 66 performs wireless communication with a nearby reader/writer on the basis of a near field communication (NFC) standard. Data obtained by the GPS unit 61, the wireless communication unit 62, and the NFC communication unit 66 are supplied to the CPU 12B.

The audio processing unit 63 is connected with the microphone 64 and the speaker 65, and the audio processing unit 63 performs processing for calling with the other party connected by wireless communication through the wireless communication unit 62 and the like. Furthermore, the audio processing unit 63 can also perform processing for a voice input operation.

The power supply unit 67 supplies power to the CPU 12B, the display device 13A, and the like provided in the electronic device 10. The power supply unit 67 includes a secondary battery such as a lithium ion secondary battery, and a charge/discharge control circuit configured to control charge/discharge of this secondary battery. Note that, although not shown in FIG. 7, the electronic device 10 includes a terminal for charging of the secondary battery.

The storage unit 68 is a random access memory (RAM) and the like, and stores various data such as an operating system (OS), an application, moving images, images, music, and documents.

The vibrator 69 is a member that vibrates the electronic device 10. For example, the electronic device 10 vibrates the electronic device 10 with the vibrator 69 to notify reception of an incoming call, reception of an e-mail, and the like.

The display device 13A displays various screens on the basis of a video signal and the like supplied from the CPU 12B. Furthermore, a signal according to a touch operation on a display surface of the display device 13A is supplied to the CPU 12B.

The motion sensor 70 detects movement of a user holding the electronic device 10. As the motion sensor 70, an acceleration sensor, a gyro sensor, an electronic compass, an atmospheric pressure sensor, and the like are used.

The camera 71 includes a lens group and an imaging element such as a complementary metal oxide semiconductor (CMOS), and captures an image such as a still image or a moving image on the basis of the control of the CPU 12B. The captured still images, moving images, and the like are stored in the storage unit 68.

The sensor 20 is a pressure sensor with high sensitivity and high position resolution, detects electrostatic capacity according to a pressing operation on the sensing surface 20S, and outputs a corresponding output signal to the IC 12A.

The IC 12A stores firmware for controlling the sensor 20, detects a change (pressure) in electrostatic capacity of each sensing unit SE included in the sensor 20, and outputs a signal according to a result thereof to the CPU 12B.

The CPU 12B executes various processes on the basis of the detection signal supplied from the IC 12A. Furthermore, the CPU 12B processes data supplied from the GPS unit 61, the wireless communication unit 62, the NFC communication unit 66, the motion sensor 70, and the like.

[Relationship Between Various Deformations Applied to Housing and Detection Signal]

In a case where the button BT2 at a prescribed pressing position is pressed as shown in FIG. 8A, a level of the detection signal S4 of the sensing unit SE4 corresponding to the button BT2 exceeds a threshold A as shown in FIG. 8B, and becomes the highest among the respective detection signals S1 to S7 of the sensing units SE1 to SE7.

As shown in FIG. 9A, in a case where bending is applied to the electronic device 10, at least one detection signal among the respective detection signals S1 to S7 of the sensing units SE1 to SE7 exceeds a threshold -B, as shown in FIG. 9B. Furthermore, also in a case where twisting is applied to the electronic device 10 as shown in FIG. 10A, at least one detection signal among the detection signals S1 to S7 of the sensing units SE1 to SE7 exceeds the threshold -B, as shown in FIG. 10B.

In a case where a portion between buttons BT2 and BT3 is pressed as shown in FIG. 11A, the detection signal S5 of the sensing unit SE5 corresponding to the position between the buttons BT2 and BT3 exceeds the threshold A as shown in FIG. 11B, and becomes the highest among the respective detection signals S1 to S7 of the sensing units SE1 to SE7.

[Operation of Electronic Device]

Figure 12:
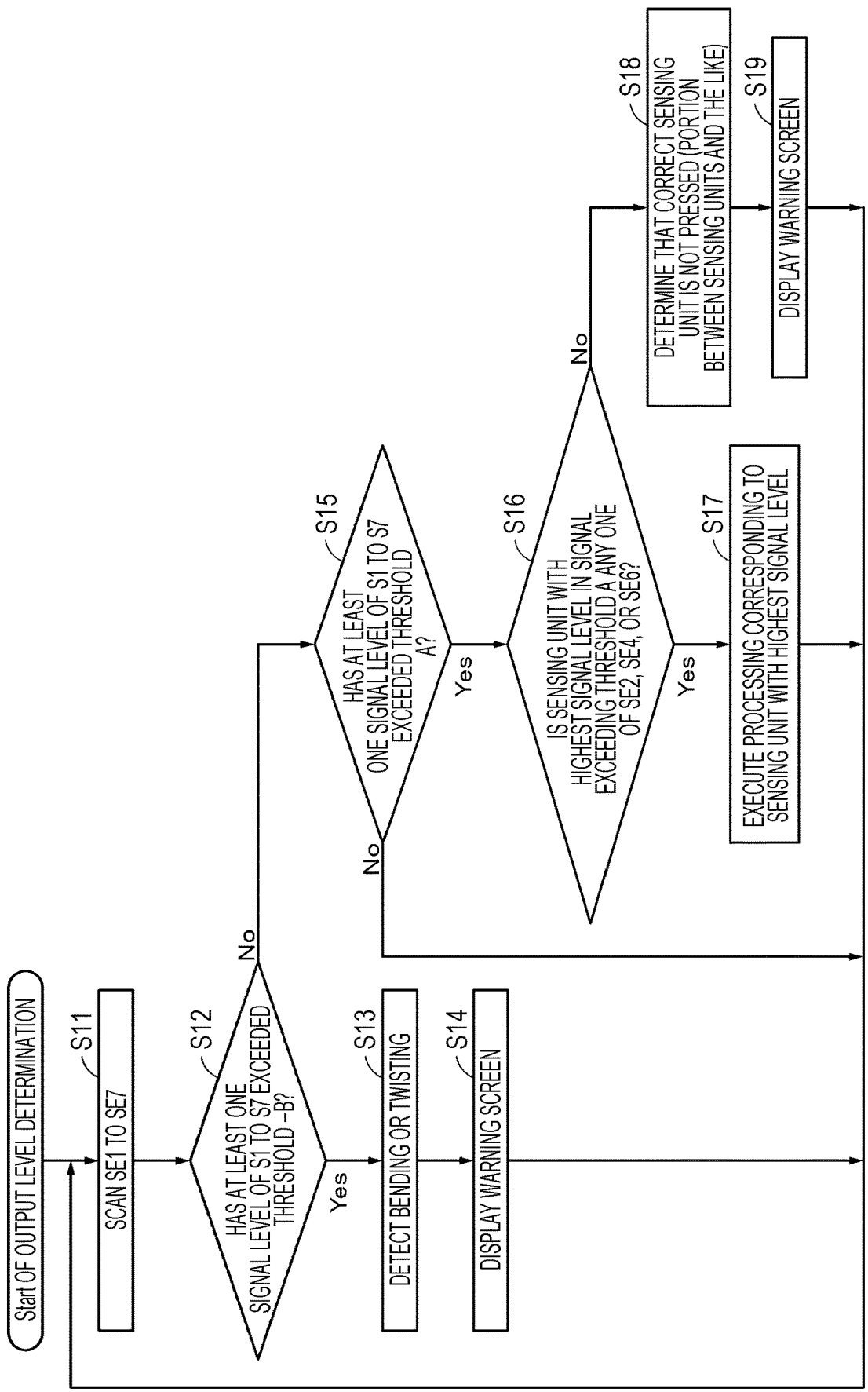
FIG. 12 is a flowchart for explaining an operation of the electronic device according to the first embodiment of the present disclosure.

With reference to FIG. 12, an operation of the electronic device 10 according to the first embodiment will be described.

First, in step S11, the IC 12A sequentially scans the sensing units SE1 to SE7, acquires the respective detection signals S1 to S7 of the sensing units SE1 to SE7, and supplies to the CPU 12B.

Next, in step S12, the CPU 12B determines whether or not at least one signal among the detection signals S1 to S7 supplied from the IC 12A exceeds the threshold -B. Note that, the threshold -B is opposite in polarity to the threshold A for determining pressure of the buttons BT1, BT2, and BT3 at prescribed pressing positions. In a case where it is determined in step S12 that at least one signal among the detection signals S1 to S7 exceeds the threshold -B (see FIGS. 9B and 10B), the CPU 12B determines in step S13 that bending or twisting (see FIGS. 9A and 10A) has been applied to the electronic device 10. Then, in step S14, the CPU 12B displays a screen (see FIG. 13A) that gives warning, on the display device 13A, to the user that bending or twisting has been applied to the electronic device 10, and returns the process to step S11. Note that an image data related to the warning screen described above is stored in the storage unit 68, and this image data is read out by the CPU 12B and displayed on the display device 13A.

In a case where it is determined in step S12 that at least one signal among the detection signals S1 to S7 does not exceed the threshold -B, the CPU 12B determines in step S15 whether or not at least one signal among the detection signals S1 to S7 supplied from the IC 12A exceeds the threshold A.

In a case where it is determined in step S15 that at least one signal among the detection signals S1 to S7 exceeds the threshold A, the CPU 12B determines in step S16 whether or not a detection signal with the highest signal level among the detection signals exceeding the threshold A corresponds to any of the sensing units SE2, SE4, and SE6 (that is, the buttons BT1, BT2, and BT3). In a case where it is determined in step S15 that at least one signal among the detection signals S1 to S7 does not exceed the threshold A, the CPU 12B returns the process to step S11.

In a case where it is determined in step S16 that the detection signal having the highest signal level corresponds to one of the sensing units SE2, SE4, and SE6 (see FIG. 8B), in step S17, the CPU 12B executes processing corresponding to the sensing unit SE (see FIG. 8A) in which a detection signal with the highest signal level is detected, among the sensing units SE2, SE4, and SE6.

In a case where it is determined in step S16 that the detection signal having the highest signal level does not correspond to any of the sensing units SE2, SE4, and SE6 (see FIG. 11B), in step S18, the CPU 12B determines that a prescribed position is not pressed, specifically, that a position corresponding to a portion between the buttons BT1 and BT2 or between the buttons BT2 and BT3 is pressed (see FIG. 11A). Then, in step S19, the CPU 12B displays a screen (see FIG. 13B) that warns the user that the prescribed position is not pressed, specifically, that a portion between the button BT1, BT2 or the button BT2, BT3 is pressed, and returns the process to step S11. Note that an image data related to the warning screen described above is stored in the storage unit 68, and this image data is read out by the CPU 12B and displayed on the display device 13A.

Effect

The electronic device 10 according to the first embodiment includes: the housing 11; and the sensor 20 that is provided on the inner surface 11SB of the side wall part 11R and includes the plurality of sensing units SE configured to detect deformation of the side wall part 11R. The plurality of sensing units SE includes the sensing units SE2, SE4, and SE6 for detection of a prescribed user operation, and the sensing units SE1, SE3, SE5, and SE7 for compensation for a malfunction of the electronic device 10. Therefore, a malfunction of the electronic device 10 can be suppressed.

MODIFIED EXAMPLE

Modified Example 1

Figure 14:
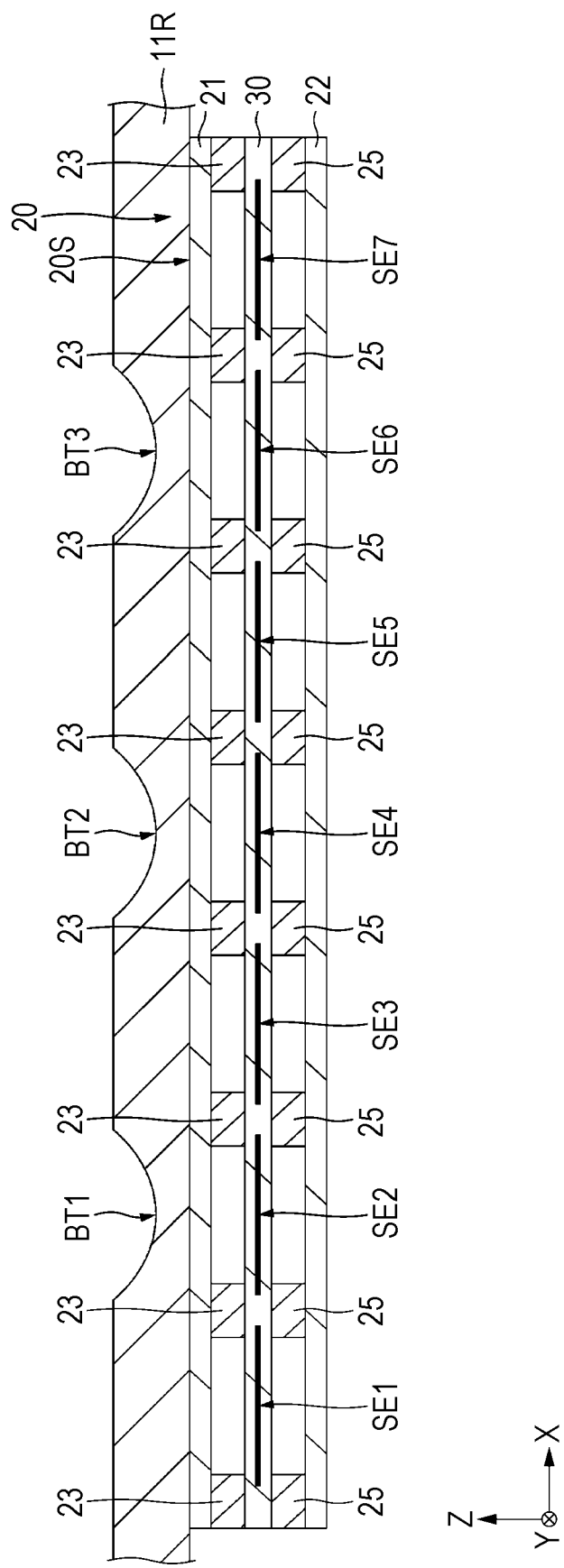
FIG. 14A is a cross-sectional view showing a configuration of an electronic device according to a modified example of the first embodiment of the present disclosure.

As shown in FIG. 14, the sensor 20 may include a plurality of supports 25 having a columnar shape, instead of the adhesive layer 24. The plurality of supports 25 is provided between the main surfaces of the metal layer 22 and the sensor electrode layer 30, and support the metal layer 22 on another main surface of the sensor electrode layer 30 such that the metal layer 22 and the sensor electrode layer 30 are separated from each other. The plurality of supports 25 forms a support layer between the main surfaces of the metal layer 22 and the sensor electrode layer 30. The plurality of supports 25 each is provided at positions stacked with the plurality of supports 23 in the thickness direction of the sensor 20. The support 25 is made by, for example, an adhesive or a double-sided adhesive tape having insulating properties. As the adhesive, for example, an ultraviolet curable resin, a thermosetting resin, and the like can be used. The support 25 may be elastically deformed by pressure applied to the sensing surface 20S.

Furthermore, instead of the plurality of supports 23, the sensor 20 may include an elastic layer that is elastically deformed by pressure applied to the sensing surface 20S. This elastic layer includes a foamed resin, an insulating elastomer, and the like. The foamed resin is a so-called sponge, and is at least one of, for example, foamed polyurethane, foamed polyethylene, foamed polyolefin, or sponge rubber, and the like. The insulating elastomer is, for example, at least one of silicone-based elastomer, acrylic-based elastomer, urethane-based elastomer, or styrene-based elastomer, and the like.

Furthermore, the sensor 20 may include an elastic layer instead of the adhesive layer 24. As a material of this elastic layer, a material similar to that of the elastic layer described above can be exemplified.

Modified Example 2

As shown in FIG. 15A, the sensor 20 may include a plurality of projections 26 on the sensing surface 20S. The projections 26 are provided at positions corresponding to the sensing units SE2, SE4, and SE6 for user operation detection. Specifically, the projections 26 are provided so as to be stacked with the sensing units SE2, SE4, and SE6 in the thickness direction of the sensor 20. Note that the projections 26 may be provided on the inner surface 11SB of the side wall part 11R, instead of the sensing surface 20S.

Furthermore, as shown in FIG. 15A, the sensor 20 may include a plurality of projections 27 on a back surface. The projections 27 are provided at positions corresponding to the sensing units SE1, SE3, SE5, and SE7 for malfunction compensation. Specifically, the projections 27 are provided so as to be stacked with the sensing units SE1, SE3, SE5, and SE7 in the thickness direction of the sensor 20. Note that the projections 27 may be provided on a surface of the elastic body 51 facing the back surface of the sensor 20, instead of the back surface of the sensor 20.

In a case where the housing 11 or the groove part 14 includes a metal, the sensor 20 need not include the metal layers 21 and 22 and the plurality of supports 23 and 25 as shown in FIG. 15B.

In the sensor having the configuration shown in FIG. 15A, as shown by arrows in FIG. 16A, in a case where the bottom part 11M is pressed, a wall part 14C facing the side wall part 11R via the groove part 14 is deformed toward the side wall part 11R. Therefore, the back surface of the sensor 20 is pressed through the projections 27. Therefore, the IC 12A detects increases in the respective detection signals S1, S3, S5, and S7 in the sensing units SE1, SE3, SE5, and SE7 for malfunction compensation (see FIG. 16B). Therefore, the CPU 12B determines whether or not the bottom part 11M is deformed by determining whether or not at least one signal among the detection signals S1, S3, S5, and S7 exceeds a threshold C. That is, the CPU 12B can determine that the bottom part 11M has been deformed in a case where at least one signal among the detection signals S1, S3, S5, or S7 exceeds the threshold C, and can determine that the bottom part 11M has not been deformed in a case where at least one signal among the detection signals S1, S3, S5, or S7 does not exceed the threshold C.

Note that, also in a case where the electronic device 10 has been twisted, the wall part 14C facing the side wall part 11R via the groove part 14 is deformed toward the side wall part 11R. Therefore, the CPU 12B can also determine that the electronic device 10 has been twisted in a manner similar to the case where the bottom part 11M is pressed.

Furthermore, in a case where any of the buttons BT1, BT2, and BT3 is pressed, the sensing surface 20S of the sensor 20 is pressed through the projection 26. Therefore, the IC 12A detects increases in the respective detection signals S2, S4, and S6 in the sensing units SE2, SE4, and SE6 for user operation detection. Therefore, the CPU 12B can detect pressing of the buttons BT1, BT2, and BT3 by determining whether or not there is a signal exceeding the threshold A among the detection signals S1 to S7, and the signal exceeding the threshold A is a signal of any one of the sensing units SE2, SE4, and SE6.

Modified Example 3

The sensor 20 may also include a conductive base material instead of the metal layers 21 and 22. The conductive base material includes a base material and a metal layer provided on one main surface of the base material. The base material has a plate shape or a film shape. As the conductive base material, a conductive film including a PET film and a metal layer (for example, Al-PET (registered trademark) manufactured by PANAC Corporation) is preferable. Furthermore, the sensor 20 may also include a conductive layer other than the metal layers 21 and 22. As the conductive layer other than the metal layers 21 and 22, for example, a film or a board containing at least one of carbon powder or metal powder can be used.

Modified Example 4

Figure 17:
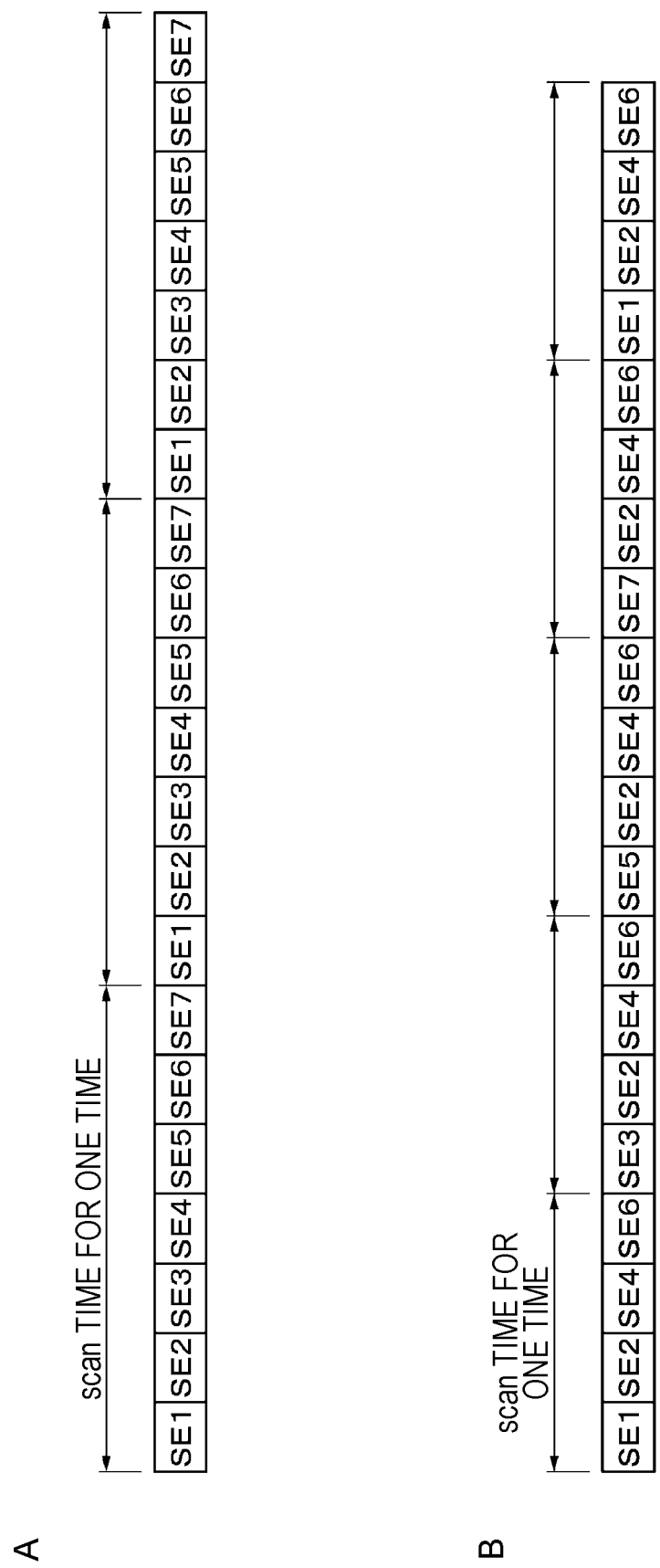
FIGS. 17A and 17B are schematic views for explaining a scanning order of the sensing unit.

As shown in FIG. 17A, the IC 12A may scan all the sensing units SE1 to SE7 in one cycle of scanning, but the scan operation of the IC 12A is not limited to this. That is, as shown in FIG. 17B, while the IC 12A scans all sensing units SE2, SE4, and SE6 for user operation detection in one cycle of scanning, only one of the sensing units SE1, SE3, SE5, and SE7 for malfunction compensation may be scanned in one cycle of scanning. In this case, the sensing units SE1, SE3, SE5, and SE7 all are scanned by four times of scanning. By adopting the scan operation as shown in FIG. 17B, a scan time required for one cycle can be shortened.

Modified Example 5

In the first embodiment described above, a description has been made on a configuration in which the electronic device 10 includes the sensor 20 on the inner surface 11SB of the side wall part 11R. However, the electronic device 10 may include the sensors 20 and 20 on the inner surfaces 11SB and 11SB of the side wall parts 11R and 11L, respectively. Furthermore, the sensor 20 may be provided over the entire inner surface (inner peripheral surface) of the wall part 11N. Furthermore, the sensor 20 may be provided on an inner surface of the bottom part 11M of the housing 11, or the sensor 20 may be provided on an inner surface of the front panel 13.

Modified Example 6

As shown in FIGS. 18A and 18B, the electronic device 10 may include a supporting member 53 configured to support the sensor 20 and the elastic body 51 such that main surfaces thereof each are parallel to the inner surface 11SB, and press the sensor 20 against the inner surface 11SB via the elastic body 51. In this case, the projections 26 may be provided on the sensing surface 20S of the sensor 20.

The housing 11 is provided with holes 55A and 55B separated by a predetermined interval, in the vicinity of the inner surface 11SB of the side wall part 11R. The supporting member 53 has a long plate shape, and provided with through holes 53A and 53B at both ends of the supporting member 53 in the longitudinal direction. The supporting member 53 is fixed in the vicinity of the inner surface 11SB by fixing screws 54A and 54B to the holes 55A and 55B so as to pass through the through holes 53A and 53B, respectively.

Modified Example 7

As shown in FIG. 19A, a sensor 20A may include: first and second sensing unit rows 20L1 and 20L2 for malfunction compensation; and a sensing unit row 20L3 for user operation detection provided between the first and second sensing unit rows 20L1 and 20L2 for malfunction compensation.

The first sensing unit row 20L1 is configured by sensing units $20SE_1$ for malfunction compensation aligned in one line with a predetermined interval in the X-axis direction, and the second sensing unit row 20L2 is configured by sensing units $20SE_2$ for malfunction compensation aligned in one line with a predetermined interval in the X-axis direction. The sensing unit row 20L3 is configured by sensing units $20SE_3$ for malfunction compensation aligned in one line with a predetermined interval in the X-axis direction. The sensing unit $20SE_1$ and the sensing unit $20SE_2$ are arranged to face each other in the Y-axis direction. The sensing unit $20SE_3$ is arranged so as not to overlap with the sensing units $20SE_1$ and $20SE_2$ in the Y-axis direction.

The sensing units $20SE_1$ and $20SE_2$ have a rectangular shape, and are arranged such that long edges thereof are parallel to the X axis. Whereas, the sensing unit $20SE_3$ has a square shape or a substantially square shape, and is arranged such that a pair of opposing edges are parallel to the X axis. An area of the sensing unit $20SE_3$ is larger than areas of the sensing units $20SE_1$ and $20SE_2$.

Modified Example 8

As shown in FIG. 19B, a sensor 20B may have a plurality of sensing units SE arranged two-dimensionally in a matrix. Here, a case is described where the sensing units are arranged in a matrix of three rows and seven columns, but the number of rows and the number of columns are not limited to this. Hereinafter, a sensing unit SE arranged at a position of n-row and m-column is referred to as an SE (n, m).

An SE (2, 2), an SE (2, 4), and an SE (2, 6) are sensing units $SE_A$ for user operation detection. A sensing unit SE (n, m) other than the SE (2, 2), the SE (2, 4), and the SE (2, 6) is a sensing unit $SE_B$ for malfunction compensation.

When there are the sensing units $SE_B$ for malfunction compensation on both sides in the X-axis direction of the sensing unit $SE_A$ for user operation detection, a degree of deformation at positions on both sides of the sensing unit $SE_A$ can be confirmed. Therefore, it is possible to improve the detection accuracy for twisting or bending of the electronic device 10 or pressing at an unintended position.

Modified Example 9

In a case of using a sensor 20 where a plurality of sensing units SE is two-dimensionally arranged in a matrix, the IC 12A may be capable of detecting multi-touch on the sensor 20. For example, in a case where 16 pieces of X electrode (first electrode) and 10 pieces of Y electrode (second electrode) are arranged orthogonally, 160 pieces of the sensing unit SE arranged in a matrix can be configured, enabling sensing of proximity of the metal layer 21 by each sensing unit SE.

When both main surfaces of the sensor electrode layer 30 in which the X and Y electrodes are arranged in a matrix are covered with pressure-deformable metal layers 21 and 22, and these metal layers 21 and 22 are grounded, the IC 12A can sense pressure applied to the sensing surface 20S. For example, since deformation of the metal layer 21 can be detected for every 160 pieces of the sensing unit SE, pressure of a plurality of pressure points, not only in the XY direction coordinates, but also in the Z direction can be detected. In the mutual-capacitance type, it is preferable that electric lines leak from the X and Y electrodes to the surroundings. As the X and Y electrodes that enable such a state, a comb-tooth shaped electrode and the like are preferable.

In the sensor 20 having the above-described configuration, some of the 160 pieces of the sensing unit SE is used for user operation detection, and the rest is used for malfunction compensation. Note that multi-touch (for example, a plurality of button presses) may be detected by the sensing unit SE for user operation detection.

Furthermore, the sensor 20 having the above-described configuration can be provided on any inner surface of the wall part 11N and the bottom part 11M of the housing 11, but preferably provided on the inner surface of the bottom part 11M from the viewpoint of an arrangement space.

Modified Example 10

As shown in FIG. 20A, a plurality of sensing unit pairs SP1 for user operation detection and a plurality of sensing unit pairs 20SP2 for malfunction compensation may be provided, and the sensing unit pairs SP1 and SP2 may be alternately arranged. The sensing unit pair SP1 includes two rectangular sensing units $SE_A$ for user operation detection separated by a predetermined interval, and is arranged such that long edges of the sensing unit $SE_A$ are parallel to the Y axis. The sensing unit pair SP2 includes two rectangular sensing units $SE_B$ for malfunction compensation separated by a predetermined interval, and is arranged such that long edges of the sensing unit $SE_B$ are parallel to the X axis.

In a case where a position PA shown in FIG. 20A is pressed, a level of detection signals of the sensing units (3) and (4) becomes high as shown in FIG. 20B. In a case where a position PB shown in FIG. 20A is pressed, a level of a detection signal of the sensing unit (1) becomes high as shown in FIG. 20C.

Modified Example 11

In the first embodiment, a description has been made as an example on a configuration in which the outer surface 11SA of the side wall part 11R has the buttons BT1, BT2, and BT3 at prescribed pressing positions (that is, positions corresponding to the sensing units SE2, SE4, and SE6), but the configuration that enables the prescribed pressing position to be tactilely grasped is not limited to this. For example, a protrusion may be provided at a prescribed pressing position. Furthermore, surface roughness of a prescribed pressing position and a peripheral portion thereof may be changed. For example, one of the prescribed pressing position and a peripheral portion thereof may be a rough surface, and the other may be a smooth surface. Furthermore, sensible temperature of the prescribed pressing position and the peripheral portion thereof may be changed. For example, one of the prescribed pressing position and the peripheral portion thereof may be made by metal, and the other may be made by a polymer resin.

Instead of enabling the prescribed pressing position to be tactilely grasped, it is also possible to enable the prescribed pressing position to be visually grasped, or the prescribed pressing position to be grasped tactilely and visually. In order to enable the prescribed pressing position to be visually grasped, for example, it is only required to print at least one of a symbol, a character, a mark, a pattern, or a color on the outer surface 11SA. Furthermore, at least one of a symbol, a character, a mark, or a pattern may also be engraved on the outer surface 11SA. For example, in a case of providing a volume button at a prescribed pressing position, it is only required to print or engrave a symbol "+" or "−" on the pressing portion.

Modified Example 12

A sensor 120 may further include an electrode unit for temperature detection configured to detect a temperature through an electrostatic capacity change. In this case, the IC 12A may detect the temperature on the basis of an electrostatic capacity change of the electrode unit for temperature detection, and correct a threshold on the basis of the detected temperature. As the electrode unit for temperature detection, an electrode unit having a configuration similar to that of the sensing units SE1 to SE7 may be used.

The board 12 may also further include a temperature detection unit. In this case, the IC 13A may detect a temperature by the temperature detection unit and correct a threshold on the basis of the detected temperature.

Modified Example 13

The sensor 20, the elastic body 51, and the spacer 52 may be divided into a plurality of pieces in a length direction of the groove part 14. Therefore, it is possible to suppress a measurement error of the sensor 20 due to twisting distortion applied to the housing 11. Furthermore, a plurality of groove parts 14 may be provided, and the sensor 20, the elastic body 51, and the spacer 52 may be accommodated in the individual groove parts 14.

Modified Example 14

In the sensor 20, the sensing units SE to SE7 of the sensor electrode layer 30 may be spiral coil wiring. In this case, the spiral coil wiring of the sensing units SE to SE7 detects deformation of metal layers 121 and 122 by fluctuation of a magnetic field rather than an electric field.

Modified Example 15

The CPU 12B may switch between operation and non-operation of the sensor 20 as follows. That is, on the basis of a detection signal supplied from the touch panel of the display device 13A, CPU 12B determines whether or not the detection signal exceeds a threshold within a range equal to or larger than a prescribed area of the display surface of the display device 13A. In a case where it is determined that the detection signal exceeds the threshold within a range equal to or larger than the prescribed area, the CPU 12B inhibits operation of the sensor 20 provided on the side wall part 11R. Whereas, in a case where it is determined that the detection signal does not exceeds the threshold within a range equal to or larger than the prescribed area, the CPU 12B causes operation of the sensor 20 provided on the side wall part 11R. By switching between operation and non-operation of the sensor 20 in this manner, a malfunction of the electronic device 10 can be further suppressed.

Modified Example 16

The CPU 12B may perform authentication such as person identification on the basis of a pressure distribution (electrostatic capacity distribution) pattern supplied from the IC 12A. In this case, the CPU 12B makes the electronic device 10 usable in a case where authentication such as person identification can be made, while the CPU 12B may not make the electronic device 10 usable in a case where authentication such as person identification cannot be made.

Modified Example 17

In the first embodiment described above, a case has been described where the sensor 20 is the mutual-capacitance type, but the sensor 20 may be a self-capacitance type.

Figure 21:
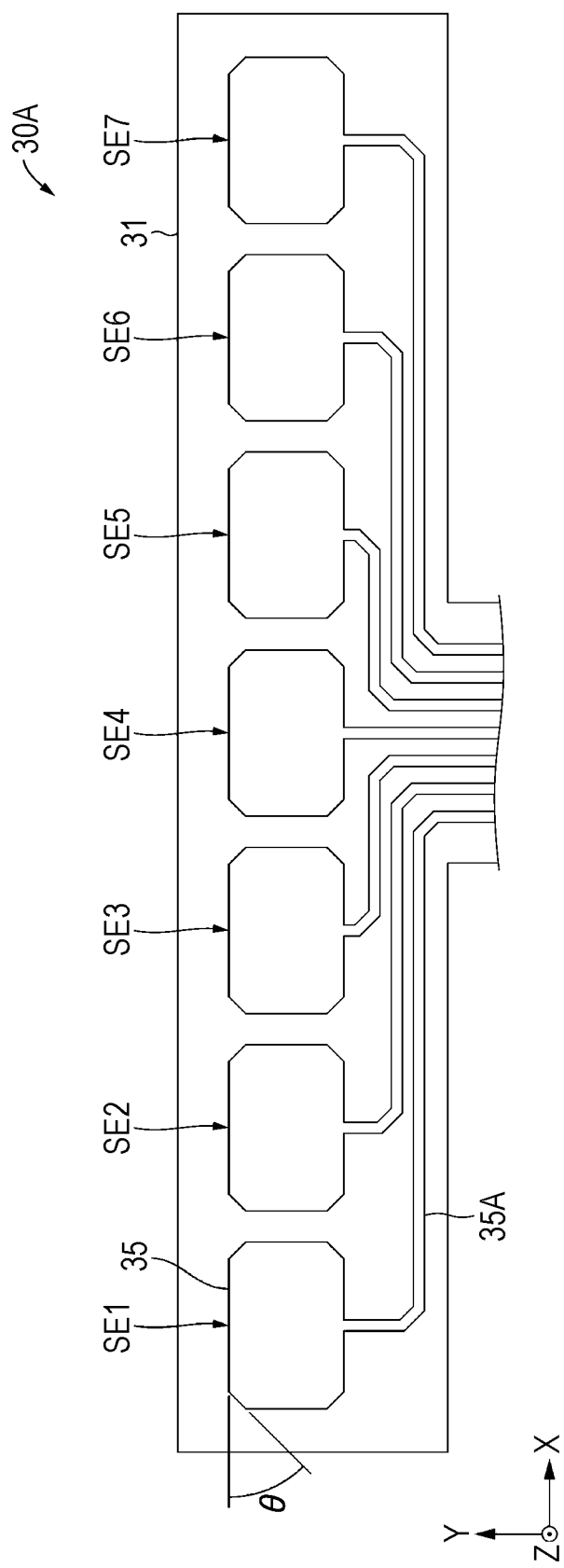
FIG. 21 is a plan view showing a configuration of a sensor electrode layer of a self-capacitance type.

FIG. 21 shows a configuration of a sensor electrode layer 30A of a self-capacitance type. The sensor electrode layer 30A includes a base material 31 and a plurality of thin film electrodes 35 provided on one main surface of the base material 31, and the electrodes 35 each form a sensing unit SE. The electrode 35 has a shape obtained by linearly cutting corner portions of a rectangular shape. A cut-off angle θ is 45 degrees, for example. Note that a shape of the electrode 35 is not limited to this, and may be a shape in which a rectangular corner portion is an R shape, a polygonal shape such as a rectangular shape, a circular shape, an elliptical shape, or an irregular shape, and the like.

Furthermore, the sensor electrode layer 30A includes a plurality of pieces of wiring 35A that electrically connects each electrode 45 to the connector 42. In the sensor electrode layer 30A of a self-capacitance type, the number of pieces of the required wiring 35A is the number of sensing units SE desired to be individually sensed, that is, the number of electrodes (sensing electrodes) 35 for which an electrostatic capacity change is detected.

The wiring 35A drawn at a right angle to an edge of the electrode 35 may be bent at a right angle to change the direction, but is preferably bent twice at an angle of 45 degrees to change the direction, as shown in FIG. 21. This is because a change in a width of the wiring 35A can be suppressed, and generation of noise can be suppressed. Furthermore, in portions other than that described above, it is also preferable that the direction is changed by bending the wiring 35A twice at an angle of 45 degrees, rather than being changed by bending at a right angle.

In the self-capacitance type, the IC 12A detects proximity of the metal layer 21 through an electrostatic capacity change from each electrode 35. The sensor 20 can also be regarded as a kind of capacitor that changes a shape thereof with pressure. The IC 12A detects proximity of the metal layer (ground electrode) 21 to the electrode (sensing electrode) 35 as an increase in the electrostatic capacity of the electrode 35. A capacity change amount of the sensor 20 with respect to pressing of the sensing surface 20S can be easily adjusted on the basis of a distance and a dielectric constant between the metal layer 21 serving as a ground electrode and the electrode 35 serving as a sensing electrode, an area of the electrode 35, and the like. In a case where the sensor 20 can detect multi-touch, the mutual-capacitance type is preferably used as the sensor 20.

Modified Example 18

In the first embodiment described above, a case where the electronic device is a smartphone has been described as an example. However, the present disclosure is not limited to this, and can be applied to various electronic devices having an exterior body such as a housing. For example, the present disclosure is applicable to mobile phones other than smartphones, personal computers (for example, notebook PCs, tablet PCs, and the like), tablets, TVs, remote controllers, cameras, game devices, navigation systems, electronic books, electronic dictionaries, portable music players, wearable terminals such as smart watches and head-mounted displays, radios, stereos, medical devices, and robots.

The present disclosure is not limited to electronic devices, and can be applied to various devices other than electronic devices. For example, the present disclosure can be applied to electric devices such as electric tools, refrigerators, air conditioners, water heaters, microwave ovens, dishwashers, washing machines, dryers, lighting devices, and toys. Moreover, the present disclosure can be applied to buildings such as houses, building members, vehicles, furniture such as tables and desks, manufacturing apparatuses, analytical instruments, and the like. Examples of the building members include, for example, paving stones, wall materials, floor tiles, floor boards, and the like. Examples of the vehicles include, for example, motor vehicles (for example, automobiles, motorcycles, and the like), ships, submarines, railway vehicles, aircrafts, spacecrafts, elevators, play equipment, and the like.

2 Second Embodiment

[Configuration of Electronic Device]

Figure 22:
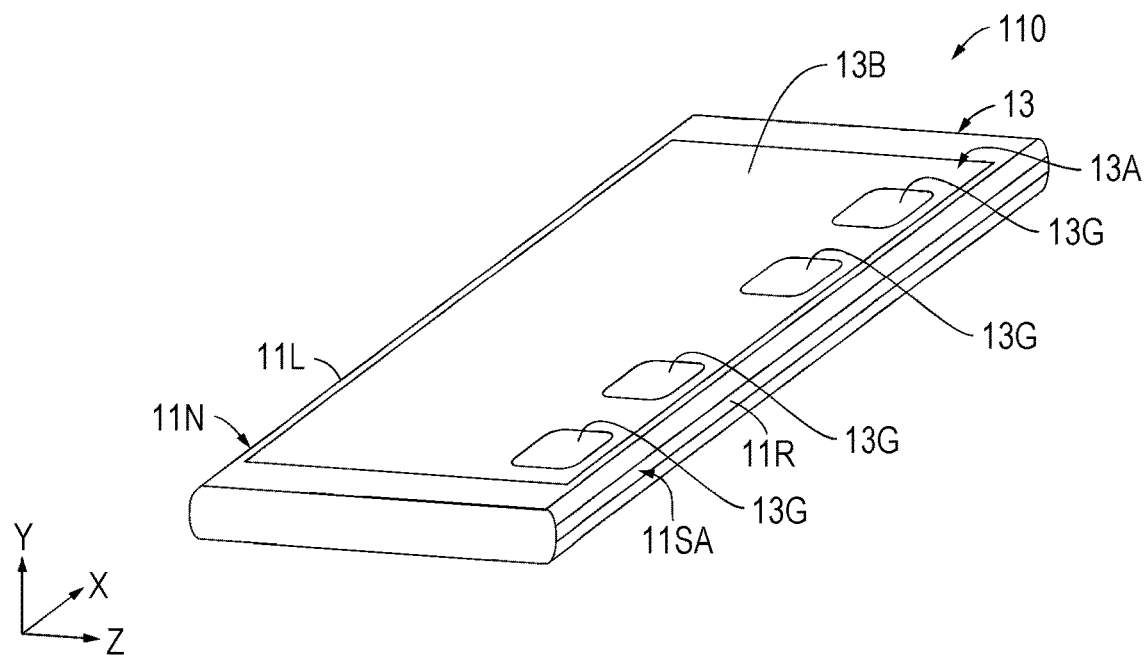
FIG. 22 is a perspective view showing a configuration of an electronic device according to a second embodiment of the present disclosure.

FIG. 22 shows a configuration of an electronic device 110 according to a second embodiment of the present disclosure. The electronic device 110 according to the second embodiment displays information 13G corresponding to an operation button, at a position along an edge on a side wall part 11R side in a screen 13B, instead of an operation button being provided on the side wall part 11R.

Figure 23:
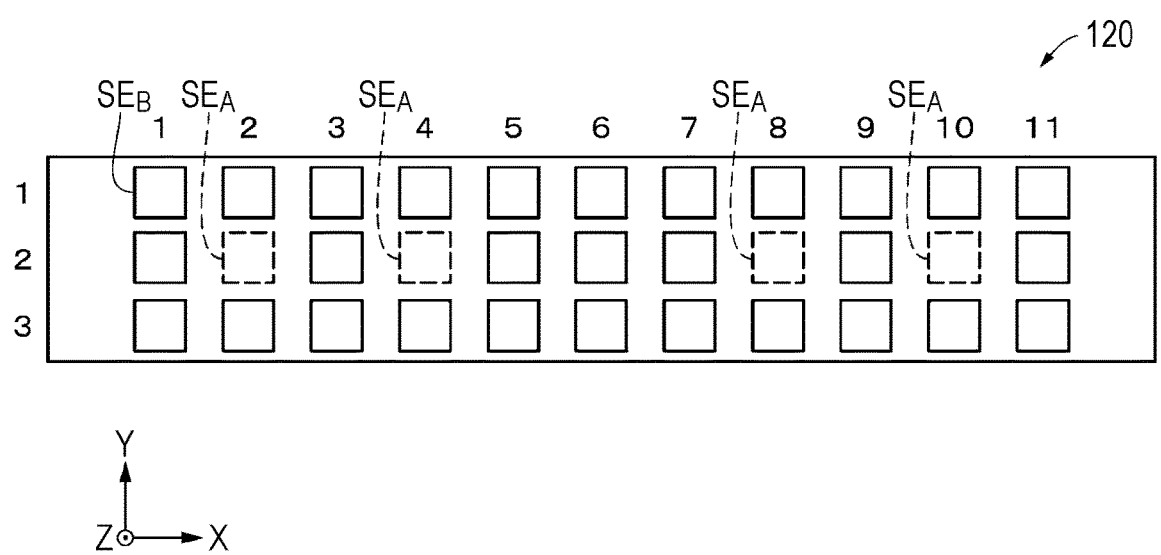
FIG. 23 is a plan view showing a configuration of the sensor.

FIG. 23 shows an arrangement example of a sensing unit SE of a sensor 120. The sensor 120 has a plurality of sensing units SE arranged two-dimensionally in a matrix. Here, a case is described where the sensing units SE are arranged in a matrix of three rows and eleven columns, but the number of rows and the number of columns are not limited to this. Hereinafter, a sensing unit SE arranged at a position of n-row and m-column is referred to as an SE (n, m).

When an application is activated by a user, a CPU 12B maps each operation of the activated application to the plurality of sensing units SE. Specifically, some of the plurality of sensing units SE is set as a sensing unit $SE_A$ for application operation, and the remaining sensing units are set as a sensing unit $SE_B$ for malfunction compensation. Note that a position of the sensing unit $SE_A$ for application operation differs for each activated application.

Hereinafter, screen display and setting of the sensing unit SE in using a camera application, a music application, and a map application will be described. Note that the application is not limited to this, and the present disclosure can be applied to various applications such as a game application and a moving image or still image editing application.

(Camera Application)

FIG. 24A shows a screen in using the camera application. FIG. 24B shows mapping setting of the sensing unit SE in using the camera application. When the camera application is activated, the CPU 12B sets some of the plurality of sensing units SE as sensing units $SE_A$ for zoom-out operation detection, zoom-in operation detection, and shutter operation detection, and sets the rest to the sensing unit $SE_B$ for malfunction compensation. Specifically, an SE (2, 2), an SE (2, 4), and an SE (2, 10) are set as the sensing units $SE_A$ for zoom-out operation detection, zoom-in operation detection, and shutter operation detection, respectively, while an SE (n, m) other than the SE (2, 2), the SE (2, 4), and the SE (2, 10) is set as the sensing unit $SE_B$ for malfunction compensation.

The CPU 12B displays information 13G corresponding to the zoom-out operation at a position corresponding to the SE (2, 2) for zoom-out operation detection among positions on the side wall part 11R side in the screen 13B. The CPU 12B displays information 13G corresponding to the zoom-in operation at a position corresponding to the SE (2, 4) for zoom-in operation detection among positions on the side wall part 11R side in the screen 13B. The CPU 12B displays information 13G corresponding to the shutter operation at a position corresponding to the SE (2, 10) for shutter operation detection among positions on the side wall part 11R side in the screen 13B.

Note that data related to the information 13G corresponding to each of the zoom-out operation, the zoom-in operation, and the shutter operation is stored in the storage unit 68. As the camera application is activated, the CPU 12B reads out the data related to the information 13G from the storage unit 68 and displays on the screen 13B.

(Music Application)

FIG. 25A shows a screen in using the music application. FIG. 25B shows mapping setting of the sensing unit SE in using the music application. When the music application is activated, the CPU 12B sets some of the plurality of sensing units SE as sensing units $SE_A$ for fast-forward playback operation detection, pause operation detection, fast-reverse playback operation detection, volume up operation detection, and volume down operation detection, and sets the rest as the sensing unit $SE_B$ for malfunction compensation. Specifically, an SE (2, 1), an SE (2, 3), an SE (2, 5), an SE (2, 9), and an SE (2, 11) are set as the sensing units $SE_A$ for fast-forward playback operation detection, pause operation detection, fast-reverse playback operation detection, volume up operation detection, and volume down operation detection, respectively, while an SE (n, m) other than the SE (2, 1), the SE (2, 3), the SE (2, 5), the SE (2, 9), and the SE (2, 11) is set as the sensing unit $SE_B$ for malfunction compensation.

The CPU 12B displays information 13G corresponding to the fast-forward playback operation at a position corresponding to the SE (2, 1) for fast-forward playback operation detection among positions on the side wall part 11R side in the screen 13B. The CPU 12B displays information 13G corresponding to the pause operation at a position corresponding to the SE (2, 3) for pause operation detection among positions on the side wall part 11R side in the screen 13B. The CPU 12B displays information 13G corresponding to the fast-reverse playback operation at a position corresponding to the SE (2, 5) for fast-reverse playback operation detection among positions on the side wall part 11R side in the screen 13B. The CPU 12B displays information 13G corresponding to the volume up operation at a position corresponding to the SE (2, 9) for volume up operation detection among positions on the side wall part 11R side in the screen 13B. The CPU 12B displays information 13G corresponding to the volume down operation at a position corresponding to the SE (2, 11) for volume down operation detection among positions on the side wall part 11R side in the screen 13B.

Note that data related to the information 13G corresponding to each of the fast-forward playback operation, the pause operation, the fast-reverse playback operation, the volume up operation, and the volume down operation is stored in the storage unit 68. As the music application is activated, the CPU 12B reads out the data related to the information 13G from the storage unit 68 and displays on the screen 13B.

(Map Application)

FIG. 26A shows a screen in using the map application. FIG. 26B shows mapping setting of the sensing unit SE in using the map application. When the map application is activated, the CPU 12B sets some of the plurality of sensing units SE as sensing units $SE_A$ for zoom-out operation detection, zoom-in operation detection, and up/down and left/right scroll operation detection, and sets the rest to the sensing unit $SE_B$ for malfunction compensation. Specifically, an SE (2, 1), an SE (2, 3), an SE (2, 7), an SE (2, 11), an SE (1, 9), and an SE (3, 9) are set as the sensing units $SE_A$ for zoom-out operation, zoom-in operation, up scroll operation, down scroll operation, right scroll operation, and left scroll operation, respectively, while an SE (n, m) other than the SE (2, 1), the SE (2, 3), the SE (2, 7), the SE (2, 11), the SE (1, 9), and the SE (3, 9) is set as the sensing unit $SE_B$ for malfunction compensation.

The CPU 12B displays information 13G corresponding to the zoom-out operation at a position corresponding to the SE (2, 1) for zoom-out operation detection among positions on the side wall part 11R side in the screen 13B. The CPU 12B displays information 13G corresponding to the zoom-in operation at a position corresponding to the SE (2, 3) for zoom-in operation detection among positions on the side wall part 11R side in the screen 13B. The CPU 12B displays information 13G corresponding to the up scroll operation and down scroll operation at positions respectively corresponding to the SE (2, 7) and the SE (2, 11) for up scroll operation detection and down scroll operation detection, among positions on the side wall part 11R side in the screen 13B. The CPU 12B displays information 13G corresponding to the right scroll operation and the left scroll operation at positions corresponding to the SE (1, 9) and the SE (3, 9) for right scroll operation detection and left scroll operation detection, among positions on the side wall part 11R side in the screen 13B.

Note that data related to the information 13G corresponding to each of the zoom-out operation, the zoom-in operation, and the up/down and left/right scroll operation is stored in the storage unit 68. As the map application is activated, the CPU 12B reads out the data related to the information 13G from the storage unit 68 and displays on the screen 13B.

[Operation of Electronic Device]

Figure 27:
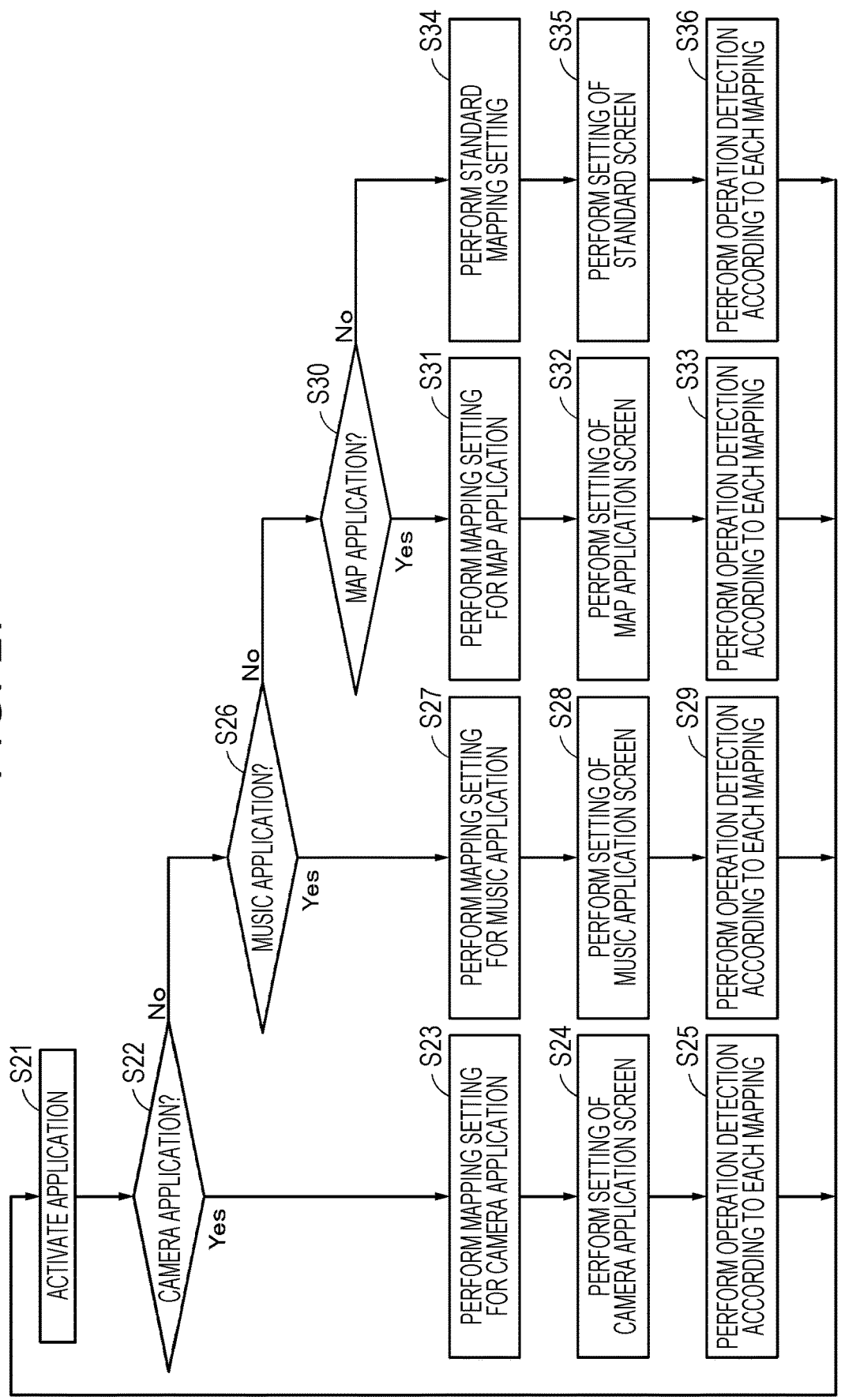
FIG. 27 is a flowchart for explaining an operation of the electronic device according to the second embodiment of the present disclosure.

With reference to FIG. 27, an operation of the electronic device according to the second embodiment will be described.

First, when an activation operation of an application is performed by the user in step S21, in step S22, the CPU 12B determines whether or not an activation operation of the camera application has been performed.

In a case where it is determined in step S22 that the activation operation of the camera application has been performed, in step S23, the CPU 12B performs mapping setting of each operation (zoom-out operation, zoom-in operation, and shutter operation) of the camera application, on the plurality of sensing units SE (see FIG. 24B). Next, in step S24, the CPU 12B displays a camera application screen on the display device 13A (see FIG. 24A).

Next, in step S25, the CPU 12B performs operation detection according to the mapping setting in step S23. Specifically, the zoom-out operation detection, the zoom-in operation detection, and the shutter operation detection are performed respectively in the SE (2, 2), the SE (2, 4), and the SE (2, 10), while a malfunction of the zoom-out operation, the zoom-in operation, and the shutter operation is compensated in the sensing unit SE other than the SE (2, 2), the SE (2, 4), and the SE (2, 10).

In a case where it is determined in step S22 that the activation operation of the camera application has not been performed, in step S26, the CPU 12B determines whether or not an activation operation of the music application has been performed. In a case where it is determined in step S26 that the activation operation of the music application has been performed, in step S27, the CPU 12B performs mapping setting of each operation (fast-forward playback operation, pause operation, fast-reverse playback operation, volume up operation, and volume down operation) of the music application, on the plurality of sensing units SE (see FIG. 25B). Next, in step S28, the CPU 12B displays a music application screen on the display device 13A (see FIG. 25A).

Next, in step S29, the CPU 12B performs operation detection according to the mapping setting in step S27. Specifically, the fast-forward playback operation, the pause operation, the fast-reverse playback operation, the volume up operation, and the volume down operation are respectively detected in the SE (2, 1), the SE (2, 3), the SE (2, 5), the SE (2, 9), and the SE (2, 11), while a malfunction of the fast-forward playback operation, the pause operation, the fast-reverse playback operation, the volume up operation, and the volume down operation is compensated in the sensing unit SE other than the SE (2, 1), the SE (2, 3), the SE (2, 5), the SE (2, 9), and the SE (2, 11).

In a case where it is determined in step S26 that the activation operation of the music application has not been performed, in step S30, the CPU 12B determines whether or not an activation operation of the map application has been performed. In a case where it is determined in step S30 that the activation operation of the map application has been performed, in step S31, the CPU 12B performs mapping setting for each operation (zoom-out operation, zoom-in operation, up scroll operation, down scroll operation, right scroll operation, and left scroll operation) of the map application, on the plurality of sensing units SE (see FIG. 26B).

Next, in step S32, the CPU 12B displays a map application screen on the display device 13A (see FIG. 26A). Next, in step S33, the CPU 12B performs operation detection according to the mapping setting in step S31. Specifically, the zoom-out operation, the zoom-in operation, the up scroll operation, the down scroll operation, the right scroll operation, and the left scroll operation are respectively detected in the SE (2, 1), the SE (2, 3), the SE (2, 7), the SE (2, 11), the SE (1, 9), and the SE (3, 9), while a malfunction of the zoom-out operation, the zoom-in operation, the up scroll operation, the down scroll operation, the right scroll operation, and the left scroll operation is compensated in the sensing unit SE other than the SE (2, 1), the SE (2, 3), the SE (2, 7), the SE (2, 11), the SE (1, 9), and the SE (3, 9).

In a case where it is determined in step S30 that the activation operation of the map application has not been performed, in step S34, the CPU 12B performs standard mapping setting on the plurality of sensing units SE. Next, in step S35, the CPU 12B displays a standard screen on the display device 13A. Next, in step S36, the CPU 12B performs operation detection according to the mapping setting in step S34.

Here, the standard mapping setting refers to default mapping setting that is set in a case where none of the camera application, the music application, the map application, and the like is not selected. Furthermore, the standard screen refers to a default screen that is set in a case where none of the camera application, music application, map application, and the like is selected.

Effect

In the electronic device 110 according to the second embodiment, an operation unit corresponding to various applications can be set in the side wall part 11R. Therefore, various applications can be operated by pressing the side wall part 11R.

3 Third Embodiment

[Configuration of Electronic Device]

Figure 28:
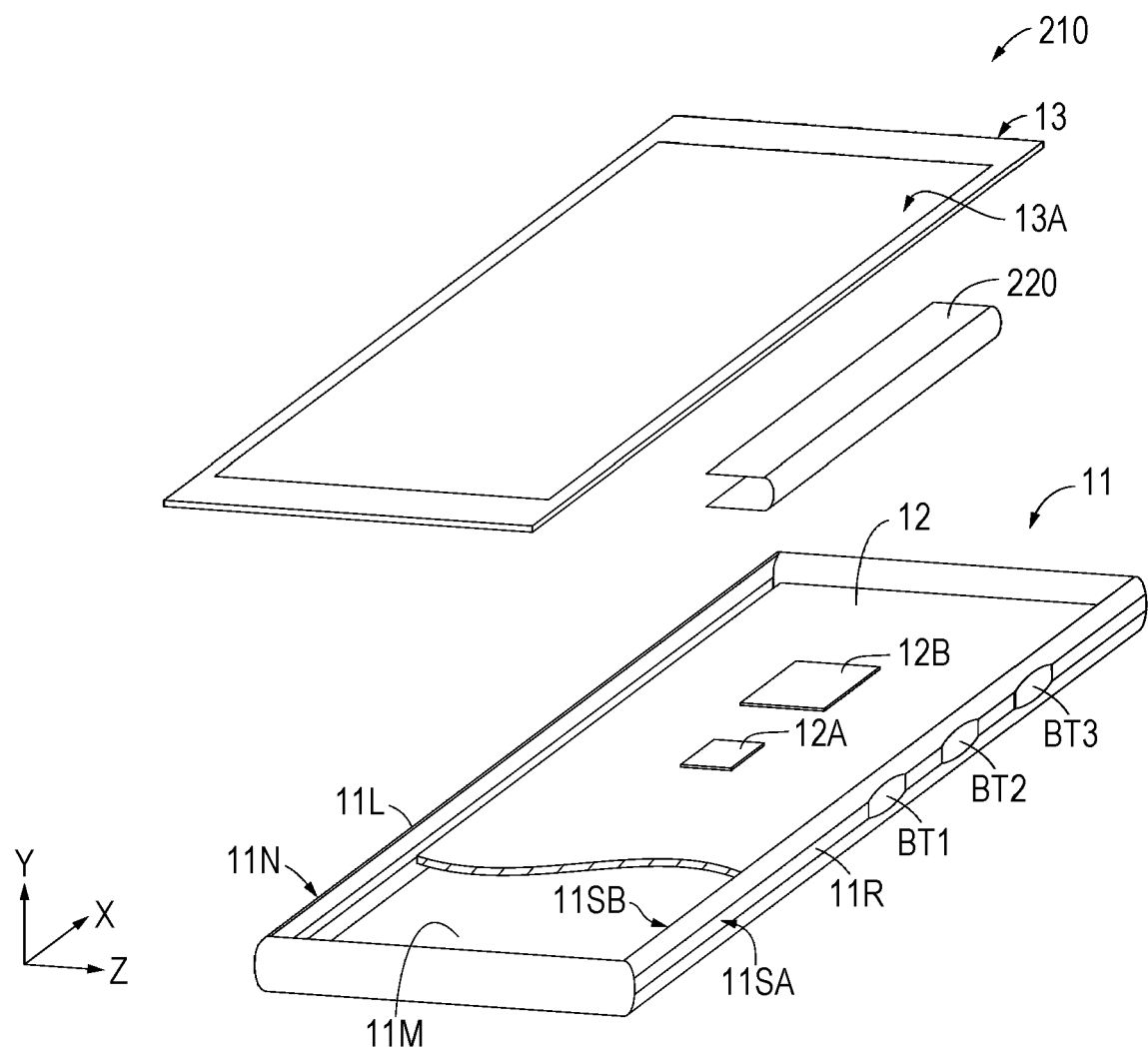
FIG. 28 is an exploded perspective view showing a configuration of an electronic device according to a third embodiment of the present disclosure.

As shown in FIG. 28, an electronic device 210 according to a third embodiment is different from the electronic device 110 according to the first embodiment in that a rectangular film-shaped sensor 220 curved in a substantially U shape is provided inside a side wall part 11R. The curved sensor 220 may be pressed against inner surfaces of the side wall part 11R, a bottom part 11M, and a front panel 13 by a supporting member (not shown), or may be bonded by an adhesive and the like.

FIG. 29A shows a configuration of the sensor 220. FIG. 29B shows the sensor 220 in a state of being developed in a flat shape. The sensor 220 includes sensing units SE1 to SE11. The sensor 220 includes a first region R1 disposed on the inner surface of the side wall part 11R, a second region R2 disposed on the inner surface of the bottom part 11M, and a third region R3 disposed on the inner surface of the front panel 13.

The sensing units SE3, SE6, and SE9 are provided in the first region R1, and detect pressing on the side wall part 11R. More specifically, the sensing units SE3, SE6, and SE9 are provided corresponding to buttons BT1, BT2, and BT3, respectively, and detect pressing of the buttons BT1, BT2, and BT3. The sensing units SE3, SE6, and SE9 are arranged with equal intervals in a length direction of the side wall part 11R. The sensing units SE3, SE6, and SE9 have a rhombus shape, and are arranged such that an extending and contacting direction of one diagonal line of the sensing units SE3, SE6, and SE9 each coincides with a length direction of the side wall part 11R. Therefore, it is possible to shorten a distance of adjacent sensing unit SE3, SE6, and SE9.

The sensing units SE1, SE4, SE7, and SE10 are provided so as to cross a boundary between the first and second regions R1 and R2. Since the sensing units SE1, SE4, SE7, and SE10 are provided so as to cross the boundary, pressing of a housing 11 can be detected over a wide range, and pressing of the boundary between the first and second regions R1 and R2 (that is, a corner portion of the housing 11) can be detected. The sensing units SE1, SE4, SE7, and SE10 are arranged in a stripe shape with equal intervals perpendicular to the side wall part 11R, and one ends of the sensing units SE1, SE4, SE7, and SE10 have a V-shape and are extended to the first region R1.

The sensing units SE2, SE5, SE8, and SE11 are provided so as to cross a boundary between the first and third regions R1 and R3. Since the sensing units SE2, SE5, SE8, and SE11 are provided so as to cross the boundary, pressing of the housing 11 can be detected over a wide range, and pressing of the boundary between the first and third regions R1 and R3 (that is, a corner portion of the housing 11) can be detected. The sensing units SE2, SE5, SE8, and SE11 are arranged in a stripe shape with equal intervals perpendicular to the side wall part 11R, and one ends of the sensing units SE2, SE5, SE8, and SE11 have a V-shape and are extended to the first region R1.

One ends of the sensing units SE1, SE4, SE7, and SE10 are provided to face one ends of the sensing units SE2, SE5, SE8, and SE11 in the first region R1, respectively. Furthermore, in a region surrounded by one ends of the adjacent sensing units SE1 and SE4 and one ends of the adjacent sensing units SE2 and SE5, a sensing unit SE3 is provided. Furthermore, in a region surrounded by one ends of the adjacent sensing units SE4 and SE7 and one ends of the adjacent sensing units SE5 and SE8, a sensing unit SE6 is provided. Furthermore, in a region surrounded by one ends of the adjacent sensing units SE7 and SE10 and one ends of the adjacent sensing units SE8 and SE11, a sensing unit SE9 is provided.

The sensing units SE3, SE6, and SE9 are sensing units for user operation detection for detection of pressing of the buttons BT1, BT2, and BT3, respectively. The sensing units SE1, SE2, SE4, SE5, SE7, SE8, SE10, and SE11 each are sensing units for malfunction compensation.

Figure 30:
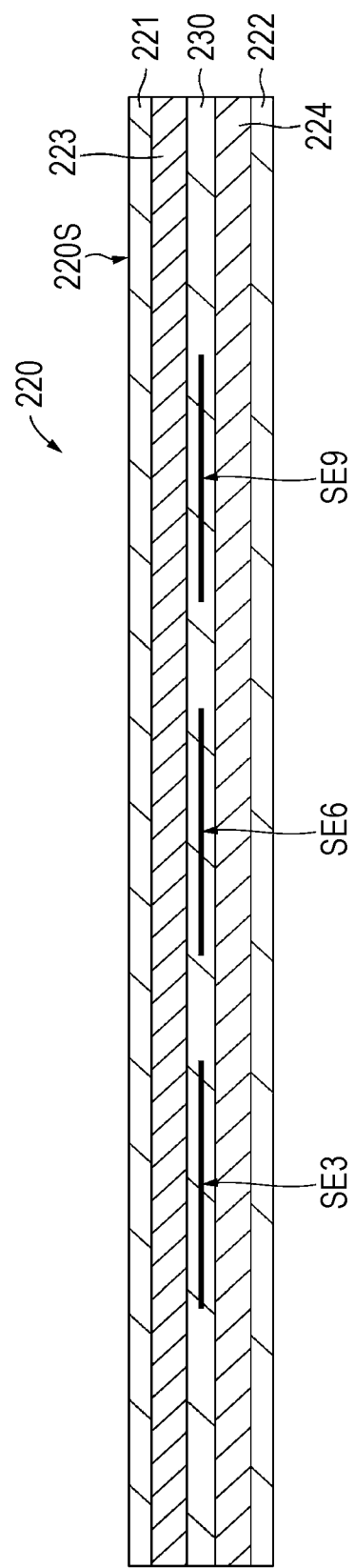
FIG. 30 is a cross-sectional view taken along line XXX-XXX of FIG. 29.

As shown in FIG. 30, the sensor 220 includes: a sensor electrode layer 230 of a mutual-capacitance type having the sensing units SE1 to SE11; metal layers 221 and 222; an elastic layer 223; and an adhesive layer 224.

The elastic layer 223 is provided between main surfaces of the metal layer 221 and the sensor electrode layer 230, and is elastically deformed by pressure applied to a sensing surface 220S. The elastic layer 223 includes a dielectric such as a foamed resin or an insulating elastomer. The foamed resin is a so-called sponge, and is at least one of, for example, foamed polyurethane, foamed polyethylene, foamed polyolefin, or sponge rubber, and the like. The insulating elastomer is, for example, at least one of silicone-based elastomer, acrylic-based elastomer, urethane-based elastomer, or styrene-based elastomer, and the like. Note that the elastic layer 223 may be provided on a base material (not shown).

Figure 31:
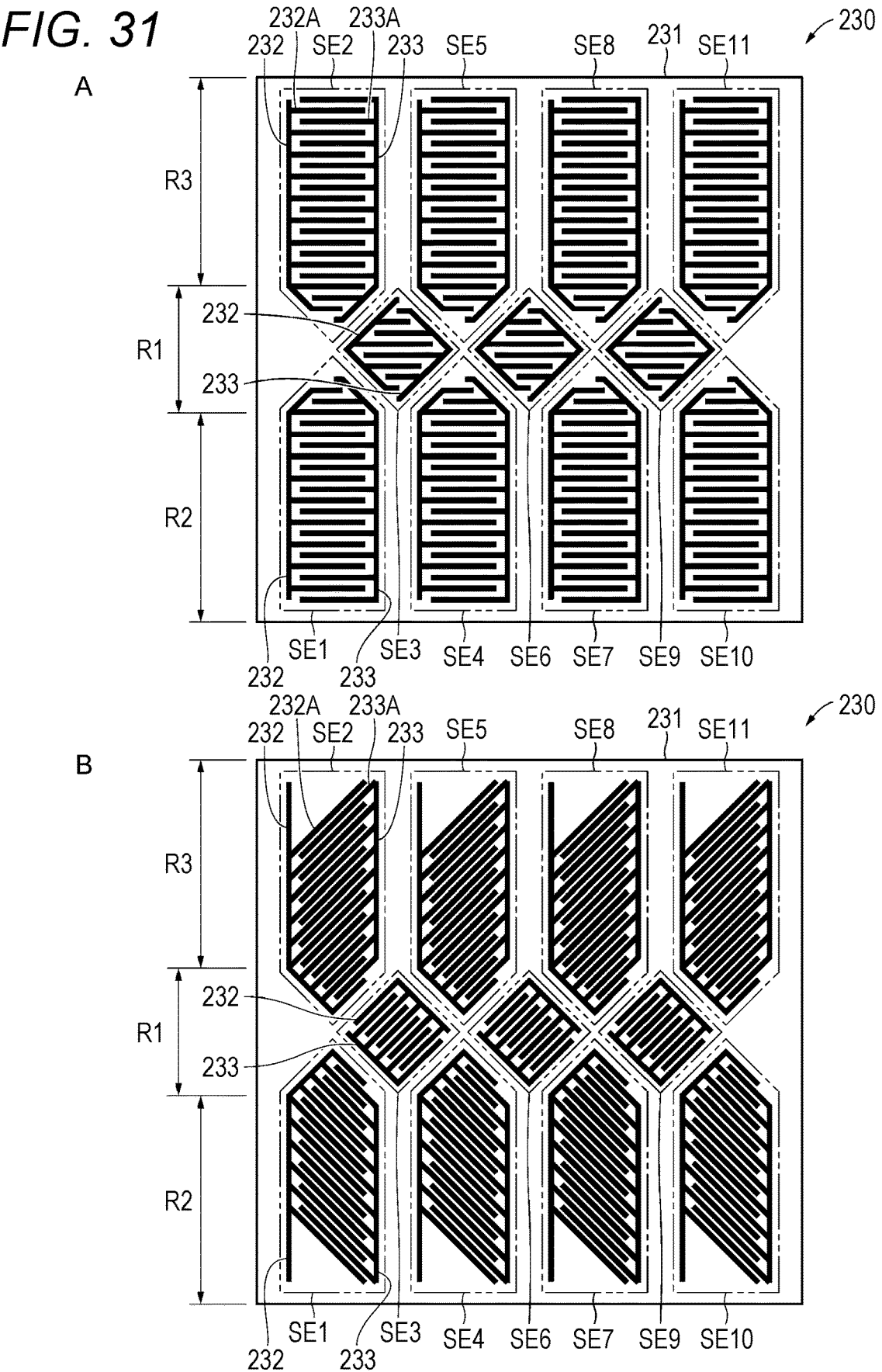
FIG. 31A is a plan view showing a configuration example of a sensor electrode layer of a mutual-capacitance type.
FIG. 31B is a plan view showing another configuration example of a sensor electrode layer of a mutual-capacitance type.

FIG. 31A shows a configuration of the sensor electrode layer 230 of a mutual-capacitance type. The sensor electrode layer 230 includes: a base material 231; and first and second electrodes 232 and 233 provided on one main surface of the base material 231. The first and second electrodes 232 and 233 form the sensing units SE1 to SE11. The first and second electrodes 232 and 233 have a comb-teeth shape, and are arranged so as to mesh the comb-teeth portions. Specifically, the first electrode 232 includes a plurality of sub-electrodes 232A having a linear shape. The second electrode 233 includes a plurality of sub-electrodes 233A having a linear shape. The plurality of sub-electrodes 232A and 233A is extended so as to be parallel to a pair of opposing edges of the sensor 220. Note that, as shown in FIG. 31B, the plurality of sub-electrodes 232A and 233A may be extended so as to be inclined with respect to the pair of opposing edges of the sensor 220.

FIG. 32A shows an example of a pressing position of the sensor 220. FIG. 32B shows detection signals of the sensing units SE1 to SE11 when a position PA shown in FIG. 32A is pressed. FIG. 32C shows detection signals of the sensing units SE1 to SE11 when a position PB shown in FIG. 32A is pressed. In a case where the position PA shown in FIG. 32A is pressed, the detection signals of the sensing units SE2, SE3, SE5, SE8, and SE11 become high. In a case where the position PB shown in FIG. 32A is pressed, the detection signals of the sensing units SE5, SE8, SE9, SE10, and SE11 become high. Note that polarity of a detection signal of the sensing unit SE10 is opposite to that of the sensing units SE5, SE8, SE9, SE10, and SE11.

The metal layers 221 and 222 and the adhesive layer 224 are similar to the metal layers 21 and 22 and the adhesive layer 24 in the first embodiment, respectively, except for the shape.

[Operation of Electronic Device]

Figure 33:
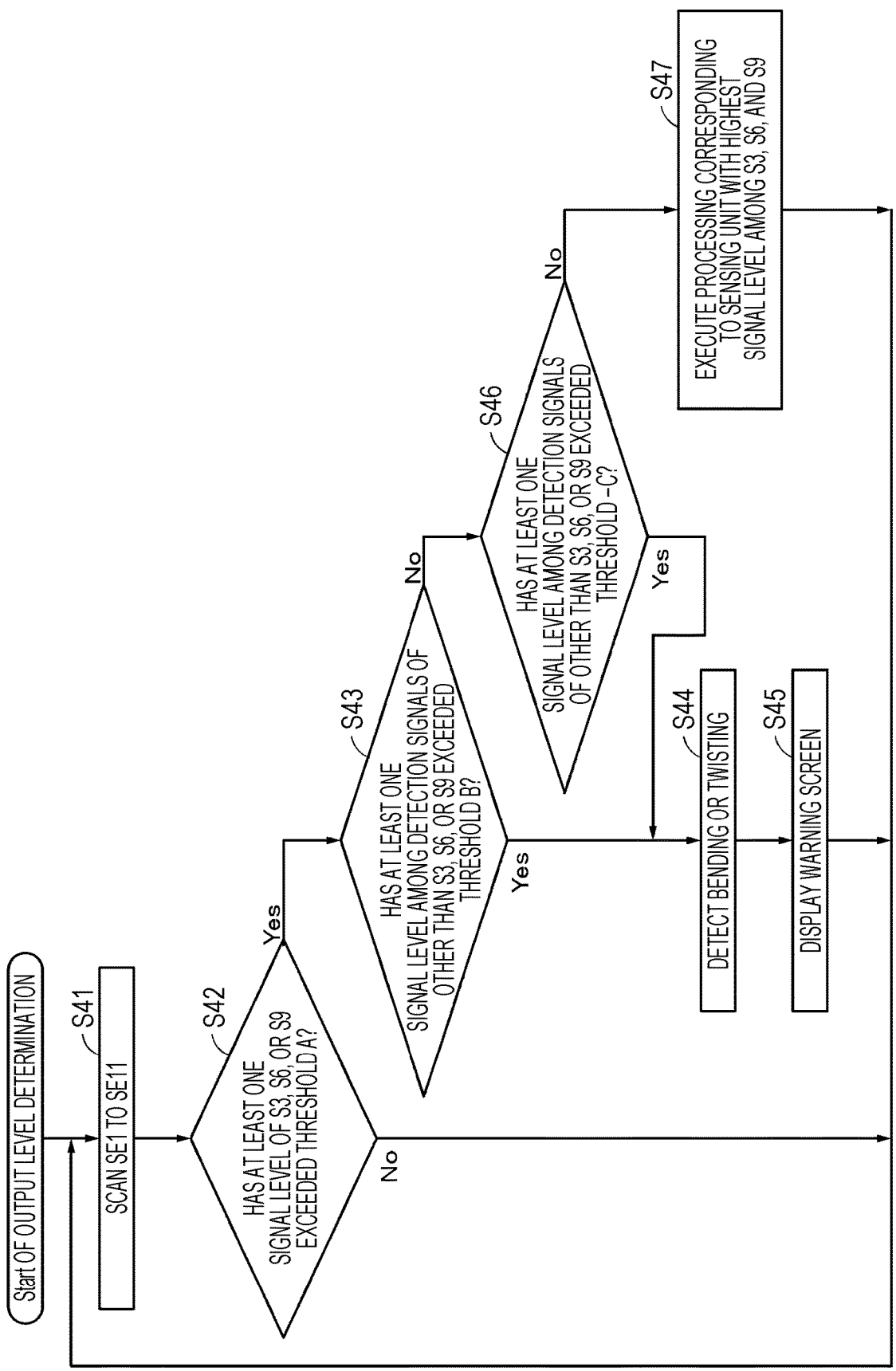
FIG. 33 is a flowchart for explaining an operation of the electronic device according to the third embodiment of the present disclosure.

With reference to FIG. 33, an operation of an electronic device according to the third embodiment will be described. Note that, in FIG. 33, detection signals S1, S2, . . . , S11 are simplified and denoted as S1, S2, . . . , S11, respectively. The detection signals S1, S2, . . . , S11 mean the detection signals of the sensing units SE1, SE2, . . . , SE11, respectively.

First, in step S41, an IC 12A sequentially scans the sensing units SE1 to SE11, acquires the respective detection signals S1 to S11 of the sensing units SE1 to SE11, and supplies to the CPU 12B. Next, in step S42, the CPU 12B determines whether or not at least one of the detection signals S3, S6, and S9 supplied from the IC 12A exceeds a threshold A. In a case where it is determined in step S42 that none of at least one of the detection signals S3, S6, and S9 exceeds the threshold A, the CPU 12B returns the process to step S41. In a case where it is determined in step S42 that at least one of the detection signals S3, S6, and S9 exceeds the threshold A, in step S43, the CPU 12B determines whether or not at least one of the detection signals S1, S2, S4, S5, S7, S8, S10, and S11 other than the detection signals S3, S6, and S9 exceeds a threshold B.

In a case where it is determined in step S43 that at least one of the detection signals S1, S2, S4, S5, S7, S8, S10, and S11 exceeds the threshold B, in step S44, the CPU 12B determines that bending or twisting has been applied to the electronic device 10. Then, in step S45, the CPU 12B displays a screen (see FIG. 13A) that warns a user that bending or twisting has been applied to the electronic device 10, and returns the process to step S41. In a case where it is determined in step S43 that none of at least one of the detection signals S1, S2, S4, S5, S7, S8, S10, and S11 exceeds the threshold B, in step S46, the CPU 12B determines whether or not at least one of the detection signals S1, S2, S4, S5, S7, S8, S10, and S11 exceeds a threshold -C.

In a case where it is determined in step S46 that at least one of the detection signals S1, S2, S4, S5, S7, S8, S10, and S11 exceeds the threshold -C, the CPU 12B executes the processes of steps S44 and 45 and then returns the process to step S41. In a case where it is determined in step S46 that none of at least one of the detection signals S1, S2, S4, S5, S7, S8, S10, and S11 exceeds the threshold -C, the CPU 12B executes processing corresponding to a sensing unit SE in which a signal having the highest signal level among the detection signals S3, S6, and S9 is detected, and returns the process to step S41.

Effect

The electronic device 210 according to the third embodiment includes: the sensing unit SE for user operation detection arranged on an inner surface 11SB of the side wall part 11R; the sensing unit SE for malfunction compensation arranged on the inner surface of the bottom part 11M; and the sensing unit SE for malfunction compensation arranged on the inner surface of the front panel 13. Therefore, a malfunction of the electronic device 210 can be suppressed.

MODIFIED EXAMPLE

Modified Example 1

In the third embodiment described above, a case has been described where the sensor 220 is the mutual-capacitance type, but the sensor 220 may be a self-capacitance type.

Figure 34:
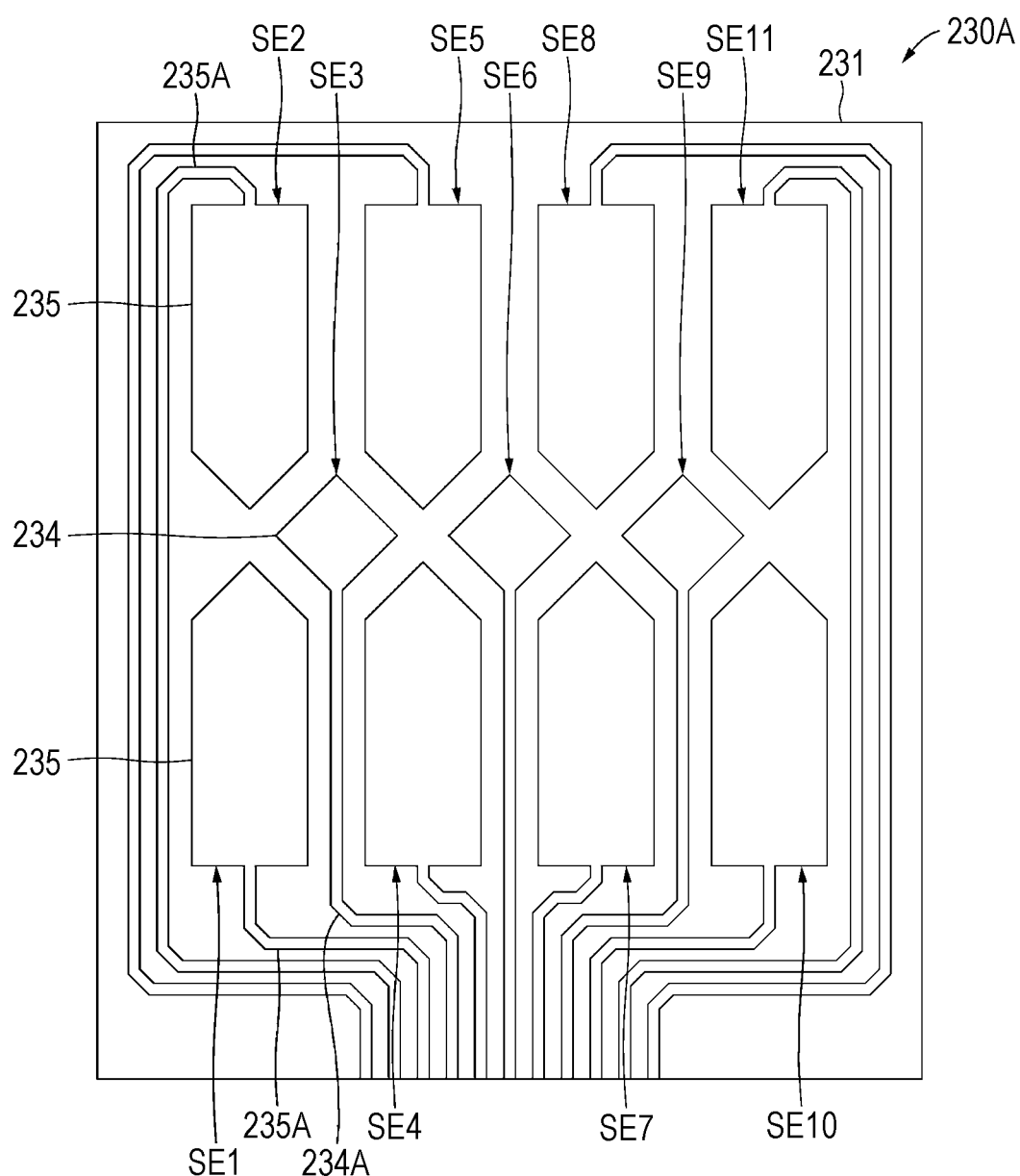
FIG. 34 is a plan view showing a configuration of a sensor electrode layer of a self-capacitance type.

FIG. 34 is a plan view showing a configuration of a sensor electrode layer 230A of a self-capacitance type. The sensor electrode layer 230A includes a base material 231 and a plurality of electrodes 234 and 235 provided on one main surface of the base material 231. The individual electrodes 234 and 235 form sensing units SE1 to SE11. The sensing units SE1 to SE11 are all thin film electrodes. The sensing units SE3, SE6, and SE9 are configured by the electrode 234 having a rhombus thin film shape. However, the shape of the electrode 234 is not limited to a rhombus shape, and may be a circular shape, an elliptical shape, a polygonal shape other than a rhombus shape, an irregular shape, and the like. The sensing units SE1, SE2, SE4, SE5, SE7, SE8, SE10, and SE11 are configured by the electrode 235 having a pentagonal thin film shape in which one short edge of a rectangular shape is pointed in a V shape. However, the electrode 235 is not limited to the shape described above, and may be an oblong shape, a polygonal shape other than a pentagonal shape (for example, a rectangular shape), an irregular shape, and the like.

Wiring 234A is drawn from the sensing units SE3, SE6, and SE9 and is electrically connected to a connector 42. Furthermore, wiring 235A is drawn out from the sensing units SE1, SE2, SE4, SE5, SE7, SE8, SE10, and SE11, and is electrically connected to the connector 42.

Modified Example 2

Instead of the elastic layer 223, the sensor 220 may include a plurality of supports having a columnar shape. The support is provided between adjacent sensing units SE, for example.

Modified Example 3

The sensor 220 may be curved in a substantially L shape. In this case, the sensor 220 has the first region R1, and one of the second region R2 and the third region R3.

4 Fourth Embodiment

[Configuration of Electronic Device]

FIG. 35A shows an internal configuration of an electronic device 310 according to a fourth embodiment of the present disclosure. The electronic device 310 is a so-called smartphone, and includes a housing 311, a sensor module 320, a board 312, and the like. Note that, in the fourth embodiment, same reference numerals are assigned to points similar to those in the first embodiment, and descriptions thereof are omitted as appropriate.

(Housing)

The housing 311 includes side wall parts 311L and 311R, and one side wall part 311L is provided with an elongated slit part 311A. The slit part 311A is provided such that a width direction (short direction) of the slit part 311A is to be a height direction of the side wall part 311L, and a longitudinal direction of the slit part 311A is to be a length direction of the side wall part 311L.

Three buttons (not shown) are provided on an outer surface 311SA of the side wall part 311L so as to be aligned in one line in a length direction of the side wall part 311L. These three buttons correspond to the buttons BT1, BT2, and BT3 (see FIG. 1) in the first embodiment. On an upper part of the side wall part 311L, a sloped area 311AR is provided to be adjacent to the slit part 311A, and a waterproof tape (not shown) is provided in this area 311AR.

(Sensor Module)

Figure 36:
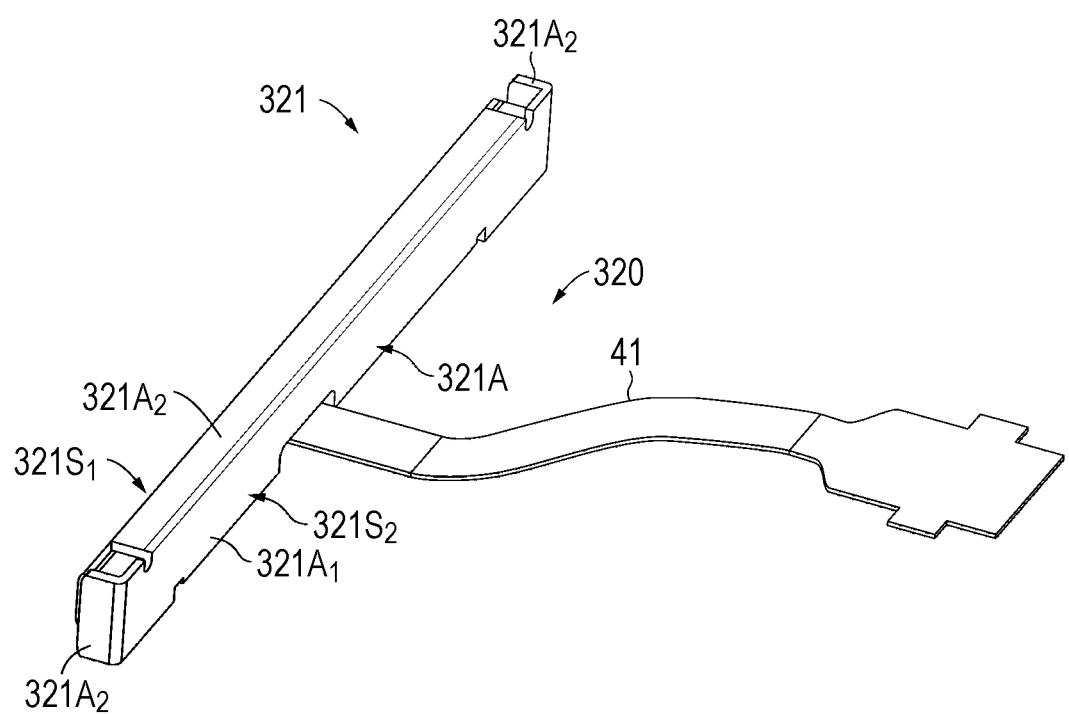
FIG. 36 is a perspective view showing an appearance of a sensor module.

FIG. 36 is a perspective view showing an appearance of the sensor module 320. The sensor module 320 includes an elongated sensor unit 321 and a connecting part 41 extended from one long edge part of the sensor unit 321. A connector (not shown) included in the connecting part 41 is connected to a connector (not shown) provided on the board 312.

(Sensor Unit)

FIG. 35B is a cross-sectional view taken along line XXXVB-XXXVB in FIG. 35A.

The sensor unit 321 includes a sensor 20, an elastic body 51 provided on a back surface of the sensor 20, and a holder 321A configured to support the elastic body 51. The sensor 20 and the elastic body 51 are bonded together by an adhesive layer (not shown), and the elastic body 51 and the holder 321A are bonded together by an adhesive layer (not shown). As described in the first embodiment, the sensor 20 and the connecting part 41 are integrally configured by one FPC 40 having a T shape.

The sensor unit 321 has a sensing surface (first surface) $321S_1$ configured to detect pressing, and a back surface (second surface) $321S_2$ on a side opposite to the sensing surface (first surface) $321S_1$. The sensor unit 321 is press-fitted into the slit part 311A such that the sensing surface $321S_1$ faces a direction of the outer surface 311SA of the side wall part 311L. The slit part 311A is an example of an accommodation part to accommodate the sensor unit 321 in the side wall part 311L.

(Elastic Body)

The elastic body 51 is configured to be elastically deformable by pressing the sensor unit 321 in a thickness direction, and is compressed when the sensor unit 321 is press-fitted into the slit part 311A.

(Holder)

The holder 321A is for supporting the elastic body 51 on the back surface 321S$_2$ side and increasing rigidity of the back surface 321S$_2$. Since the sensor unit 321 includes the holder 321A having such a function, the sensor unit 321 can be easily press-fitted into the slit part 311A. The holder 321A has a long rectangular shape, and includes a main surface part 321A$_1$ to which the elastic body 51 is bonded, and a wall part 321A$_2$ provided on each edge of the main surface part 321A$_1$ so as to surround the elastic body 51.

As a material of the holder 321A, for example, a light and highly rigid material, such as metal, polymer resin, ceramic, or wood can be used. Note that two or more of these materials may be layered and used. As the metal, a material similar to that of the metal layers 21 and 22 can be exemplified. However, metal having low conductivity other than those exemplified as the material of the metal layers 21 and 22 may be used. As the polymer resin, a material similar to that of the base material 31 can be exemplified. As the ceramic, for example, porous alumina ceramic, or zirconia, and the like can be used.

(Board)

The board 312 includes an IC (not shown) configured to control the sensor 20 and detect pressure applied to the sensing surface 20S of the sensor 20. The board 312 is connected to a main board (not shown) including a CPU configured to control the entire electronic device 310. The IC and the CPU are similar to the IC 12A and the CPU 12B in the first embodiment, respectively.

Effect

In the electronic device 310 according to the fourth embodiment, a malfunction can be suppressed similarly to the first embodiment.

Furthermore, the sensor unit 321 includes the sensor 20, the elastic body 51 provided on the back surface side of the sensor 20, and the holder 321A configured to support the elastic body 51. Therefore, the sensor unit 321 of the sensor module 320 can be press-fitted into the slit part 311A. Therefore, dimensional tolerances of the slit part 311A and the sensor unit 321 can be absorbed.

Furthermore, the sensor module 320 can be attached to the side wall part 311L by simply press-fitting the sensor unit 321 of the sensor module 320 into the slit part 311A. Therefore, it is easy to attach the sensor module 320, and productivity can be improved.

5 Fifth Embodiment

[Configuration of Electronic Device]

Figure 37:
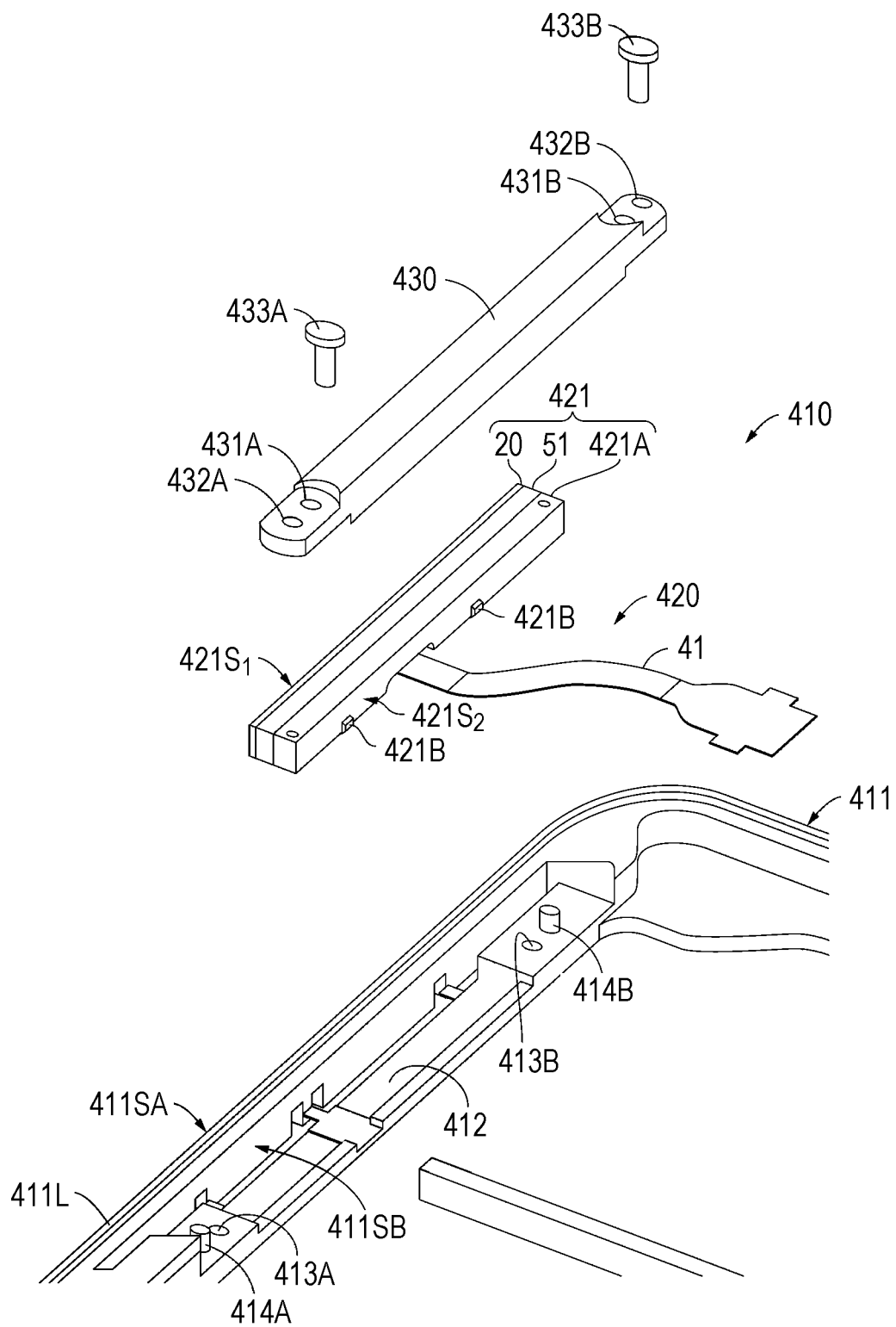
FIG. 37 is an exploded perspective view showing an internal configuration of an electronic device according to a fifth embodiment of the present disclosure.

FIG. 37 shows an internal configuration of an electronic device 410 according to a fifth embodiment of the present disclosure. The electronic device 410 includes a housing 411, a sensor module 420, a reinforcing material (brace) 430, and the like. Note that, in the fifth embodiment, same reference numerals are assigned to points similar to those in the first embodiment, and descriptions thereof are omitted as appropriate.

(Housing)

The housing 411 has a side wall part 411L. Inside the side wall part 411L, a long groove part 412 extended along the side wall part 411L is provided. An aperture 413A and a protrusion 414A are provided outside one end of the groove part 412, and an aperture 413B and a protrusion 414B are provided outside the other end.

Three buttons (not shown) are provided on an outer surface 411SA of the side wall part 411L so as to be aligned in one line in a length direction of the side wall part 411L. These three buttons correspond to the buttons BT1, BT2, and BT3 (see FIG. 1) in the first embodiment.

(Sensor Module)

The sensor module 420 includes an elongated sensor unit 421 and a connecting part 41 extended from one long edge part of the sensor unit 421. A connector (not shown) included in the connecting part 41 is connected to a connector provided on a board (not shown).

Figure 38:
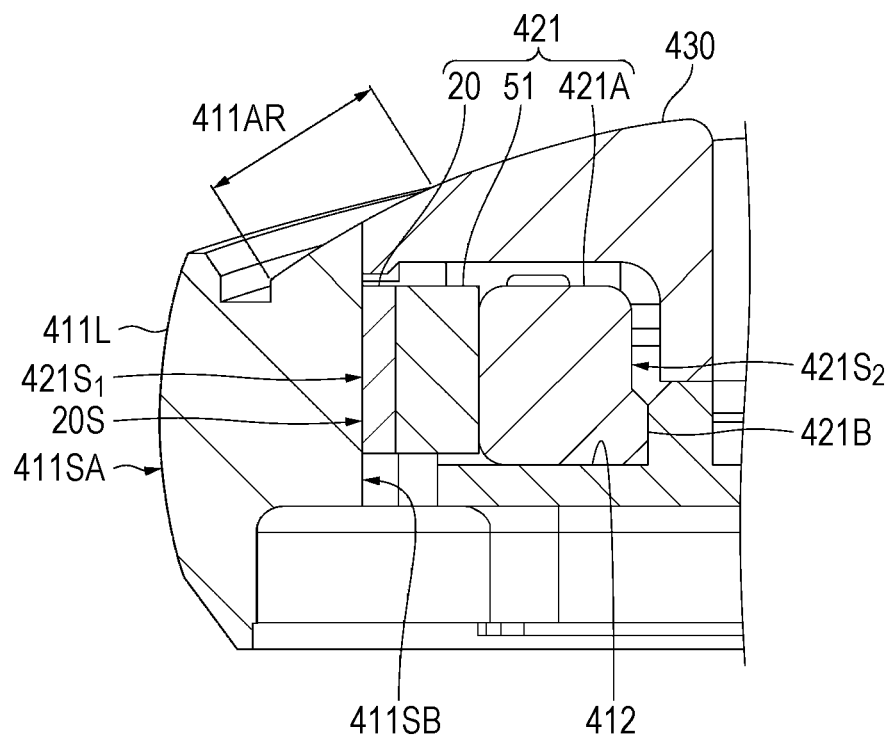
FIG. 38 is a cross-sectional view showing a configuration in the vicinity of a side wall part.

FIG. 38 shows a configuration in the vicinity of the side wall part 411L. The sensor unit 421 includes a sensor 20, an elastic body (cushion layer) 51 provided on a back surface of the sensor 20, and a support (backer) 421A configured to support the elastic body 51. The sensor 20 and the elastic body 51 are bonded together by an adhesive layer (not shown), and the elastic body 51 and the support 421A are bonded together by an adhesive layer (not shown).

The sensor unit 421 has a sensing surface (first surface) 421S$_1$ configured to detect pressing, and a back surface (second surface) 421S$_2$ on a side opposite to the sensing surface (first surface) 421S$_1$. The sensor unit 421 is fitted into the groove part 412 such that the sensing surface 421S$_1$ faces an inner surface 411SB of the side wall part 411L.

The support 421A is for supporting the elastic body 51 on the back surface 421S$_2$ side and increasing rigidity of the back surface 421S$_2$. Since the sensor unit 421 includes the support 421A having such a function, the sensor unit 421 can be fitted into the groove part 412.

On a surface forming the back surface 421S$_2$ of the support 421A, a plurality of protrusions 421B is provided. These protrusions 421B are pushed inside a side wall of the groove part 412. Therefore, a state can be made where the sensing surface 421S$_1$ is pressed against the inner surface 411SB of the side wall part 411L. As a material of the support 421A, a material similar to that of the holder 321A can be exemplified.

(Reinforcing Material)

The reinforcing material 430 covers an upper part and a back surface of the sensor unit 421 fitted into the groove part 412. Since the reinforcing material 430 covers the sensor unit 421 in this manner, it is possible to prevent that other constituent members accommodated in the electronic device 410 come into contact with the sensor unit 421 to cause a malfunction of the sensor unit 421. The reinforcing material 430 has an elongated shape, and both ends of the reinforcing material 430 are fixed by screws 433A and 433B and the protrusions 414A and 414B. Specifically, through holes 431A and 431B and through holes 432A and 432B are provided at both ends of the reinforcing material 430 in a longitudinal direction. The screws 433A and 433B are respectively inserted into the through holes 431A and 431B, and screwed into the apertures 413A and 413B. Furthermore, the protrusions 414A and 414B are inserted into the through holes 432A and 432B, respectively. The protrusions 414A and 414B and the through holes 432A and 432B also have a function as a member that guides the reinforcing material 430 to a prescribed position on the sensor unit 421 when the sensor module 420 is attached.

An upper boundary between the reinforcing material 430 and the side wall part 411L is a flush slope, and a waterproof tape (not shown) is provided in an area 411AR including the boundary.

[Method for Attaching Sensor Module]

Hereinafter, a method for attaching the sensor module 420 will be described with reference to FIGS. 39A, 39B, 40A, and 40B.

First, as shown in FIGS. 39A and 39B, by pushing the plurality of protrusions 421B inside the side wall of the groove part 412 while pressing the sensing surface 421S$_1$ of the sensor unit 421 against the inner surface 411SB of the side wall part 411L, and pressing the sensor unit 421 from the back surface 421S$_2$ side to compress the elastic body 51, the sensor unit 421 is fitted into the groove part 412.

Figure 40:
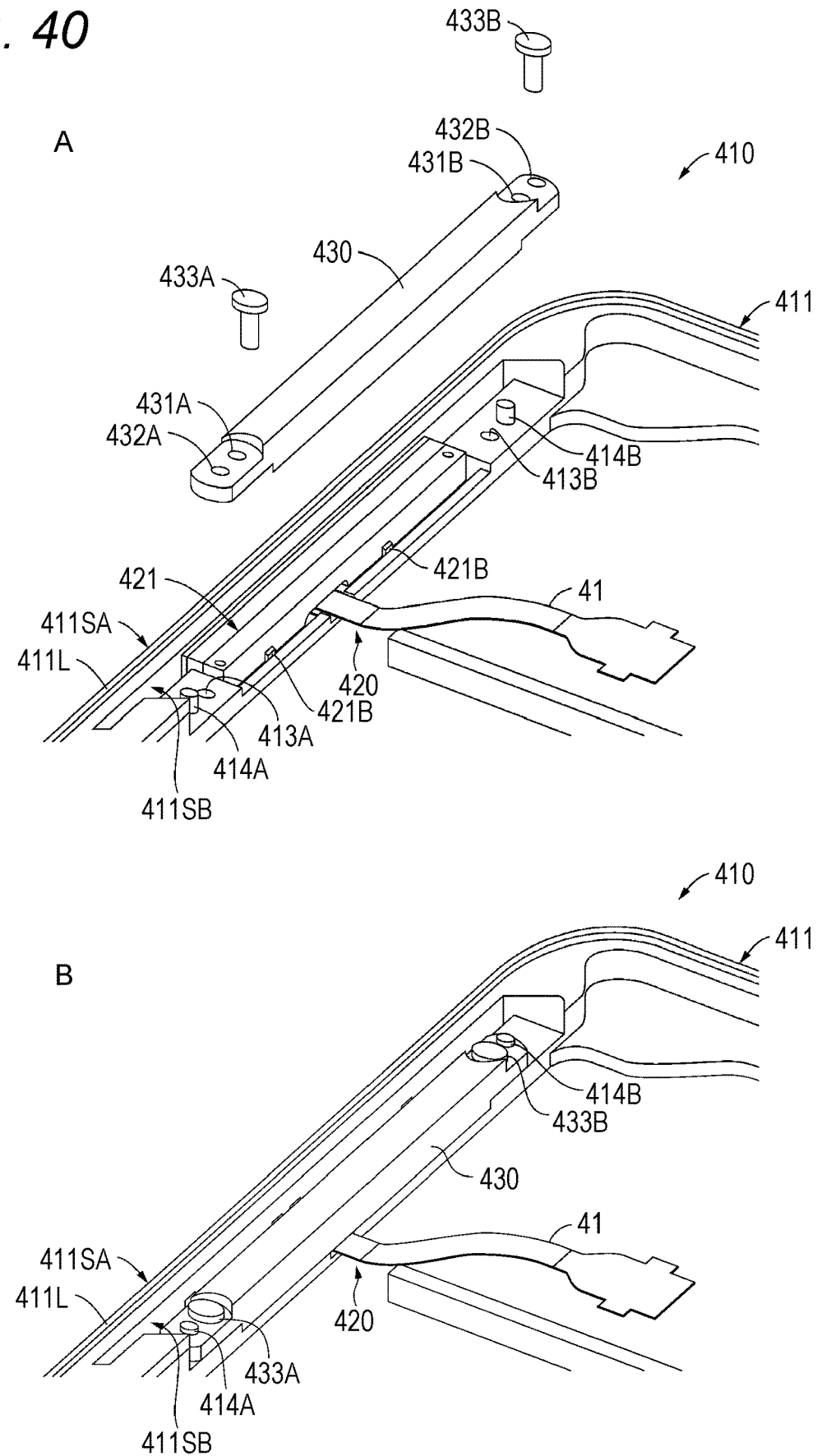
FIG. 40A and FIG. 40B are perspective views for explaining a method for attaching the sensor module.

Next, as shown in FIGS. 40A and 40B, the through holes 432A and 432B of the reinforcing material 430 are respectively inserted into the protrusions 414A and 414B, and the reinforcing material 430 is arranged at a predetermined position on the sensor unit 421. Thereafter, the screws 433A and 433B are inserted into the through holes 431A and 431B of the reinforcing material 430, and screwed into the apertures 413A and 413B. Therefore, the reinforcing material 430 is fixed at a prescribed position on the sensor unit 421.

Effect

In the electronic device 410 according to the fifth embodiment, a malfunction can be suppressed similarly to the first embodiment.

Furthermore, the sensor unit 421 includes the sensor 20, the elastic body 51 provided on the back surface side of the sensor 20, and the support 421A configured to support the elastic body 51. Therefore, the elastic body 51 can be compressed, and the sensor unit 421 can be fitted into the groove part 412. Therefore, dimensional tolerances of the groove part 412 and the sensor unit 421 can be absorbed.

Furthermore, by fitting the sensor unit 421 of the sensor module 420 into the groove part 412, the sensor module 420 can be attached to a prescribed position inside the side wall part 411L. Therefore, it is easy to attach the sensor module 420, and productivity can be improved.

6 Sixth Embodiment

[Configuration of Electronic Device]

Figure 41:
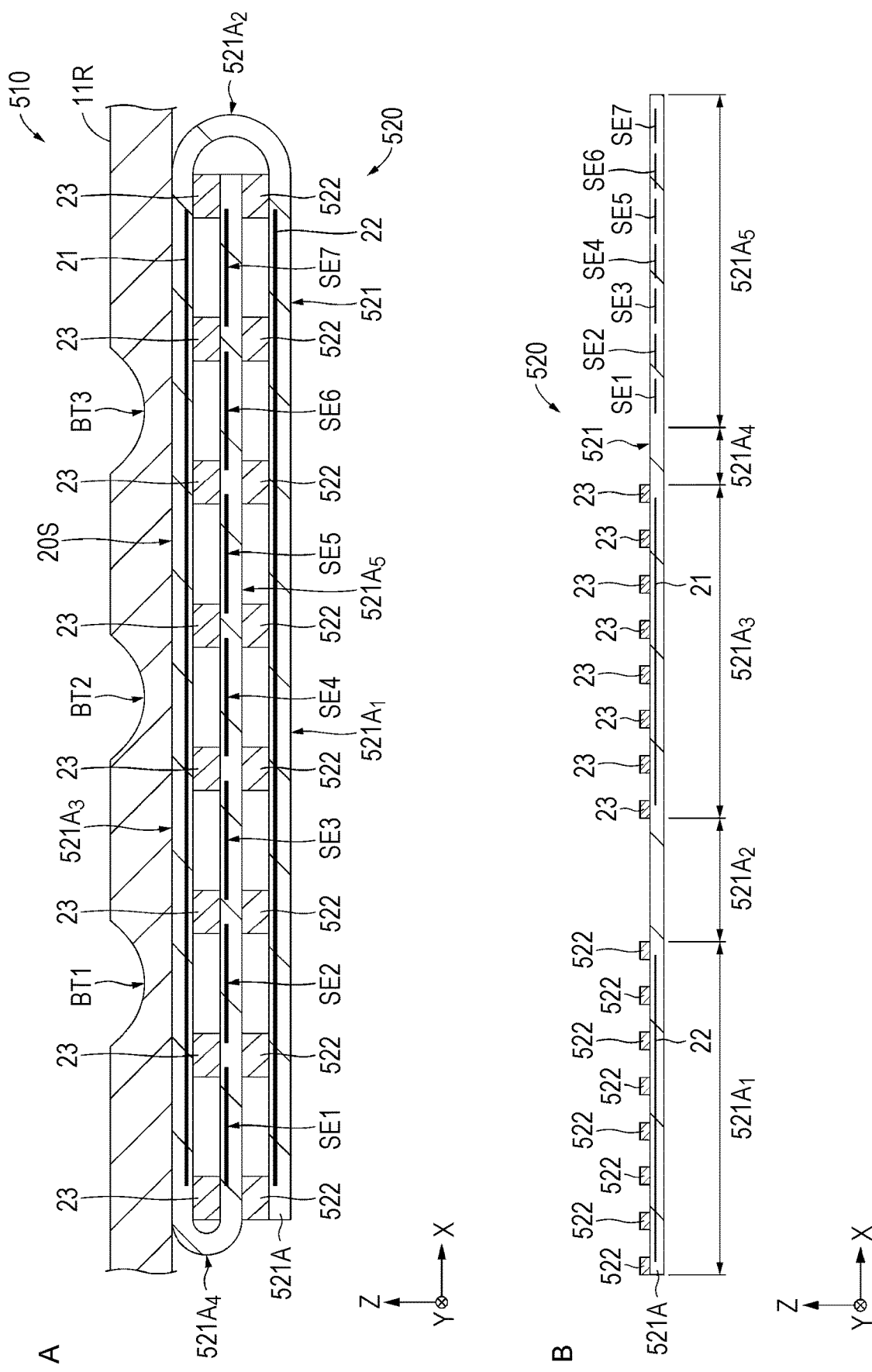
FIG. 41A is a cross-sectional view showing a configuration of an electronic device according to a sixth embodiment of the present disclosure.
FIG. 41B is a cross-sectional view showing a state where the sensor shown in FIG. 41A is developed.

FIG. 41A shows a configuration of an electronic device 510 according to a sixth embodiment of the present disclosure. FIG. 41B shows a state where a sensor 520 shown in FIG. 41A is developed. The electronic device 510 includes the sensor 520 with an FPC 521 as a base. Specifically, the sensor 520 includes the FPC 521, a plurality of supports 522, and a plurality of supports 23. Note that, in the sixth embodiment, same reference numerals are assigned to points similar to those in the first embodiment, and descriptions thereof are omitted as appropriate.

Figure 42:
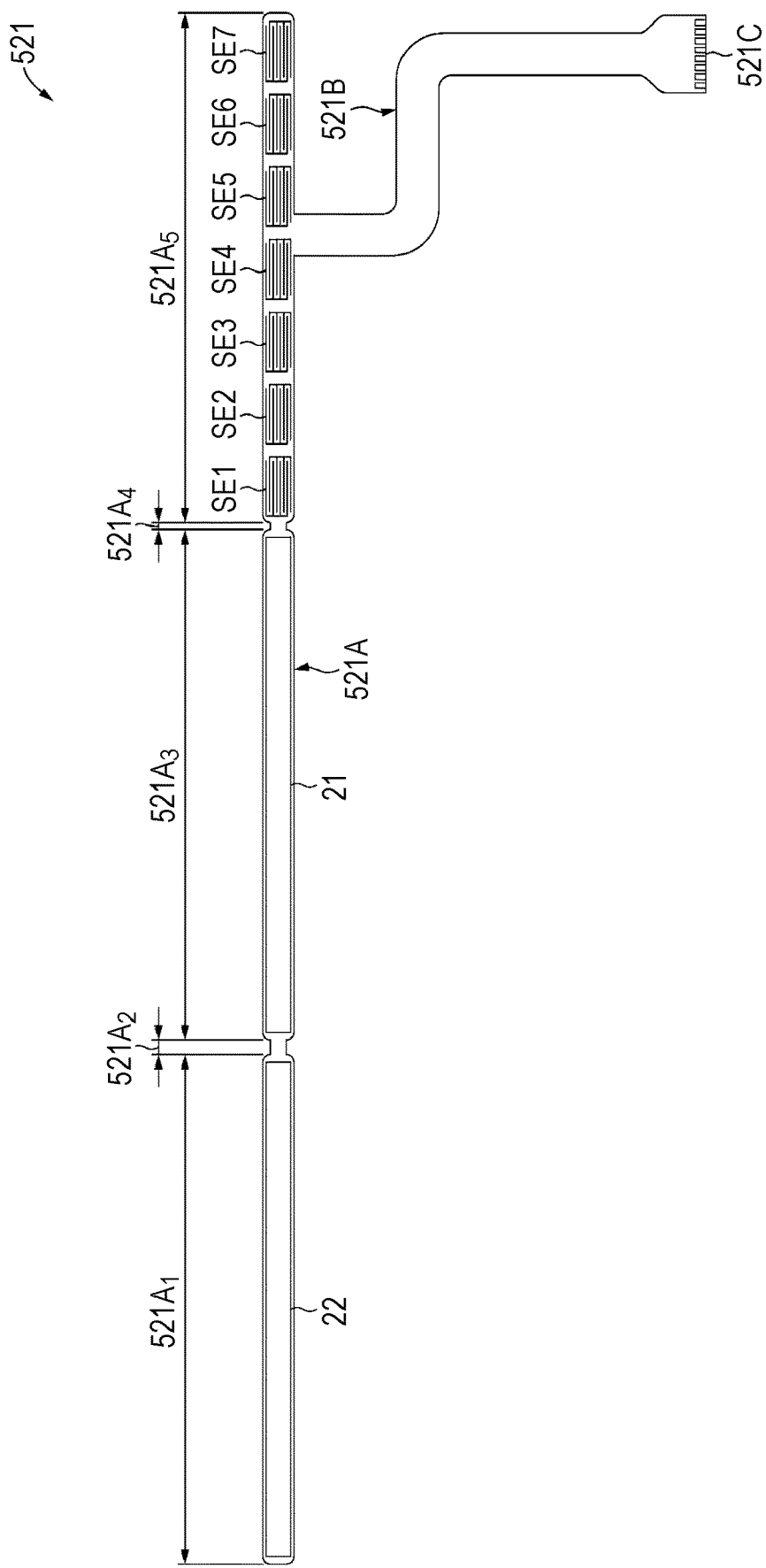
FIG. 42 is a plan view showing a configuration of a flexible printed board.

FIG. 42 shows a configuration of the FPC 521. The FPC 521 includes an elongated sensor unit 521A, and a connecting part 521B extended from one long edge of the sensor unit 521A. At a tip end of the connecting part 521B, a connector 521C for connection of the sensor 520 to the board is provided. In the sensor unit 521A of the FPC 521, a reference electrode area (hereinafter referred to as "REF area") 521A$_1$, a folding area 521A$_2$, a REF area 521A$_3$, a folding area 521A$_4$, and a sensor electrode area 521A$_5$ are provided in this order from one end to the other end in a longitudinal direction.

The sensor unit 521A of the FPC 521 is folded such that the REF area 521A$_1$ and the sensor electrode area 521A$_5$ face each other, and the REF area 521A$_3$ and the sensor electrode area 521A$_5$ face each other. Between the REF area 521A$_1$ and the sensor electrode area 521A$_5$, a plurality of supports 522 is provided, while between the REF area 521A$_3$ and the sensor electrode area 521A$_5$C, a plurality of supports 23 is provided.

The folding area 521A$_2$ is an area for the FPC 521 to be folded between the REF area 521A$_1$ and the REF area 521A$_3$. The folding area 521A$_4$ is an area for the FPC 521 to be folded between the REF area 521A$_3$ and the sensor electrode area 521A$_5$.

The REF area 521A$_1$ is an area corresponding to the metal layer (reference electrode layer) 22 in the first embodiment, and includes a metal layer 22. The REF area 521A$_3$ is an area corresponding to the metal layer (reference electrode layer) 21 in the first embodiment, and includes a metal layer 21. The sensor electrode area 521A$_5$ is an area corresponding to the sensor electrode layer 30 in the first embodiment, and includes sensing units SE1 to SE7.

The support 522 supports the sensor electrode area 521A$_5$ on the REF area 521A$_1$, and separates the REF area 521A$_1$ from the sensor electrode area 521A$_5$. The support 23 supports the REF area 521A$_3$ on the sensor electrode area 521A$_5$, and separates the sensor electrode area 521A$_5$ from the REF area 521A$_3$.

The plurality of supports 522 is arranged in one line with a predetermined interval in a longitudinal direction of the sensor 520, and a space is provided between adjacent supports 522. A sensing unit SE is provided in this space. The plurality of supports 23 is arranged in one line with a predetermined interval in the longitudinal direction of the sensor 520, and a space is provided between adjacent supports 522. A sensing unit SE is provided under this space.

As a material of the support 522, a material similar to that of the support 23 can be exemplified.

The sensing units SE1 to SE7 are connected to a signal terminal of the connector 521C via wiring (not shown) provided on the FPC 521. Furthermore, the metal layers 21 and 22 are connected to a ground (GND) terminal of the connector 521C via wiring (not shown) provided on the FPC 521.

Effect

In the sensor 520 according to the sixth embodiment, one corresponding to the metal layer 21, the metal layer 22, and the sensor electrode layer 30 in the first embodiment can be configured by one FPC 521. Therefore, the number of parts can be reduced as compared with the sensor 20 according to the first embodiment.

The metal layers 21 and 22 are connected to the ground (GND) terminal of the connector 521C via the wiring provided on the FPC 521. Therefore, unlike the sensor 20 in the first embodiment, it is not necessary to separately provide a conductive member such as the ACF, so that the configuration of the sensor 520 can be simplified.

MODIFIED EXAMPLE

Modified Example 1

In the sixth embodiment, a description has been given to a configuration in which the REF area 521A$_1$, the REF area 521A$_3$, and the sensor electrode area 521A$_5$ are provided in one FPC, but the configuration of the sensor 520 is not limited to this. For example, a configuration may be adopted in which the REF area 521A$_1$, the REF area 521A$_3$, and the sensor electrode area 521A$_5$ may be individually provided in different FPCs. Hereinafter, a sensor having such a configuration will be described.

Figure 43:
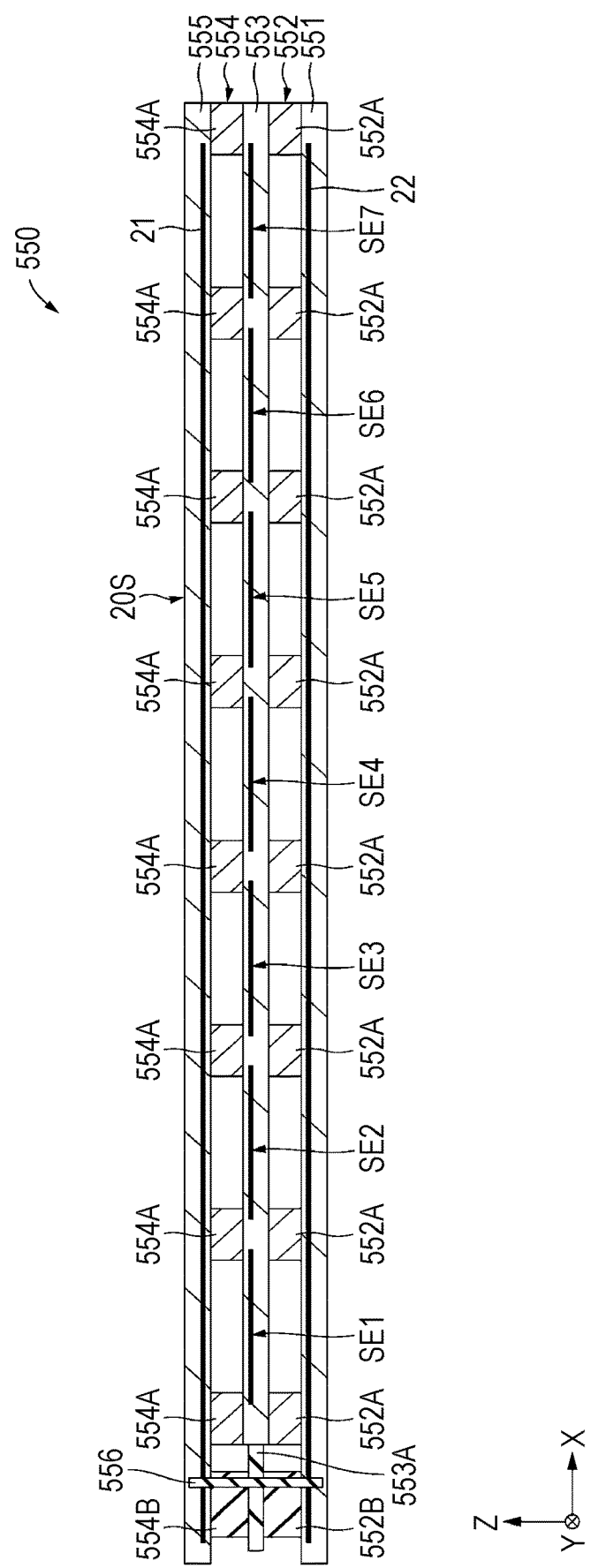
FIG. 43 is a cross-sectional view showing a modified example of the sensor.

FIG. 43 shows a configuration of a sensor 550 according to a modified example. The sensor 550 includes: an elongated FPC 551 including a metal layer 21; a support layer 552 provided on the FPC 551; an elongated FPC 553 provided on the support layer 552 and including sensing units SE1 to SE7; a support layer 554 provided on the FPC 553; and an elongated FPC 555 provided on the support layer 554 and including a metal layer 22.

The support layer 552 supports the FPC 553 on the FPC 551 and separates the FPC 551 from the FPC 553. The support layer 552 has a space between the sensing unit SE included in the FPC 553 and the FPC 551. More specifically, the support layer 552 includes a plurality of supports 552A. The plurality of supports 552A is similar to the supports 25 in Modified Example 1 of the first embodiment.

The support layer 554 supports the FPC 555 on the FPC 553 and separates the FPC 553 from the FPC 555. The support layer 554 has a space between the sensing unit SE included in the FPC 553 and the FPC 555. More specifically, the support layer 554 includes a plurality of supports 554A. The plurality of supports 554A is similar to the supports 23 of the first embodiment.

A ground pad 553A is provided at one end of the FPC 553. The ground pad 553A and one end of the FPC 551 are connected by an adhesive, and the ground pad 553A and one end of the FPC 555 are connected by an adhesive. Furthermore, the ground pad 553A, the one end of the FPC 551, and the one end of the FPC 555 are electrically connected by connection means such as a through hole, a VIA, or a blind via hole (BVH). Therefore, the metal layers 21 and 22 are grounded.

Modified Example 2

In the sixth embodiment, the sensor 520 may include an elastic layer instead of the plurality of supports 522, or may include an elastic layer instead of the plurality of supports 23. Furthermore, in Modified Example 1 of the sixth embodiment, the sensor 550 may include an elastic layer instead of at least one of the support layers 552 and 554. Note that, as a material of the elastic layer, a material similar to that of the elastic layer in Modified Example 1 of the first embodiment can be exemplified.

7 Seventh Embodiment

[Configuration of Electronic Device]

Figure 44:
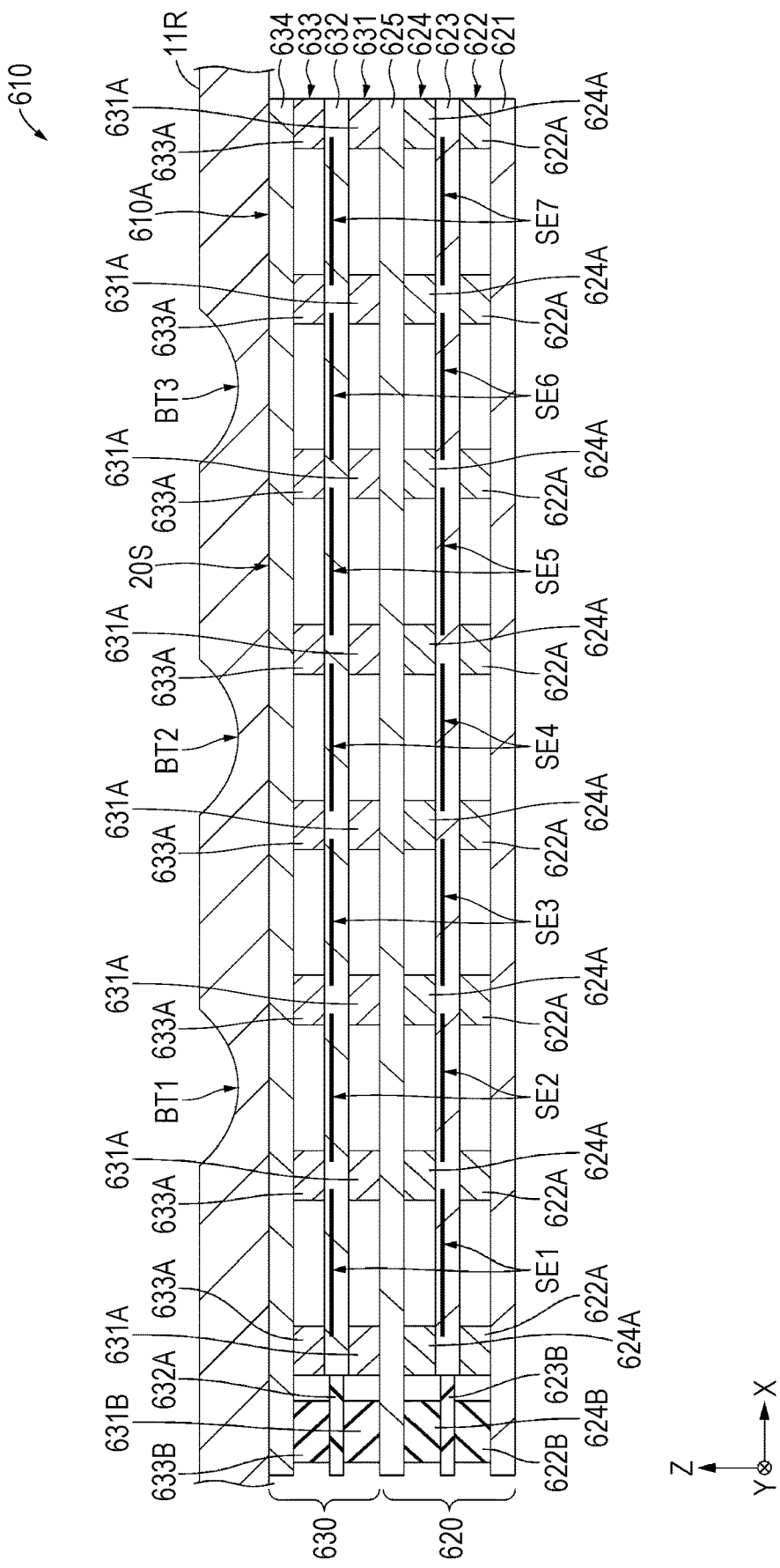
FIG. 44 is a cross-sectional view showing a configuration of an electronic device according to a seventh embodiment of the present disclosure.

FIG. 44 is a cross-sectional view showing a configuration of an electronic device 610 according to a seventh embodiment of the present disclosure. The electronic device 610 includes an elongated sensor 610A including: a first sensor structure 620; and a second sensor structure 630 provided on the first sensor structure 620.

(First Sensor Structure)

The first sensor structure 620 includes: a metal layer (first reference electrode layer) 621; a support layer (first support layer) 622 provided on the metal layer 621; a sensor electrode layer (first sensor electrode layer) 623 provided on the support layer 622; a support layer (second support layer) 624 provided on the sensor electrode layer 623; and a metal layer (second reference electrode layer) 625 provided on the support layer 624.

Furthermore, the first sensor structure 620 includes: a conductive member 622B such as an ACF that connects a ground pad 623A included in the sensor electrode layer 623 at one end to the metal layer 621; and a conductive member 624B such as an ACF that connects the ground pad 623A to the metal layer 625. The metal layer 621 is grounded through the conductive member 622B and the ground pad 623A, and is set to a ground potential. Furthermore, the metal layer 625 is grounded through the conductive member 624B and the ground pad 623A, and is set to a ground potential.

(Second Sensor Structure) The second sensor structure 630 includes: a support layer (third support layer) 631 provided on the metal layer (second reference electrode layer) 625; a sensor electrode layer (second sensor electrode layer) 632 provided on the support layer 631; a support layer (fourth support layer) 633 provided on the sensor electrode layer 632, and a metal layer (third reference electrode layer) 634 provided on the support layer 633.

Furthermore, the second sensor structure 630 includes a conductive member 631B such as an ACF that connects a ground pad 632A included in the sensor electrode layer 632 at one end to the metal layer 625, and a conductive member 633B such as an ACF that connects the ground pad 632A to the metal layer 634. The metal layer 625 is grounded through the conductive member 631B and the ground pad 632A, and is set to the ground potential. Furthermore, the metal layer 634 is grounded through the conductive member 633B and the ground pad 632A, and is set to a ground potential.

(Support Layer)

The support layer 622 supports the sensor electrode layer 623 on the metal layer 621, and separates the metal layer 621 from the sensor electrode layer 623. The support layer 622 has a space between the sensing unit SE included in the sensor electrode layer 623 and the metal layer 621. More specifically, the support layer 622 includes a plurality of supports 622A. The plurality of supports 622A is similar to the supports 25 in Modified Example 1 of the first embodiment.

The support layer 624 supports the metal layer 625 on the sensor electrode layer 623, and separates the sensor electrode layer 623 from the metal layer 625. The support layer 624 has a space between the sensing unit SE included in the sensor electrode layer 623 and the metal layer 625. More specifically, the support layer 624 includes a plurality of supports 624A. The plurality of supports 624A is similar to the supports 23 of the first embodiment.

The support layer 631 supports the sensor electrode layer 632 on the metal layer 625, and separates the metal layer 625 from the sensor electrode layer 632. The support layer 631 has a space between the sensing unit SE included in the sensor electrode layer 632 and the metal layer 625. More specifically, the support layer 631 includes a plurality of supports 631A. The plurality of supports 631A is similar to the supports 25 in Modified Example 1 of the first embodiment.

The support layer 633 supports the metal layer 634 on the sensor electrode layer 632, and separates the sensor electrode layer 632 from the metal layer 634. The support layer 633 has a space between the sensing unit SE included in the sensor electrode layer 632 and the metal layer 634. More specifically, the support layer 633 includes a plurality of supports 633A. The plurality of supports 633A is similar to the supports 23 of the first embodiment.

(Sensor Electrode Layer)

The sensor electrode layers 623 and 632 are similar to the sensor electrode layer 30 in the first embodiment. That is, the sensor electrode layers 623 and 632 are configured by an FPC.

(Metal Layer)

The metal layers 621, 625, and 634 are similar to the metal layers 21 and 22 in the first embodiment.

(IC)

The electronic device 610 includes an IC and a CPU (both not shown). The IC detects a change (pressure) in electrostatic capacity of each sensing unit SE included in the sensor 610A, that is, each sensing unit SE included in the sensor electrode layers 623 and 632, and outputs a signal according to a result thereof to the CPU. Note that the IC may add changes in electrostatic capacity of a pair of sensing units SE that are stacked in a thickness direction of the sensor 610A, and output a signal according to the added value.

Effect

The electronic device 610 according to the seventh embodiment includes: the sensor 610A including the first sensor structure 620; and the second sensor structure 630 provided on the first sensor structure 620. Therefore, it is possible to detect pressing of the buttons BT1, BT2, and BT3, by the sensing units SE of the two sensor electrode layers 623 and 632. Therefore, the detection sensitivity of the buttons BT1, BT2, and BT3 can be improved.

MODIFIED EXAMPLE

Modified Example 1

Figure 45:
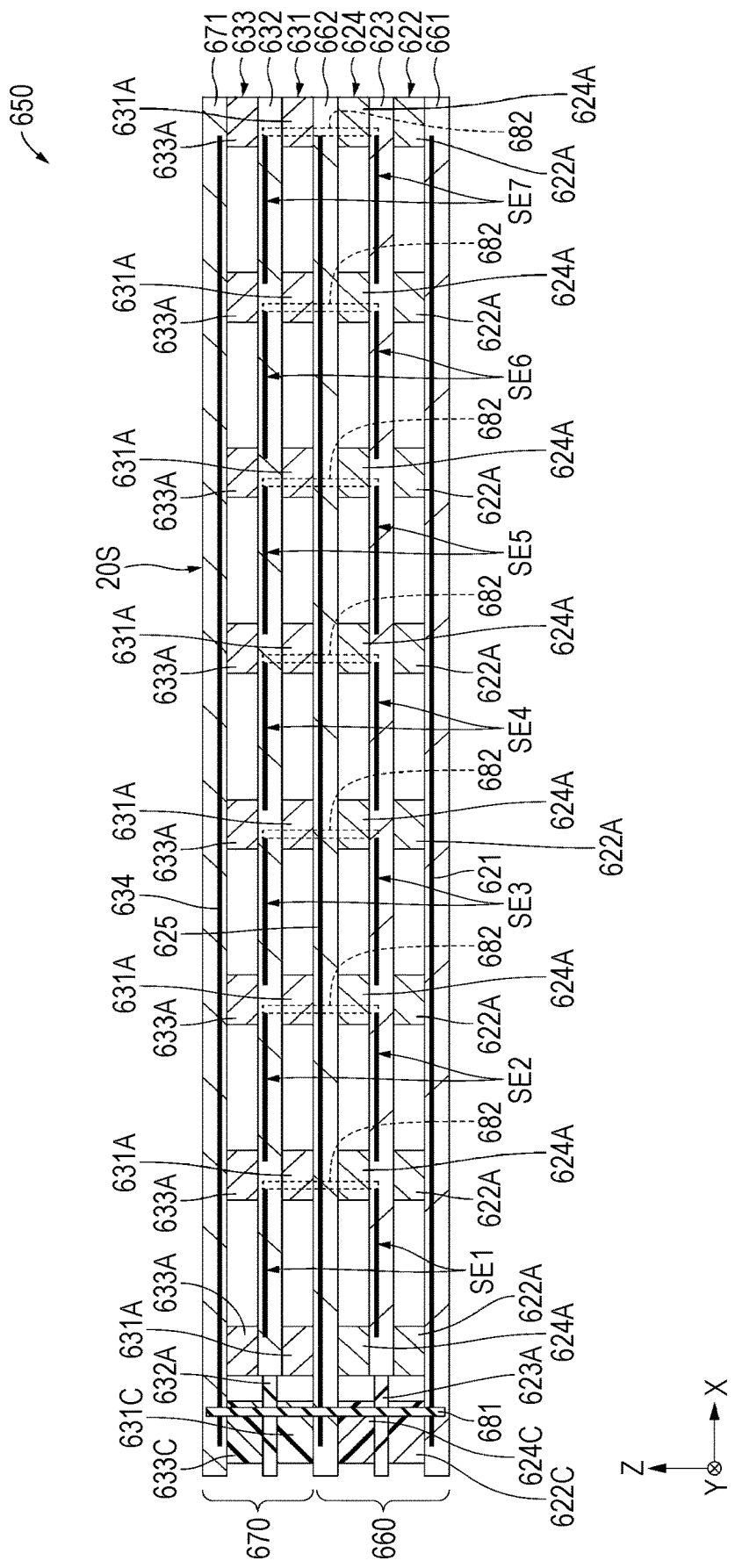
FIG. 45 is a cross-sectional view showing a modified example of the sensor.

FIG. 45 is a cross-sectional view showing a configuration of a sensor 650 according to a modified example. In the sensor 650, a first sensor structure 660 includes elongated FPCs 661 and 662 instead of the elongated metal layers 621, 625, and 634. Furthermore, a second structure 670 includes an elongated FPC 671 instead of the elongated metal layer 634. The FPCs 661, 662, and 671 include metal layers 621, 625, and 634, respectively.

One end of the FPC 661, a ground pad 623A of a sensor electrode layer 623, one end of the FPC 662, a ground pad 632A of a sensor electrode layer 632, and one end of the FPC 671 are connected by adhesives 622C, 624C, 631C, and 633C, and are electrically connected by connection means 681 such as a through hole, a VIA, or a blind via hole (BVH). Therefore, the metal layers 621, 625, and 634 are grounded.

Furthermore, the sensing units SE of the sensor electrode layers 623 and 632 that are stacked in a thickness direction of the sensor 650 are electrically connected by connection means 682 such as a through hole, a VIA, or a blind via hole (BVH).

Modified Example 2

In the seventh embodiment, the sensor 610A may include an elastic layer instead of at least one of the support layers 622, 624, 631, and 633. Furthermore, in Modified Example 1 of the seventh embodiment, the sensor 650 may include an elastic layer instead of at least one of the support layers 622, 624, 631, and 633. Note that, as a material of the elastic layer, a material similar to that of the elastic layer in Modified Example 1 of the first embodiment can be exemplified.

REFERENCE EXAMPLE

Hereinafter, the present disclosure will be specifically described with reference examples, but the present disclosure is not limited to these reference examples only.

Reference Example 1

By laminating each member shown below, a rectangular film sensor 610A having the configuration shown in FIG. 44 was produced.

(First Sensor Structure 620)

Metal layer 621: SUS layer, support 622A: double-sided adhesive tape, sensor electrode layer 623: FPC, support 624A: double-sided adhesive tape, metal layer 625: SUS layer (Second Sensor Structure 630)

Support 631A: double-sided adhesive tape, sensor electrode layer 632: FPC, support 633A: double-sided adhesive tape, metal layer 634: SUS layer Reference Example 2

A rectangular film-shaped sensor including only the first sensor structure 620 of Reference Example 1 was produced.

[Evaluation of Sensitivity]

Figure 46:
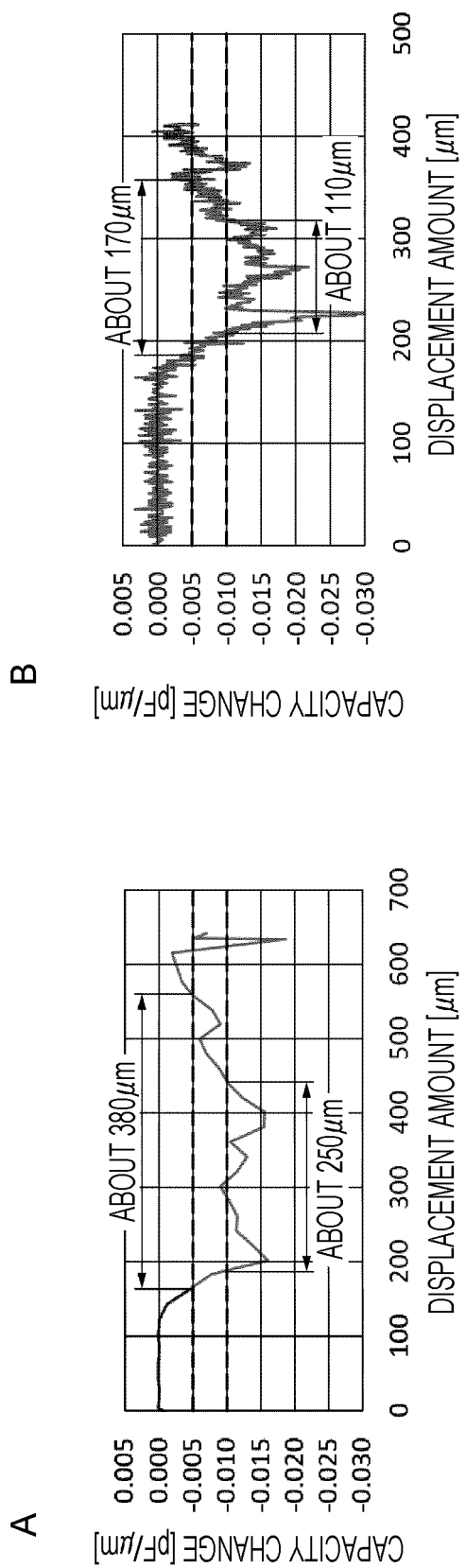
FIG. 46A is a graph showing a capacity change of a sensor of Reference Example 1.
FIG. 46B is a graph showing a capacity change of a sensor of Reference Example 2.

Using a Φ6 mm silicone rubber keying element, the sensing unit SE was pressed, and a capacity change amount with respect to a displacement amount of the sensing surface 20S was measured. The results are shown in FIGS. 46A and 46B.

From the results described above, when a displacement amount range where the capacity change (capacity decrease) was −0.005 [pF] or less was determined, the displacement amount range was about 380 μm (see FIG. 46A) in the sensor 610A of Reference Example 1, while the displacement amount range was about 170 μm (see FIG. 46B) in the sensor of Reference Example 2. That is, a range that can be detected as the displacement amount by the sensor 610A of Reference Example 1 was more than twice a range that can be detected as the displacement amount by the sensor of Reference Example 2. Note that, it is usually considered that good sensitivity can be obtained if the capacity change (capacity decrease) is 0.005 [pF] or less.

The embodiments and the modified examples thereof of the present disclosure have been specifically described above, but the present disclosure is not limited to the above-described embodiments and modified examples thereof, and various modifications based on the technical idea of the present disclosure are possible.

For example, configurations, methods, processes, shapes, materials, numerical values, and the like described in the above-described embodiments and modified examples are merely examples, and different configurations, methods, processes, shapes, materials, numerical values, and the like may be used as necessary.

Furthermore, configurations, methods, processes, shapes, materials, numerical values, and the like of the above-described embodiments and modified examples thereof can be combined with each other without departing from the gist of the present disclosure.

In the electronic device 310 according to the fourth embodiment, the electronic device 410 according to the fifth embodiment, the electronic device 510 according to the sixth embodiment, and the electronic device 610 according to the seventh embodiment, the configuration (configuration in the second embodiment) may be adopted in which the information 13G corresponding to the buttons BT1, BT2, and BT3 is displayed at a position along an edge on the side wall part side in the screen 13B, instead of the configuration with the buttons BT1, BT2, and BT3 being provided on the side wall part.

In the first to seventh embodiments, a case where the sensing units SE1, SE3, SE5, and SE7 are used as the sensing units for malfunction compensation has been described, but all the sensing units SE1 to SE7 may be used as the sensing units for user operation detection. In this case, buttons are also provided at positions corresponding to the sensing units SE1, SE3, SE5, and SE7.

Furthermore, the present disclosure can also adopt the following configurations.

(1)

An electronic device including:

a housing;

a sensor provided on an inner surface of the housing and configured to detect deformation of the housing; and a control unit configured to control an operation of the electronic device on the basis of a detection result of the sensor, in which the sensor includes a first sensing unit configured to detect a prescribed user operation, and a second sensing unit configured to compensate for a malfunction.

(2)

The electronic device according to (1), in which the sensor includes two or more of the first sensing unit, and the second sensing unit is provided between the first sensing units that are adjacent.

(3)

The electronic device according to (1) or (2), in which the control unit detects a malfunction on the basis of whether or not a level of at least one signal among detection signals of the first sensing unit and the second sensing unit exceeds a threshold, and a signal having a highest signal level among at least one signal exceeding the threshold is a detection signal of the first sensing unit.

(4)

The electronic device according to any one of (1) to (3), in which the control unit detects a malfunction on the basis of whether or not a level of at least one signal among detection signals of the first sensing unit and the second sensing unit exceeds a second threshold that is opposite in polarity to a first threshold that is for determining the prescribed user operation.

(5)

The electronic device according any one of (1) to (4), in which, as an application is activated, the control unit allocates some of a plurality of sensing units to the first sensing unit and allocates the rest to the second sensing unit.

(6)

The electronic device according to (5), further including a display device, in which the control unit displays information regarding an operation corresponding to the first sensing unit at a position corresponding to the first sensing unit in a screen of the display device.

(7)

The electronic device according to any one of (1) to (6), in which the housing includes a bottom part, a wall part provided at a peripheral edge of the bottom part, and a front panel provided on the wall part, the first sensing unit is provided on an inner surface of the wall part, and the second sensing unit is provided on at least one inner surface of the bottom part or of the front panel.

(8)

The electronic device according to (7), in which the control unit detects a malfunction on the basis of whether or not a detection signal of the second sensing unit exceeds a threshold.

(9)

The electronic device according to any one of (1) to (8), in which the housing has a side wall part, and the sensor is provided on an inner surface of the side wall part.

(10)

The electronic device according to (9), further including:

an elastic body provided on a back surface of the sensor; and a support configured to support the elastic body, in which the housing has a groove part provided along the side wall part, a sensor module is configured by the sensor, the elastic body, and the support, and the sensor module is fitted into the groove part.

(11)

The electronic device according to any one of (1) to (9), further including:

an elastic body provided on a back surface of the sensor; and a support configured to support the elastic body.

(12)

The electronic device according to any one of (1) to (8), in which the housing has a side wall part having a slit part, and the sensor is accommodated in the slit part.

(13)

The electronic device according to any one of (1) to (11), in which the sensor has a film shape, and is provided such that one main surface of the sensor faces an inner surface of the housing.

(14)

The electronic device according to any one of (1) to (13), in which the sensor includes a first reference electrode layer, a first support layer provided on the first reference electrode layer, a first sensor electrode layer provided on the first support layer, a second support layer provided on the first sensor electrode layer, and a second reference electrode layer provided on the second support layer.

(15)

The electronic device according to (14), in which the sensor further includes a third support layer provided on the second reference electrode layer, a second sensor electrode layer provided on the third support layer, a fourth support layer provided on the second sensor electrode layer, and a third reference electrode layer provided on the fourth support layer.

(16)

The electronic device according to (14), in which the first reference electrode layer, the second reference electrode layer, and the first sensor electrode layer are configured by one flexible board.

(17)
An electronic device including:
a housing;
a sensor provided in the housing and configured to detect deformation of the housing; and
a control unit configured to control an operation of the electronic device on the basis of a detection result of the sensor, in which
the sensor includes
a first sensing unit configured to detect a prescribed user operation, and
a second sensing unit configured to compensate for a malfunction.

(18)
A sensor provided on an inner surface of a housing and configured to detect deformation of the housing, the sensor including:
a first sensing unit configured to detect a prescribed user operation; and
a second sensing unit configured to compensate for a malfunction.

(19)
A sensor provided in a housing and configured to detect deformation of the housing, the sensor including:
a first sensing unit configured to detect a prescribed user operation; and
a second sensing unit configured to compensate for a malfunction.

REFERENCE SIGNS LIST 10, 110, 210 Electronic device
11 Housing
11M Bottom part
11N Wall part
11R, 11L Side wall part
11 SA outer surface
11SB inner surface
12 Board
12A Controller IC
12B Main CPU
13 Front panel
13A Display device
13B Screen
13G Information
14 Groove part
20, 120, 220 Sensor
20S, 220S Sensing surface
21, 22, 221, 222 Metal layer
23 Support
24, 224 Adhesive layer
30, 230 Sensor electrode layer
32, 232 First electrode
32A, 33A, 232A, 233A Sub-electrode
33, 233 Second electrode
40 FPC
41 Connecting part
42 Connector
51 Elastic body
52 Spacer
BT1, BT2, BT3 Button
SE1 to SE7 Sensing unit

The invention claimed is:

1. An electronic device comprising:
a housing;
a sensor provided on an inner surface of the housing and configured to detect deformation of the housing; and
a control unit configured to control an operation of the electronic device on a basis of a detection result of the sensor, wherein
the sensor includes
a first sensing unit configured to detect a prescribed user operation, and
a second sensing unit configured to compensate for a malfunction, and
the control unit is configured to detect a malfunction on a basis of whether or not a level of at least one signal among detection signals of the first sensing unit and the second sensing unit exceeds a second threshold that is opposite in polarity to a first threshold that is for determining the prescribed user operation.

2. The electronic device according to claim 1, wherein
the sensor includes two or more of the first sensing unit, and
the second sensing unit is provided between the first sensing units that are adjacent.

3. The electronic device according to claim 1, wherein a signal having a highest signal level among at least one signal exceeding the first threshold is a detection signal of the first sensing unit.

4. The electronic device according to claim 1, wherein, as an application is activated, the control unit allocates some of a plurality of sensing units to the first sensing unit and allocates a rest to the second sensing unit.

5. The electronic device according to claim 4, further comprising
a display device, wherein
the control unit displays information regarding an operation corresponding to the first sensing unit at a position corresponding to the first sensing unit in a screen of the display device.

6. The electronic device according to claim 1, wherein
the housing includes a bottom part, a wall part provided at a peripheral edge of the bottom part, and a front panel provided on the wall part,
the first sensing unit is provided on an inner surface of the wall part, and
the second sensing unit is provided on at least one inner surface of the bottom part or of the front panel.

7. The electronic device according to claim 6, wherein the control unit detects a malfunction on a basis of whether or not a detection signal of the second sensing unit exceeds the second threshold.

8. The electronic device according to claim 1, wherein
the housing has a side wall part, and
the sensor is provided on an inner surface of the side wall part.

9. The electronic device according to claim 8, further comprising:
an elastic body provided on a back surface of the sensor; and
a support configured to support the elastic body, wherein
the housing has a groove part provided along the side wall part,
a sensor module is configured by the sensor, the elastic body, and the support, and
the sensor module is fitted into the groove part.

10. The electronic device according to claim 1, further comprising:
an elastic body provided on a back surface of the sensor; and
a support configured to support the elastic body.

11. The electronic device according to claim 1, wherein the housing has a side wall part having a slit part, and the sensor is accommodated in the slit part.

12. The electronic device according to claim 1, wherein the sensor has a film shape, and is provided to cause one main surface of the sensor to face an inner surface of the housing.

13. The electronic device according to claim 1, wherein the sensor includes
a first reference electrode layer,
a first support layer provided on the first reference electrode layer,
a first sensor electrode layer provided on the first support layer,
a second support layer provided on the first sensor electrode layer, and
a second reference electrode layer provided on the second support layer.

14. The electronic device according to claim 13, wherein the sensor further includes
a third support layer provided on the second reference electrode layer,
a second sensor electrode layer provided on the third support layer,
a fourth support layer provided on the second sensor electrode layer, and
a third reference electrode layer provided on the fourth support layer.

15. The electronic device according to claim 13, wherein the first reference electrode layer, the second reference electrode layer, and the first sensor electrode layer are configured by one flexible board.

16. An electronic device comprising:
a housing;
a sensor provided in the housing and configured to detect deformation of the housing; and
a control unit configured to control an operation of the electronic device on a basis of a detection result of the sensor, wherein
the sensor includes
a first sensing unit configured to detect a prescribed user operation, and
a second sensing unit configured to compensate for a malfunction, and
the control unit is configured to detect a malfunction on a basis of whether or not a level of at least one signal among detection signals of the first sensing unit and the second sensing unit exceeds a second threshold that is opposite in polarity to a first threshold that is for determining the prescribed user operation.

17. A sensor provided on an inner surface of a housing and configured to detect deformation of the housing, the sensor comprising:
a first sensing unit configured to detect a prescribed user operation; and
a second sensing unit configured to compensate for a malfunction, wherein
the first and second sensing units are configured to enable detecting a malfunction on a basis of whether or not a level of at least one signal among detection signals of the first sensing unit and the second sensing unit exceeds a second threshold that is opposite in polarity to a first threshold that is for determining the prescribed user operation.

18. A sensor provided in a housing and configured to detect deformation of the housing, the sensor comprising:
a first sensing unit configured to detect a prescribed user operation; and
a second sensing unit configured to compensate for a malfunction, wherein
the first and second sensing units are configured to enable detecting a malfunction on a basis of whether or not a level of at least one signal among detection signals of the first sensing unit and the second sensing unit exceeds a second threshold that is opposite in polarity to a first threshold that is for determining the prescribed user operation.

* * * * *